(12) United States Patent
Hasegawa

(10) Patent No.: US 8,134,725 B2
(45) Date of Patent: Mar. 13, 2012

(54) DATA PROCESSING APPARATUS, CONTROL METHOD THEREOF AND PROGRAM FOR PROCESSING DATA TRANSMITTED TO AN EXTERNAL APPARATUS

(76) Inventor: Tomoya Hasegawa, Tokyo (JP)

( * ) Notice: Subject to any disclaimer, the term of this patent is extended or adjusted under 35 U.S.C. 154(b) by 1152 days.

(21) Appl. No.: 11/817,857

(22) PCT Filed: May 11, 2006

(86) PCT No.: PCT/JP2006/309874
§ 371 (c)(1),
(2), (4) Date: Sep. 5, 2007

(87) PCT Pub. No.: WO2006/123723
PCT Pub. Date: Nov. 23, 2006

(65) Prior Publication Data
US 2009/0219562 A1 Sep. 3, 2009

(30) Foreign Application Priority Data
May 16, 2005 (JP) .................................. 2005-143224

(51) Int. Cl.
G06F 15/00 (2006.01)
G06F 3/12 (2006.01)
G06K 1/00 (2006.01)
(52) U.S. Cl. ...................................... 358/1.15; 358/1.13
(58) Field of Classification Search .......................... None
See application file for complete search history.

(56) References Cited

U.S. PATENT DOCUMENTS
2003/0160997 A1* 8/2003 Kimura ......................... 358/1.15
2005/0238402 A1* 10/2005 Yamada et al. .................. 400/78

FOREIGN PATENT DOCUMENTS
JP 10-320534 12/1998
JP 11-234493 8/1999
JP 2004153680 A 5/2004

OTHER PUBLICATIONS
Japanese Office Action dated Jun. 21, 2011 in corresponding Japanese Application No. 2005-143224.

* cited by examiner

Primary Examiner — Douglas Tran
(74) Attorney, Agent, or Firm — Fitzpatrick, Cella, Harper & Scinto

(57) ABSTRACT

A data processing apparatus that can flexibly deal with various needs of a user while effectively utilizing a memory unit thereof that can store a plurality of data. The data processing apparatus, which is equipped with a memory unit capable of storing data, executes processing of transmitting the data of the memory unit to an external apparatus and erasing the data of the object of transmission to the external apparatus from the memory unit. An acceptance of a specific user request related to processing of the data transmitted to the external apparatus is allowed in a case where the data has been transmitted to the external apparatus. The data processing apparatus executes processing using the data transmitted to the external apparatus in a case where the acceptance of the specific user request is performed via the user interface unit.

25 Claims, 42 Drawing Sheets

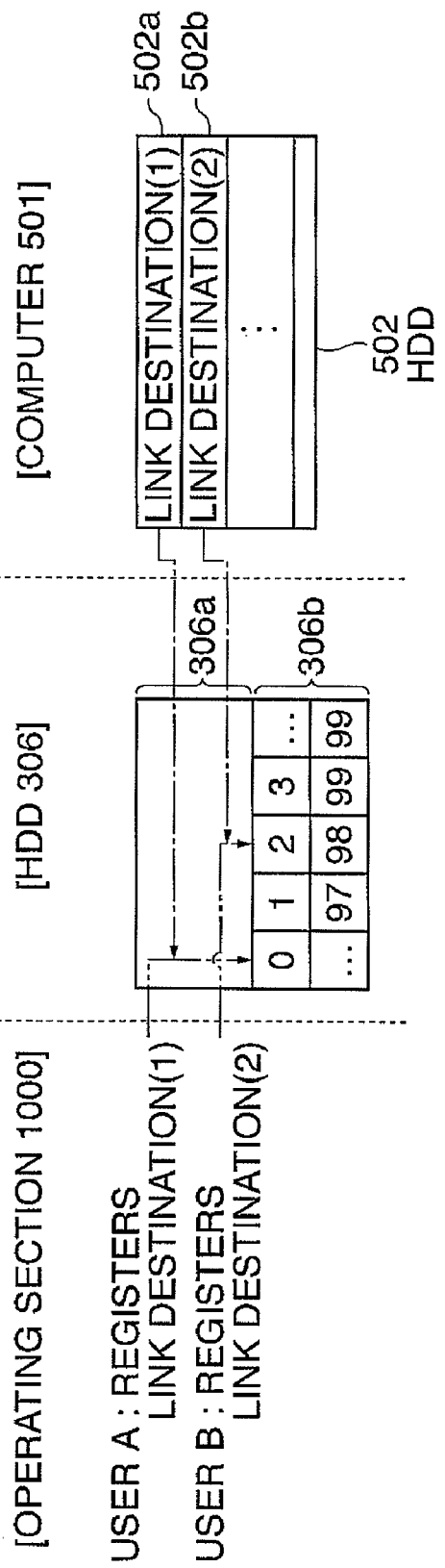

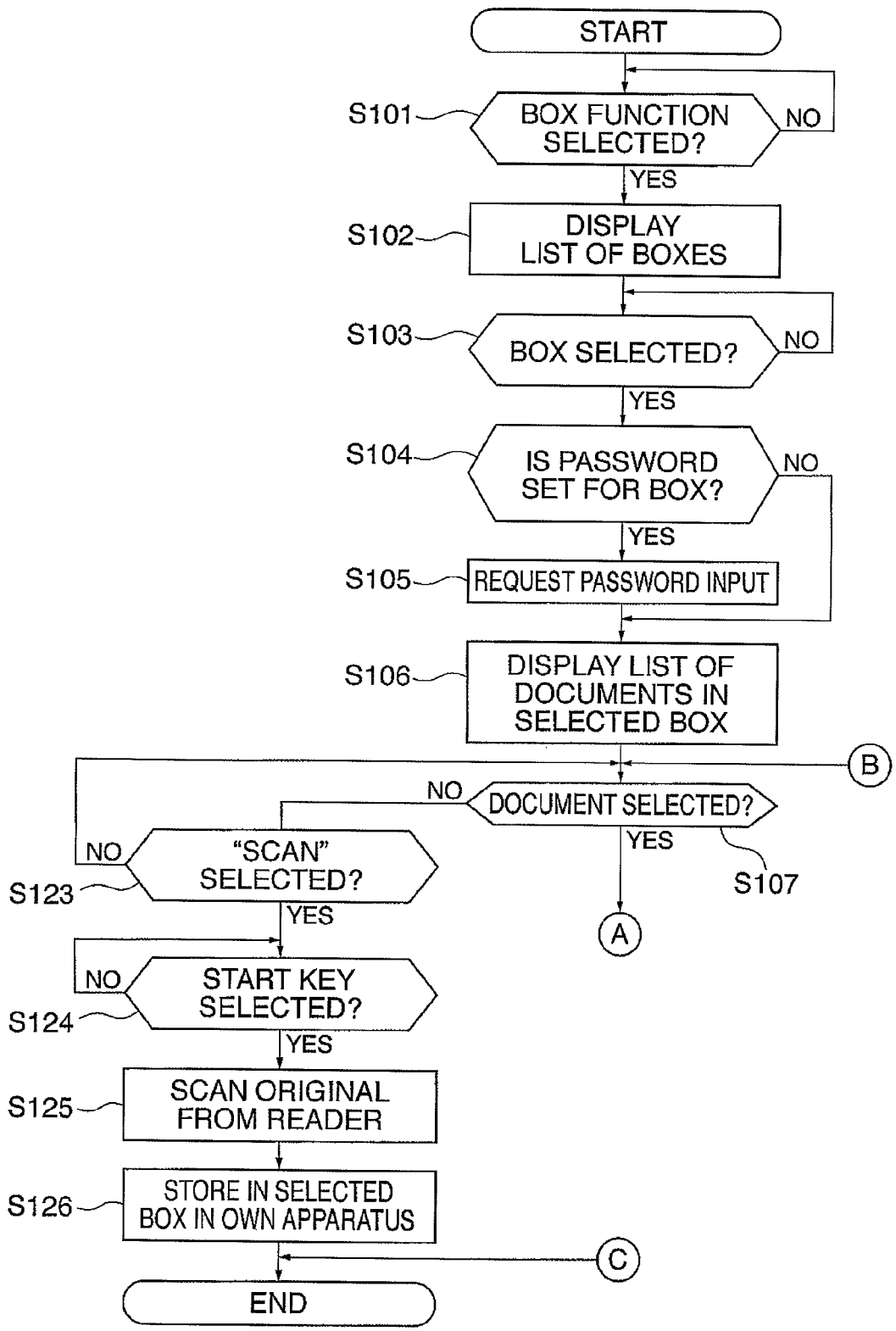

FIG.19

| DETAILED INFORMATION | |
|---|---|
| ■ACCEPTANCE NO. | ▷ 0004 |
| ■ACCEPTANCE TIME | ▷ 2004 11/05 10:34 |
| ■DOCUMENT TYPE | ▷ 📄 NO PRINT SETTINGS |
| ■DOCUMENT NAME | ▷ 20041105103439 [LINK ONLY] |
| ■USER NAME | ▷ |
| ■NUMBER OF PAGES | ▷ 1 |
| ■NUMBER OF COPIES | ▷ 1 |
| ■RESOLUTION | ▷ 600x600dpi |
| ■SIZE | ▷ A4  ▢ |
| ■LINK DESTINATION NAME | ▷ Backup_1 |
| ■LINK DESTINATION ADDRESS | ▷ N:¥Backup¥Box¥No2 |

▸ CHANGE DOCUMENT NAME

CLOSE ⏎

SYSTEM CONDITION / SUSPEND ▸

DATA PROCESSING APPARATUS, CONTROL METHOD THEREOF AND PROGRAM FOR PROCESSING DATA TRANSMITTED TO AN EXTERNAL APPARATUS

TECHNICAL FIELD

The present invention relates to a data processing apparatus containing a memory unit that can store data as a processing object, a control method of the apparatus and a program.

BACKGROUND ART

Conventionally, among data processing apparatuses such as a printer (also referred to as "image forming apparatus") that is equipped with a large capacity hard disk, an apparatus is known which allocates a plurality of memory boxes to individuals by dividing a storage area on a hard disk to provide each of the storage areas for each individual. In this kind of printer, an image received from a host computer can be stored in a specified area (memory box) and the image stored in the memory box can then be printed.

Since there is also a lot of image data normally resident in the memory boxes in addition to the image data that is temporarily stored there for printing, unless image data inside the memory boxes is erased, the hard disk will run out of free storage space (the hard disk will become full) and it will not be possible to newly store image data on the hard disk.

In particular, in a POD (print on demand) system that provides a print output service via the Internet, image data is frequently introduced into memory boxes. Since printing that utilizes this kind of POD system is mainly large quantity printing, the memory boxes soon become full and it is necessary to wait for a state in which it is okay to erase image data within the memory boxes before erasing the image data in the memory boxes.

In view of the foregoing, there has been proposed configuration in which image data recorded in a memory box of a printer is transferred to an external computer, erase the image data corresponding to the transferred image data from the memory box, and in accordance with the amount of free space in the memory box, return the image data that was transferred to the external computer to the memory box (for example, see Japanese Laid-Open Patent Publication (Kokai) No. H11-234493). According to this configuration, even when a memory box provided in the printer is full, it is possible to store image data that has been transferred from an external computer in the memory box.

However, there is the following problem with the above described Japanese Laid-Open Patent Publication (Kokai) No. H11-234493.

When performing a predetermined operation, for example, print output operation on image data stored in a memory box, although when the image data is present inside the memory box, the operation can be carried out immediately, in the case of image data that has been transferred to an external computer, since the image data is erased from the memory box, it is necessary to transmit the image data back to the memory box again for printing. At this time, since it is necessary for the user to check the free space in the memory box and, based on the result, to transmit the image data back to the memory box from the external computer, it is not possible to immediately perform an operation for image data that has been sent to the external computer.

Further, a printer that does not include a large capacity hard disk cannot even have a memory box function.

It is an object of the present invention to provide a data processing apparatus and control method thereof that can flexibly deal with various needs of a user while effectively utilizing a memory unit thereof that can store a plurality of data, as well as a program.

Another object of the present invention is to provide an image processing apparatus and a control method thereof, and a display control apparatus and a control method thereof that enable a user to use a memory box without being concerned about the capacity of a hard disk when using the hard disk as an area of the memory box, and furthermore, that also realize a memory box function in an apparatus which is not equipped with a large capacity hard disk, as well as a control program.

DISCLOSURE OF THE INVENTION

To attain the above objects, according to a first aspect of the present invention, there is provided a data processing apparatus equipped with a memory unit that can store data as a processing object comprising a user interface unit, and a controller adapted to cause the data processing apparatus to transmit the data of the memory unit to an external apparatus, and to cause the data processing apparatus to execute an erasing process of the data of the memory unit, wherein the controller allows an acceptance of a specific user request related to processing of the data transmitted to the external apparatus in a case where the data has been transmitted to the external apparatus, and wherein the controller causes the data processing apparatus to execute a process in which the data transmitted to the external apparatus is used in a case where the acceptance of the specific user request via the user interface unit is performed.

Preferably, the controller allows a selection of an image data to be transmitted to the external apparatus from among a plurality of image data stored in the memory unit to be performed by a user via the user interface unit, the controller causes the image data among the plurality of image data of the memory unit, that is selected by the user via the user interface unit, to be transmitted to the external apparatus via a network, the controller causes the data processing apparatus to hold transfer destination information for the selected image data in a case where the selected image data is transmitted to the external apparatus, and the controller causes the data processing apparatus to refer to the transfer destination information and acquire the image data that has been transferred to the external apparatus, causes the data processing apparatus to execute a process using the acquired image data, and causes the data processing apparatus to execute an erasing process of the acquired image data after the process using the acquired image data is performed by the data processing apparatus, in a case where an acceptance of a specific user request, as the specific user request, which is related to processing of the image data transmitted to the external apparatus is performed via the user interface unit.

More preferably, the controller allows a selection of whether or not to cause the transferred image data that is stored in a storage device of the external apparatus to be re-stored in the memory unit to be executed by a user via the user interface unit.

Also more preferably, the controller causes information related to a user and information related to a transfer destination of image data to be registered in each memory box area of a plurality of memory box areas that are provided in the memory unit.

Further preferably, the process is at least one of an image forming process for performing image formation on a sheet using the acquired image data, a transmission process for transmitting the acquired image data to a predetermined destination via the network, a process for moving the acquired image data between the plurality of memory box areas, a process for duplicating the acquired image data between the plurality of memory box areas, and an editing process for editing the acquired image data.

Preferably, the controller, in a case where image data is stored in the memory unit, causes a display indicating that the image data is stored in the memory unit to be performed by the user interface unit, and the controller, in a case where a selection of an item related to image data stored in the memory unit is performed by a user via the user interface unit, causes a display for accepting from the user a request that causes the image data to be transferred to the external apparatus to be performed by the user interface unit.

More preferably, the controller, in a case where image data is not stored in the memory unit and is stored in the external apparatus, causes a display indicating that the image data is stored in a storage device of the external apparatus to be performed by the user interface unit, and the controller, in a case where a selection of an item related to the image data stored in the storage device of the external apparatus is performed by a user via the user interface unit, causes a display for accepting from the user a request that causes the image data stored in the storage device of the external apparatus to be transferred to the memory unit to be performed by the user interface unit.

Preferably, the controller, in a case where a first operation is performed by a user via the user interface unit, causes the data processing apparatus to execute three processes consisting of a first process for causing actual image data of the memory unit to be transmitted to the external apparatus, a second process for erasing the actual image data from the memory unit, and a third process for generating link information of the actual image data, and the controller, in a case where a second operation is performed by the user via the user interface unit, causes the data processing apparatus to execute two processes consisting of a fourth process for acquiring from the external apparatus the actual image data that has been transferred to the external apparatus from the memory unit, and a fifth process for performing output processing of the actual image data acquired from the external apparatus.

To attain the above objects, in a second aspect of the present invention, there is provided a control method of a data processing apparatus equipped with a memory unit that can store data as a processing object, comprising the steps of causing the data processing apparatus to execute a process for transmitting the data of the memory unit to an external apparatus and a process for erasing from the memory unit the data that is the object of transmission to the external apparatus, allowing, in a case where the data has been transmitted to the external apparatus, an acceptance of a specific user request related to processing of the data transmitted to the external apparatus, and causing the data processing apparatus to execute a process in which the data transmitted to the external apparatus is used in a case where the acceptance of the specific user request via a user interface unit is performed.

Preferably, the control method comprises the steps of allowing a selection of an image data to be transmitted to the external apparatus from among a plurality of image data stored in the memory unit to be performed by a user via the user interface unit, causing the image data among the plurality of image data of the memory unit, that is selected by the user via the user interface unit, to be transmitted to the external apparatus via a network, causing the data processing apparatus to hold transfer destination information for the selected image data in a case where the selected image data is transmitted to the external apparatus, and causing the data processing apparatus to refer to the transfer destination information and acquire the image data that has been transferred to the external apparatus, causing the data processing apparatus to execute a process using the acquired image data, and causing the data processing apparatus to execute an erasing process of the acquired image data after the process using the acquired image data is performed by the data processing apparatus, in a case where an acceptance of a specific user request, as the specific user request, which is related to processing of the image data transmitted to the external apparatus has been performed via the user interface unit.

More preferably, the control method comprises the step of allowing a selection of whether or not to cause the transferred image data that is stored in a storage device of the external apparatus to be re-stored in the memory unit to be executed by a user via the user interface unit.

Also more preferably, the control method comprises the step of causing information related to a user and information related to a transfer destination of image data to be registered in each memory box area of a plurality of memory box areas that are provided in the memory unit.

Further preferably, the process is at least one of an image forming process for performing image formation on a sheet using the acquired image data, a transmission process for transmitting the acquired image data to a predetermined destination via the network, a process for moving the acquired image data between the plurality of memory box areas, a process for duplicating the acquired image data between the plurality of memory box areas, and an editing process for editing the acquired image data.

Preferably, the control method comprises the steps of, in a case where image data is stored in the memory unit, causing a display indicating that the image data is stored in the memory unit to be performed by the user interface unit, and, in a case where a selection of an item related to image data stored in the memory unit is performed by a user via the user interface unit, causing a display for accepting from the user a request that causes the image data to be transferred to the external apparatus to be performed by the user interface unit.

Preferably, the control method comprises the steps of, in a case where image data is not stored in the memory unit and is stored in the external apparatus, causing a display indicating that the image data is stored in the storage device of the external apparatus to be performed by the user interface unit, and, in a case where a selection of an item related to the image data stored in the storage device of the external apparatus is performed by a user via the user interface unit, causing a display for accepting from the user a request that causes the image data stored in the storage device of the external apparatus to be transferred to the memory unit to be performed by the user interface unit.

Also preferably, the control method comprises the steps of, in a case where a first operation is performed by a user via the user interface unit, causing the data processing apparatus to execute three processes consisting of a first process for causing actual image data of the memory unit to be transmitted to the external apparatus, a second process for erasing the actual image data from the memory unit, and a third process for generating link information of the actual image data, and, in a case where a second operation is performed by the user via the user interface unit, causing the data processing apparatus to execute two processes consisting of a fourth process for acquiring from the external apparatus the actual image data that has been transferred to the external apparatus from the memory unit, and a fifth process for performing output processing of the actual image data acquired from the external apparatus.

To attain the above object, in a third aspect of the present invention, there is provided a computer program for causing a computer to execute the control method according to the second aspect of the present invention.

According to the present invention, it is possible to flexibly deal with needs of users while a memory unit which is installed in a data processing apparatus and which can store data as a processing object is effectively utilized.

According to the present invention, when a user uses, for example, a first storage device as a memory box area, the user can use the memory box area without being concerned about the capacity of the first storage means, thereby improving operability for using a memory box function. Further, it is also possible to configure a memory box function in an apparatus that does not include a large capacity memory device.

The above and other objects, features, and advantages of the invention will become more apparent from the following detailed description taken in conjunction with the accompanying drawings.

BRIEF DESCRIPTION OF THE DRAWINGS

FIG. 7 is a conceptual diagram illustrating link destination registration processing for a memory box;

FIG. 10 is a flowchart that illustrates the overall processing in the embodiment of the present invention;

FIG. 19 is a view showing an example of a display screen that shows detailed information of a document;

BEST MODE FOR CARRYING OUT THE INVENTION

Figure 1:
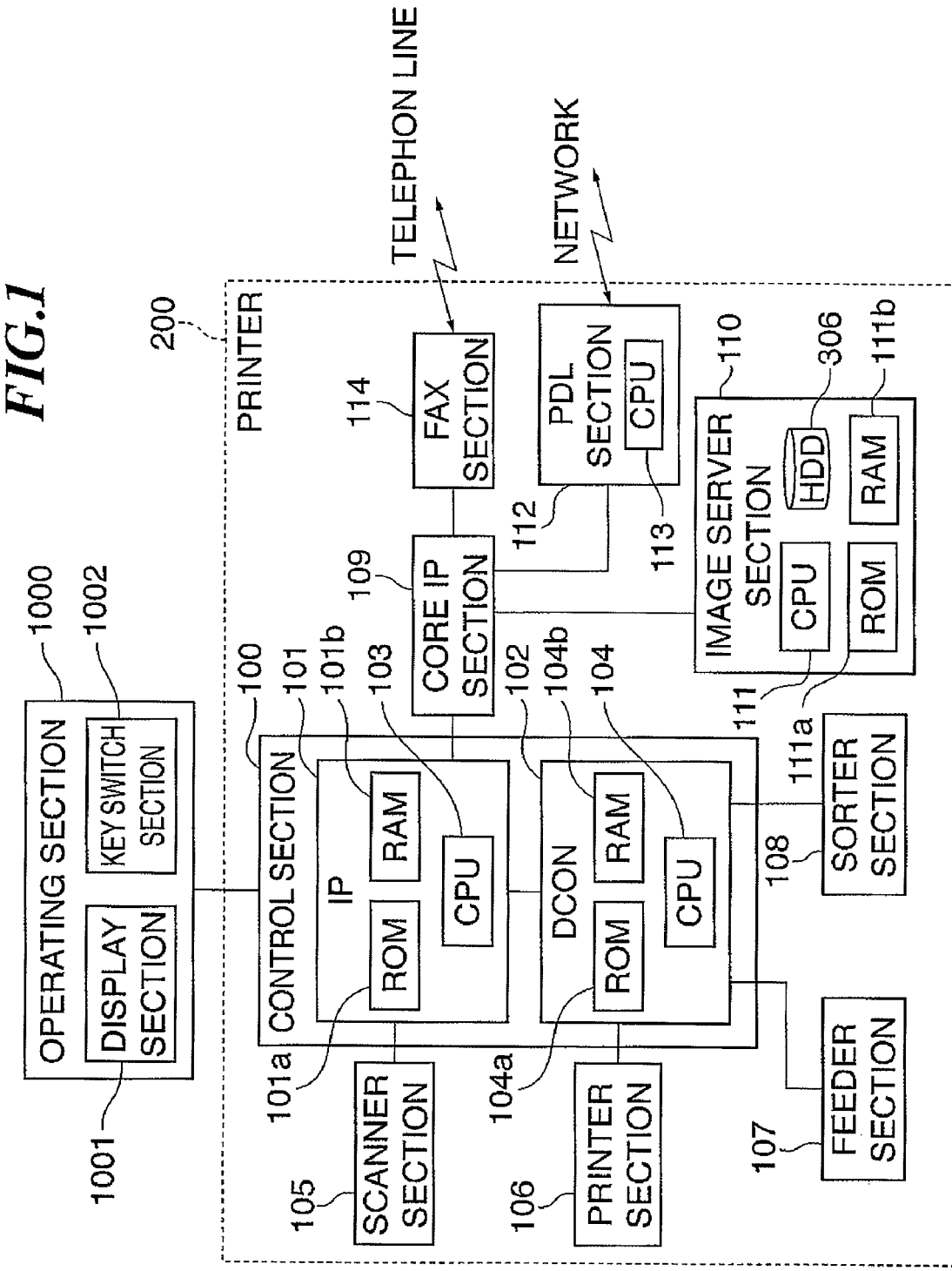
FIG. 1 is a block diagram showing the configuration of a control system of a printer according to an embodiment of the present invention.

The present invention will now be described in detail below with reference to the drawings showing preferred embodiments thereof.

Hereunder, embodiments of the data processing apparatus and control method thereof, display control apparatus and control method thereof, and control program of the present invention are described referring to the drawings.

First, the construction of a printer as one example of the data processing apparatus according to an embodiment of the present invention will be described.

It should be noted that, in the present embodiment, a multifunction printer that is equipped with a plurality of functions including a function that prints data of a job as a processing object that has been received from a scanner unit and a function that prints data of a job as a processing object that has been received from an external apparatus is exemplified as one example of the printer. However, a single function printer that is equipped with at least any one of these functions is also included in the present invention. Thus, the present invention can be applied to a data processing apparatus having any kind of construction, on the condition that the data processing apparatus satisfies at least the following construction requirements:

(Condition 1) That the data processing apparatus itself contains a memory unit that can store a plurality of data (for example, a hard disk as in the present embodiment).

(Condition 2) That the data processing apparatus itself contains a unit that performs output processing for data of the memory unit (for example, print processing or data sending processing, such as e-mail sending, to transmit data to an external apparatus as desired by a user).

(Condition 3) That the data processing apparatus has a construction in which data of the memory unit can be transferred to an external apparatus.

(Condition 4) That the data processing apparatus has a construction in which can be acquired from an external apparatus, data that has been transferred to the external apparatus from the memory unit.

The present invention includes a data processing apparatus of any construction, as long as the construction of the data processing apparatus satisfies the above conditions 1 to 4. The construction of a printer as one example of the data processing apparatus of the present invention is described below based on this basis.

FIG. 1 is a block diagram showing the configuration of a control system of a printer according to an embodiment of this invention.

As shown in FIG. 1, a printer 200 is comprised of a control section 100, a scanner section 105, a printer section 106, a feeder section 107, a sorter section 108, an image server section 110, a FAX section 114 and a PDL section 112.

The control section 100 includes a central control section (IP section) 101 that carries out overall control and image processing, and a device control section (DCON section) 102 that carries out process control and mechanical control for forming an image on a recording sheet. The control section 100 is connected to an operating section 1000 of the printer 200.

The central control section 101 is comprised of a CPU 103, a ROM 101a that stores control programs that are executed by the CPU 103, and a RAM 101b that serves as a work area for the CPU 103. The device control section 102 is comprised of a CPU 104, a ROM 104a that stores control programs that are executed by the CPU 104, and a RAM 104b that serves as a work area for the CPU 104. The central control section 101 and the device control section 102 implement various kinds of control operations by execution of separate control programs by their respective CPUs 103 and 104.

The scanner section 105 and the FAX section 114 are controlled by the central control section 101. The FAX section 114 is connected to the central control section 101 via a core IP section 109, and transmits image data scanned by the scanner section 105 by facsimile transmission and receives image data that is transmitted through a telephone line. The core IP section 109 performs image processing for input and output of images between the IP section 101 and the FAX section 114, the PDL section 112, and the image server section 110.

The PDL section 112 is controlled by the CPU 113, and receives PDL data output from an external computer that has a hard disk via a network, and expands the data into a bitmap image and outputs this as image data to the core IP section 109. The PDL section 112 also has a function as a network interface for exchanging information with an external apparatus through a network.

The image server section 110 is comprised of a CPU 111 and a hard disk 306 and the like. The image server section 110 has a function for storing image data from a host computer via the core IP section 109, and is controlled by the CPU 111. The image server section 110 is connected to the central control section 101 via the core IP section 109, and accesses for input and output of images and the like are carried out thereby.

The printer section 106 forms an image on a recording sheet. The feeder section 107 feeds originals, one sheet at a time, in order to perform a scanning operation for an original image at the scanner section 105, and the sorter section 108 sorts sheets on which an image has been formed by the printer section 106. These are controlled by the device control section 102.

The operating section 1000 is comprised of a display section 1001 and a key switch section 1002. The display section 1001 is formed by affixing a touch panel sheet on a liquid crystal display (LCD). The display section 1001 displays system operation screens, and when a key displayed thereon is pressed, the display section 1001 outputs the position information thereof to the CPU 103 of the central control section 101. When inputting a box name or user password, a keyboard is displayed on the touch panel of the display section 1001 to enable input by touching a displayed character or numeral. On the switch section 1002 are disposed a start key that is used when starting an operation to scan an original image and the like, a functions key that is used when selecting various user modes and the like, a stop key used when stopping a operation that is underway, and a reset key used when initializing settings from the operating section 1000 and the like.

Figure 2:
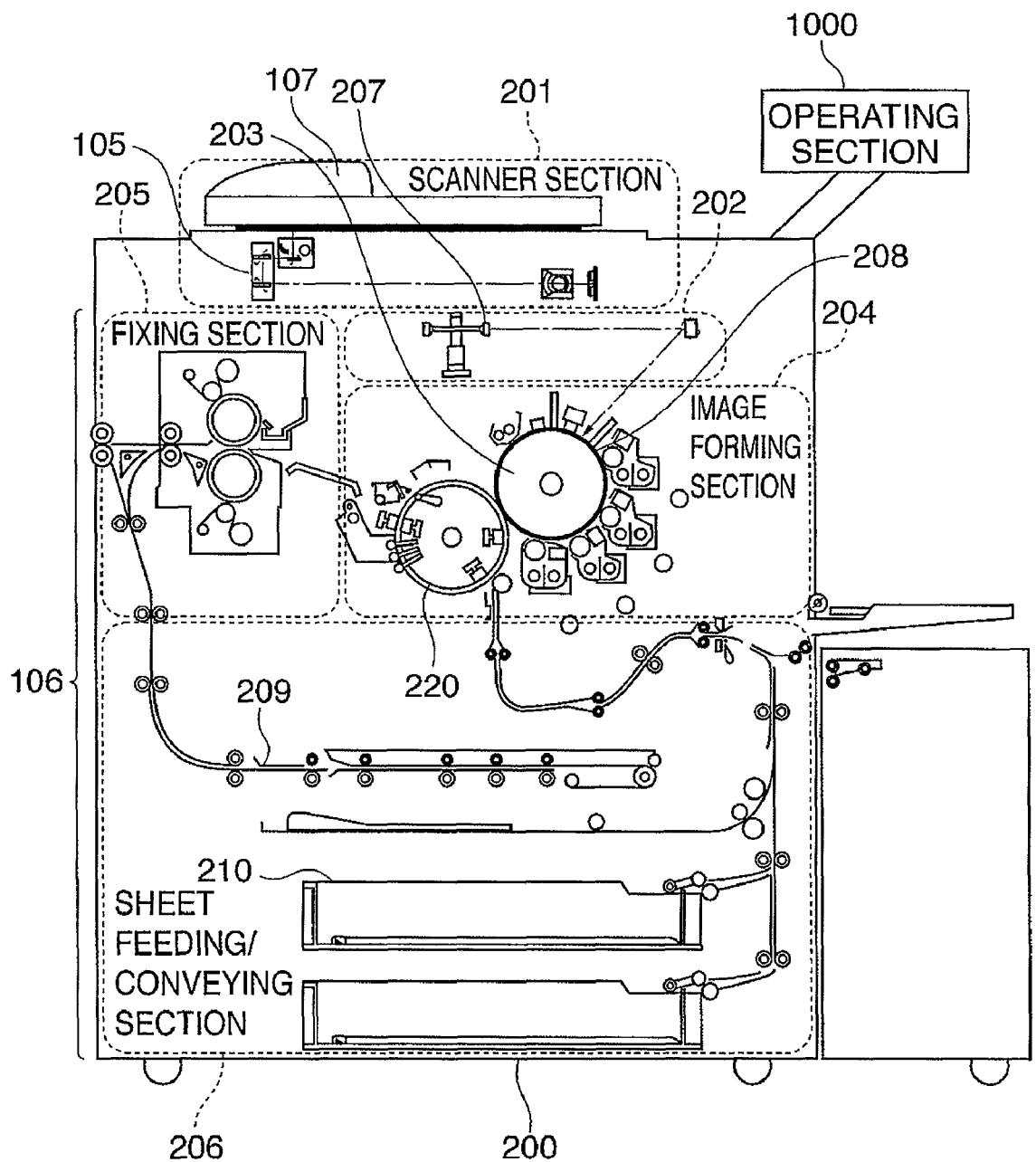
FIG. 2 is a cross sectional view showing the hardware construction of the printer shown in FIG. 1.

FIG. 2 is a cross sectional view showing the hardware construction of the printer 200 shown in FIG. 1.

The printer 200 is comprised of a scanner section 201, a laser exposing section 202, a photosensitive drum 203, an image forming section 204, a fixing section 205, a sheet feeding/conveying section 206, and an unshown printer control section that controls these components.

The scanner section 201 scans an original image and converts the scanned image into image data. The laser exposing section 202 outputs a beam such as a laser beam that was modulated based on the image data to a polygonal rotating mirror (a polygon mirror or the like) that rotates at an equiangular speed, to be irradiated onto the photosensitive drum 203 as reflected scanning light.

The image forming section 204 rotationally drives the photosensitive drum 203 and charges the photosensitive drum 203 with a charging device. In the image forming section 204, a latent image that was formed on the photosensitive drum 203 by the laser exposing section 202 is developed with toner. The toner image is transferred onto a sheet material, and minute amounts of toner that are not transferred at that time and remain on the photosensitive drum 203 are recovered. The image forming section 204 carries out this sequence of image forming process in sequence for toner of each of the colors yellow (Y), magenta (M), cyan (C) and black (K). Since an image forming process is carried out four times for one sheet material, a full-color image is formed on the sheet material.

The fixing section 205 is composed by a combination of rollers and a belt, and contains a heat source such as a halogen heater. The fixing section 205 melts and fixes the toner on a sheet material onto which a toner image was transferred by the image forming section 204 by heating and pressurizing the toner.

The sheet feeding/conveying section 206 include at least one storage cassette 210 that stores sheet materials. In accordance with an instruction from the printer control section, the sheet feeding/conveying section 206 separates one sheet from a plurality of sheet materials that are stored in the storage cassette 210, and conveys the sheet material to the fixing section 205 via the image forming section 204. The sheet material is wound around a transfer drum 220 of the image forming section 204, and is conveyed to the fixing section 205 after four revolutions of the transfer drum 220. During the four revolutions of the transfer drum 220, toner images of each of the aforementioned colors Y, M, C, and K are transferred onto the sheet material. When forming an image on both sides of the sheet material, control is performed such that after passing through the fixing section 205, the sheet material passes along a conveying path also towards the image forming section 204.

The printer control section communicates with the device control section 102 through a dedicated interface, and executes control of the printer section 106 in accordance with instructions from the device control section 102. The printer control section also notifies the state of each section thereof to the device control section 102.

Next, an overview of the operations of each section from a power off state until a state in which start of operations is enabled will be described.

First, when the power is turned on, the printer control section instructs the scanner section 201, the laser exposing section 202, the image forming section 204, the fixing section 205 and the sheet feeding/conveying section 206 to start preparatory operations, and waits for the start of communication with the device control section 102. When communication is established with the device control section 102, the printer control section and the device control section 102 exchange their respective device specifications.

Thereafter, when the preparatory operations of each section are completed and image forming operations are enabled, the printer control section notifies the device control section 102 that it is in an operation enabled state. The printer control section notifies the device state of each section to the device control section 102, and one example thereof will now be described. First, the sheet feeding/conveying section 206 detects the size of a sheet material stored in the storage cassette 210, the remaining amount (load) of the sheet material stored in the storage cassette 210 and the operating state (whether operation is enabled or there is a failure) of a driver section, and notifies the result to the device control section 102. Next, the image forming section 204 notifies the amount of toner stored in toner storage containers for each of the colors Y, M, C and X and the like to the device control section 102.

Next, an overview of the operations of each section from the timing at which an operation instruction is notified from the device control section 102 in a state in which start of operations is enabled until a series of print operations is executed and completed will be described.

First, the device control section 102 sends a command to start operation to the printer control section. Upon receiving the command to start operation, the printer control section instructs the laser exposing section 202, the image forming section 204, the sheet feeding/conveying section 206 and the fixing section 205 to start print operations. The laser exposing section 202 starts rotation of a motor (polygon motor) that drives the polygon mirror. The image forming section 204 rotationally drives the photosensitive drum 203 and charges the photosensitive drum 203. The fixing section 205 turns the heater on, and increases the temperature thereof to one at which toner on a sheet material can be fixed to the sheet material. The sheet feeding/conveying section 206 enters a state in which driving of the motor is enabled.

When the operation preparations of each section of the apparatus are in order, the printer control section notifies the device control section 102 that preparations are complete. Upon receiving the preparations complete notification from the printer control section, the device control section 102 next issues an instruction to perform a print operation in page units. For example, for a print job of 20 copies each of which consist of ten pages, the device control section 102 outputs a print operation instruction for 200 pages.

Upon receiving the print operation instruction, the printer control section first instructs the image forming section 204 to commence image formation, and then outputs a sheet feed instruction to the sheet feeding/conveying section 206 at a predetermined timing. If it is possible to feed a sheet material, the sheet feeding/conveying section 206 feeds one sheet of sheet materials to wind the sheet material around the transfer drum 220 of the image forming section 204. In the case where there is no sheet material in the storage cassette 210 or the like and it is not possible to feed a sheet, the sheet feeding/conveying section 206 notifies the printer control section that sheet feeding is not possible.

The sheet feeding/conveying section 206 includes a multi feed detection sensor that detects a state in which sheet materials are conveyed in an overlapping state (multi feed state) on the conveying path and a thickness detection sensor that detects the thickness of sheet materials and the like. When these sensors detect a multi feed and/or abnormal state, the sheet feeding/conveying section 206 suspends the sheet feeding operation and conveying operation, and notifies the abnormality to the printer control section. In this case, the printer control section notifies the device control section 102 the reason for operation suspension and the position of the sheet materials that remain inside the apparatus and the like. When a sheet material is conveyed normally, the sheet material is wound around a predetermined position of the transfer drum 220 and rotated four times. As a result, a full-color toner image is transferred onto the sheet material. After the four rotations, the sheet material is separated from the transfer drum 220 and conveyed to the fixing section 205.

In the fixing section 205, control is carried out to monitor the temperature of the fixing section 205 to maintain a suitable fixing temperature. However, when a sheet material draws a large amount of heat from the fixing section 205, the temperature of the fixing section 205 may drop. In this case, the fixing section 205 notifies the printer control section of the drop in temperature of the fixing section 205. Upon receiving this notification, the printer control section creates intervals in the conveyance of the sheet materials so that the temperature of the fixing section 205 does not decrease further. If the temperature of the fixing section 205 still does not return to a normal level, the printer control section performs control to temporarily suspend operation and then restart operation after the temperature has returned to the normal level. When discharge of all of the sheet materials is completed, the printer control section instructs each section to cease operation, and upon receiving a notification that operations have ceased from each section, the printer control section notifies the device control section 102 that the operation is completed.

Next, the construction of an image forming system will be described.

Figure 3:
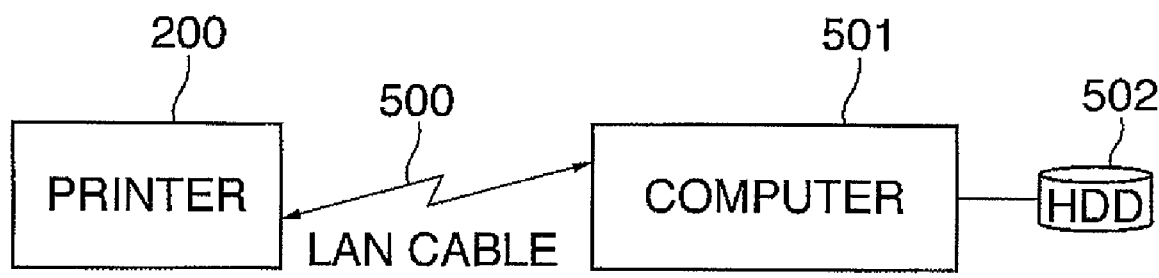
FIG. 3 is a block diagram showing the construction of an image forming system including the printer shown in FIG. 1.

FIG. 3 is a block diagram showing the construction of an image forming system including the printer shown in FIG. 1.

The image forming system is comprised of the printer 200 and a computer 501 that are connected through a LAN cable 500. The LAN cable 500 is connected to the PDL section 112 inside the printer 200. The computer 501 has a hard disk 502 for storing image data.

The computer 501 is arranged such that image data that is stored on the hard disk 502 is read out, and the image data is sent to the printer 200 via the LAN cable 500.

Next, the configuration of the image server section 110 will be described.

Figure 4:
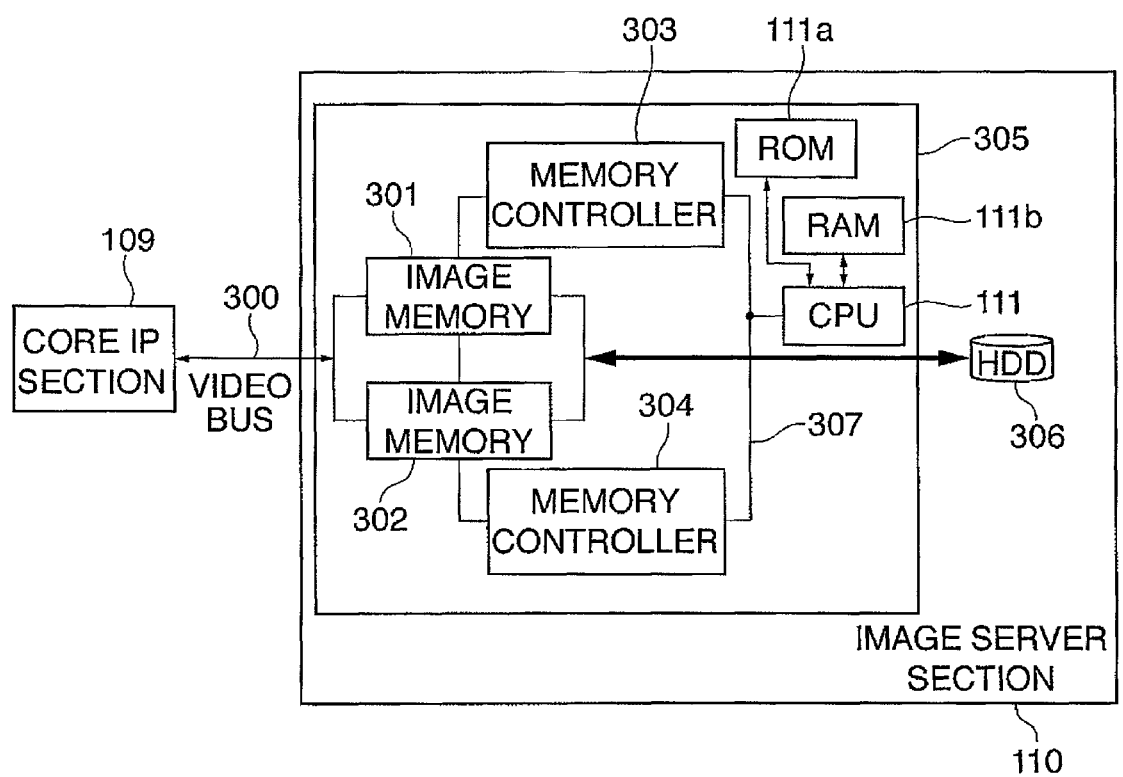
FIG. 4 is a block diagram showing the configuration of an image server section in FIG. 1.

FIG. 4 is a block diagram showing the configuration of the image server section 110 shown in FIG. 1.

The image server section 110 has image memories 301 and 302. The image memories 301 and 302 are controlled by memory controllers 303 and 304, respectively, and they each have the capacity to capture image data of an A4 size sheet. The memory controllers 303 and 304 are connected to a CPU 111 through a control bus 307, and are controlled by the CPU 111. The CPU 111 is connected to a ROM 111a that stores control programs that are executed by the CPU 111, and a RAM 111b that serves as a work area of the CPU 111. The image server section 110 implements control operations as described later through execution by the CPU 111 of control programs stored inside the ROM 111a.

Further, the image memories 301 and 302 are connected to the core IP section 109 via a video bus 300, and input and output image data to and from the core IP section 109. The image memories 301 and 302 are also connected to a hard disk (HDD) 306. Image data that is stored in the image memories 301 and 302 is ultimately stored on the hard disk 306.

Since the image server section 110 has the two image memories 301 and 302, the image server section 110 can perform double buffer processing. That is, while an image in one of the image memories is being written on the hard disk 306, image data is received from the core IP section 109 using the other image memory. When an image size exceeds an A4 size, the two image memories 301 and 302 can be used in conjunction (as one memory) to be used as a cascade buffer.

The internal configuration of the hard disk 306 will now be described.

Figure 5:
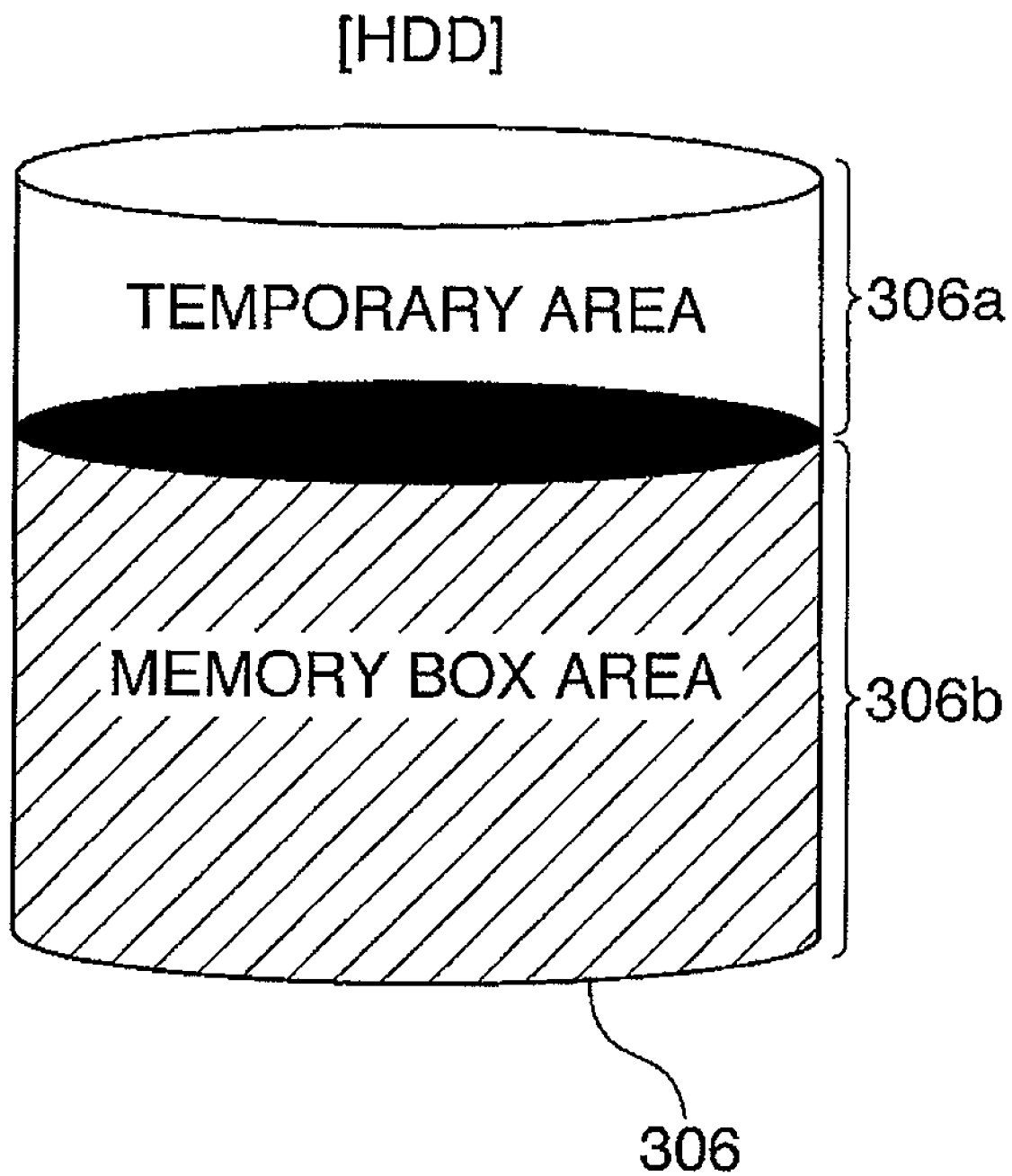
FIG. 5 is a conceptual diagram showing the internal configuration of the hard disk shown in FIG. 4.

FIG. 5 is a conceptual diagram showing the internal configuration of the hard disk 306 shown in FIG. 4.

The hard disk 306 has a temporary area 306a and a memory box area 306b. The temporary area 306a is an area that temporarily stores image data to perform processing to return image data that has been transferred to the external computer 501 to the printer 200 again (explained in detail later) or electronic sorting processing or the like. The image data in the temporary area 306a is then erased after processing is completed. The memory box area 306b is an area for registering image data.

According to the present embodiment, for example, there are 100 memory boxes within the memory box area 306b, and a box number is assigned to each memory box. The capacity (allocation) of the temporary area 306a and memory box area 306b can be arbitrarily changed by a user. For example, in the case where the capacity of the hard disk 306 is one GB, 300 MB may be allocated to the temporary area 306a and 700 MB may be allocated to the memory box area 306b.

Registration processing relating to the memory boxes will now be described.

Figure 6:
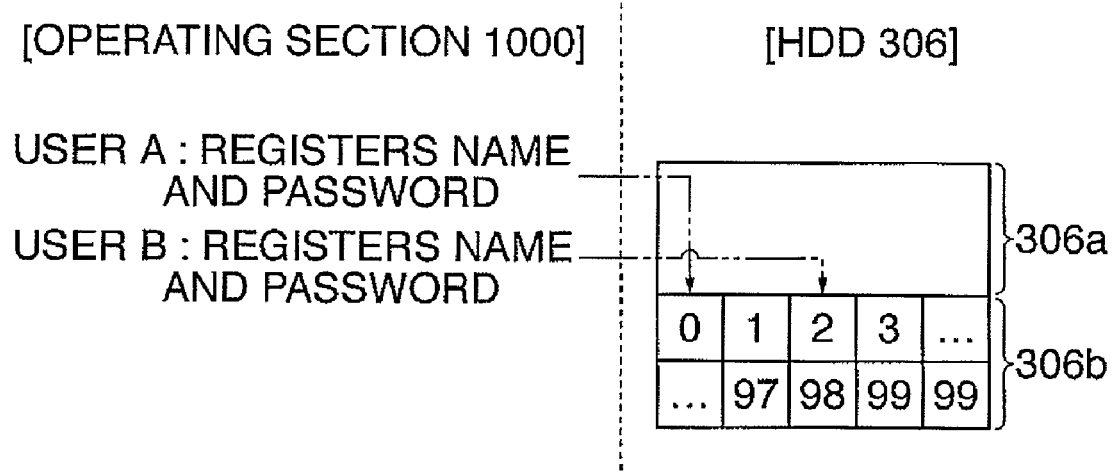
FIG. 6 is a conceptual diagram illustrating user registration processing for a memory box in the embodiment of the present invention.

FIG. 6 is a conceptual diagram illustrating user registration processing for a memory box according to the present embodiment.

As shown in FIG. 6, 100 memory boxes numbered from 0 to 99 are provided in the memory box area 306b of the hard disk 306, and user registration has previously been performed for each memory box. In the example shown in FIG. 6, a user A has registered an arbitrary name and password for a memory box with the box number "0" and has obtained possession of that box. Likewise, a user B has obtained possession of a memory box with the box number "2". This memory box registration is performed via the operating section 1000 of the printer.

FIG. 7 is a conceptual diagram illustrating link destination registration processing for a memory box. FIG. 7 shows a state in which the HDD 502 of the computer 501 is linked to each memory box of the hard disk 306. In this example, a link destination (1) 502a is set for the memory box 0, and a link destination (2) 502b is set for the memory box 2.

Hereunder, specific registration operations for user registration processing and link destination registration processing of memory boxes will be described with reference to FIGS. 8A to 8D and FIGS. 9A to 9C that show examples of display screens that are displayed when registering a memory box.

Figure 8A:
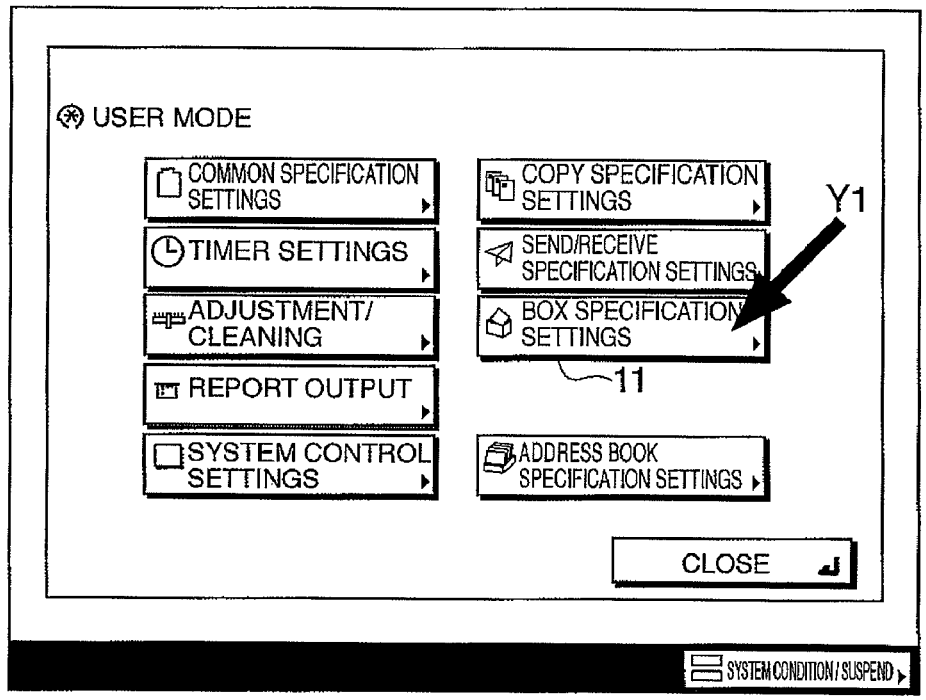
FIGS. 8A to 8D are views illustrating examples of a display screen that is displayed when registering a memory box.
Figure 8B:
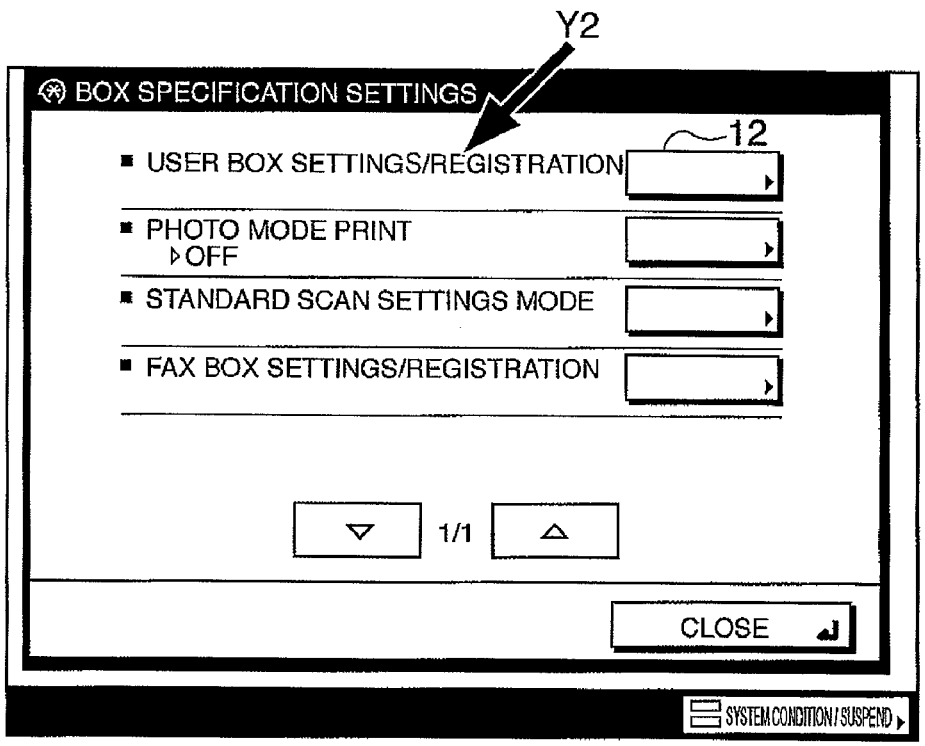
Figure 8C:
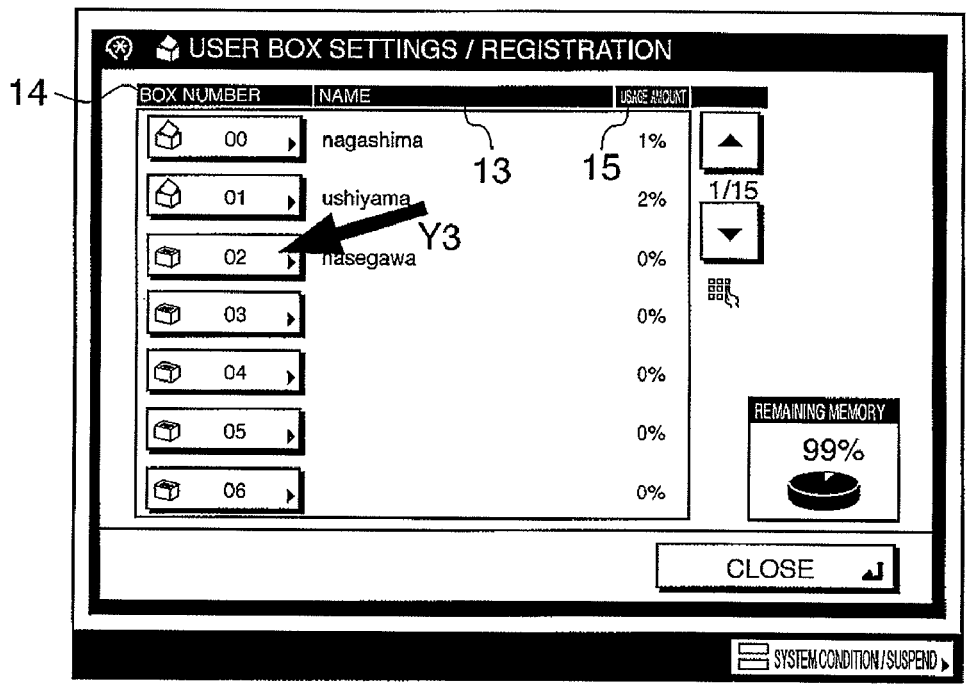
Figure 8D:
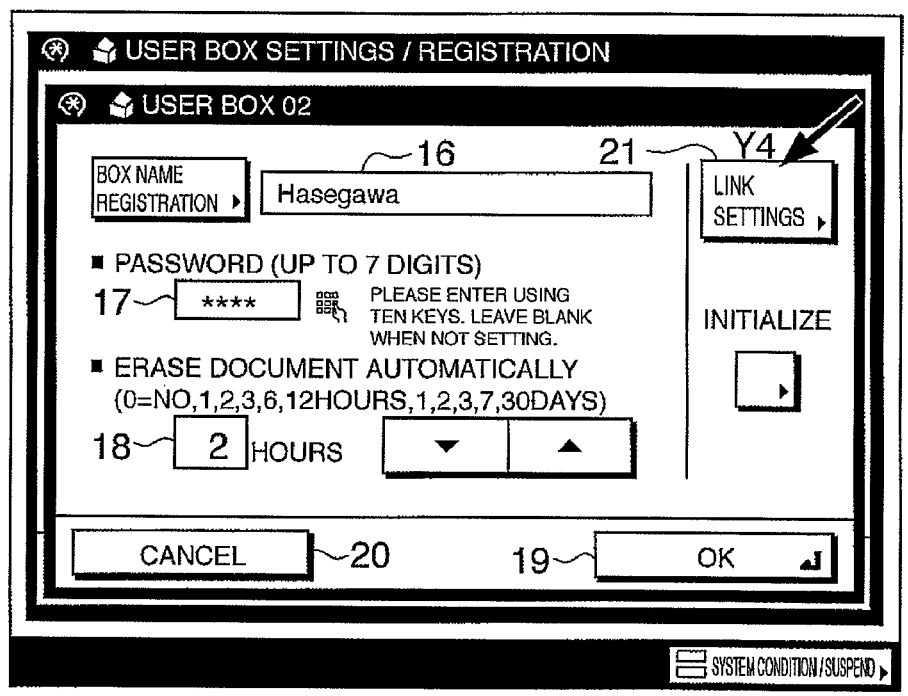
Figure 9A:
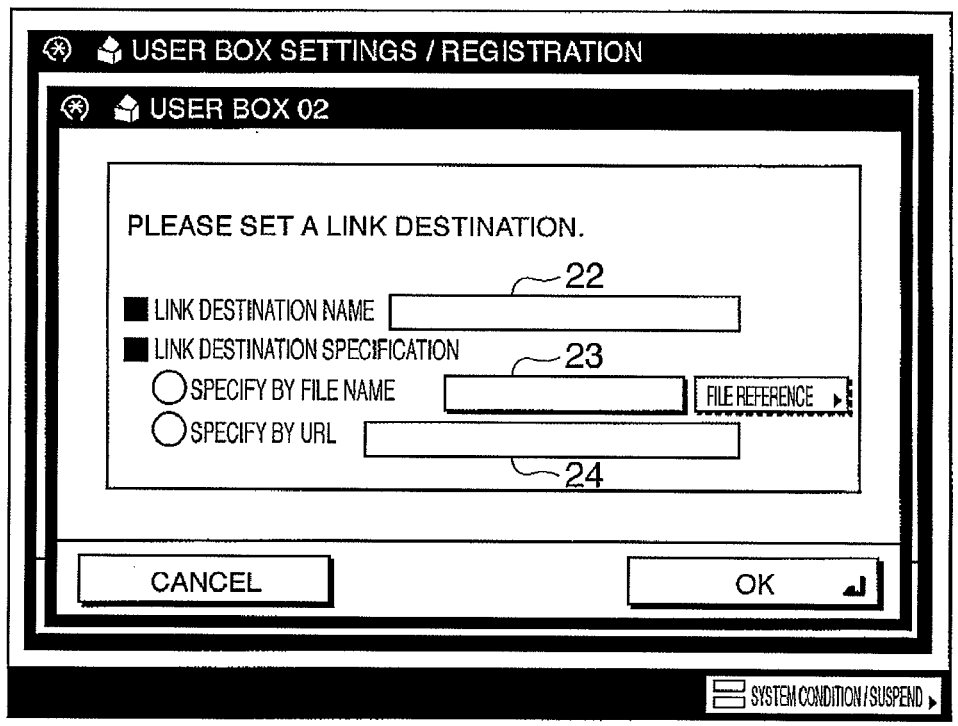
FIGS. 9A to 9C are views illustrating examples of a display screen that is displayed when registering a memory box.
Figure 9B:
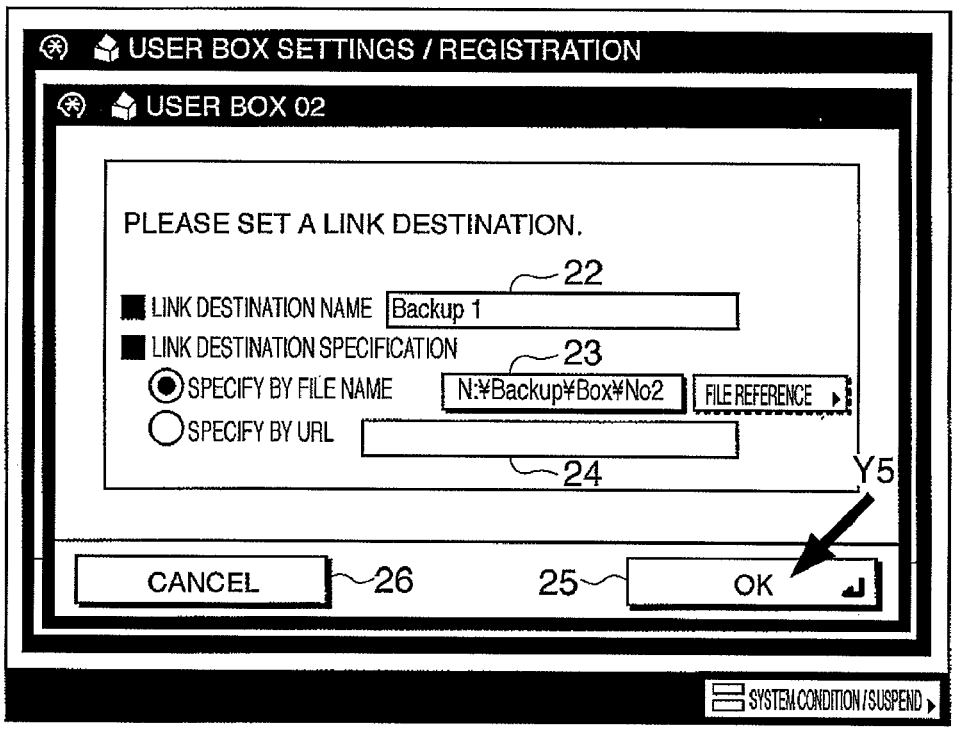
Figure 9C:
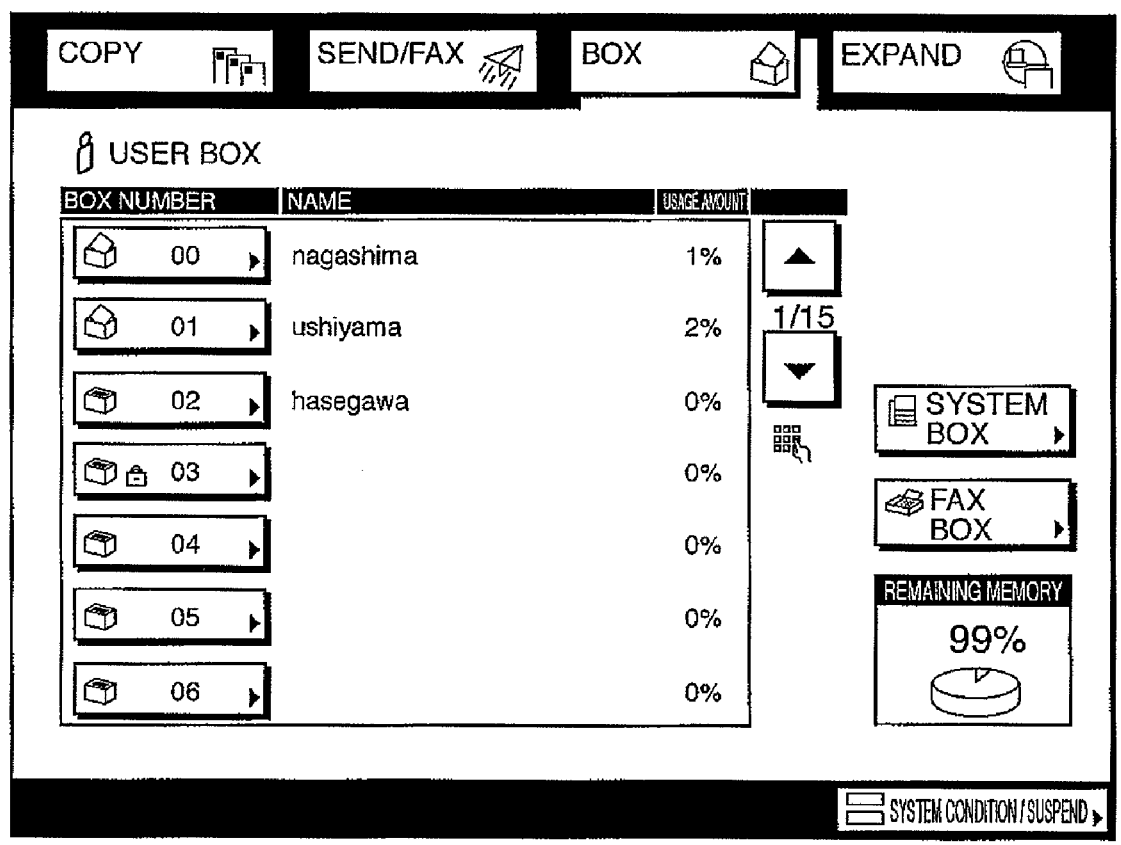

FIGS. 5A to 8D are views illustrating examples of a display screen that is displayed when performing user registration for a memory box, and FIGS. 9A to 9C are views illustrating examples of a display screen that is displayed when performing link destination registration for a memory box. These display screens are displayed on the touch panel of the display section 1001 when the functions key of the switch section 1002 on the operating section 1000 is pressed.

First, when a user touches a "box specification setting" button 11 (Y1) on a user mode screen of FIG. 8A, the display shifts to a box specification setting screen shown in FIG. 8B. When the user selects button 12 for the item "user box settings/registration" (Y2) on the box specification setting screen, a "user box settings/registration" screen (FIG. 8C) is displayed.

As shown in FIG. 8C, on the "user box settings/registration" screen are displayed a "name" 13 and a "usage amount" 15 of each memory box, and a "memory usage amount" (not shown) that shows the overall usage amount of the memory boxes. In order to set a memory box, the user selects a "box number" button 14. In this connection, it is possible for the "box number" button 14 to display whether a password has been registered for the memory box in question or the like. When the user selects the "box number" button 14, the display shifts to a setting screen shown in FIG. 8D. In this case, for example, the user selects the "box number" button for box number "02" (Y3).

On the setting screen shown in FIG. 8D, the user enters an arbitrary name (in this example "hasegawa") in a name entry area 16 in order to register a name for the memory box, and enters a password in a password entry area 17 when registering a password for the memory box. Further, when making a time setting in order to automatically erase document data registered in the memory box, the user enters a time until the data is to be erased in an automatic erase area 18. These settings come into effect when the user selects an "OK" button 19, and are cancelled if the user selects a "cancel" button 20.

When the user touches a "link destination settings" button 21 (Y4) on the setting screen shown in FIG. 8D, the display shifts to a setting screen (FIG. 9A) for setting a link destination to which document data stored in the memory box is transferred.

On the setting screen shown in FIG. 9A, in addition to a name entry area 22 for entering the name of a link destination, a specification by file name area 23 and a specification by URL area 24 are provided as entry areas for specifying a link destination. The screen shown in FIG. 9B shows a state in which respective entries have been done for these entry areas. These settings come into effect when the user selects an "OK" button 25 (Y5), after which the display shifts to the settings/registration completion screen shown in the following FIG.

9C. In contrast, if the user selects a "cancel" button 26 on the screen shown in FIG. 9B, the settings are cancelled.

On the settings/registration completion screen shown in FIG. 9C, the memory box name "hasegawa" is displayed for the box number "02", and it can be understood that a memory box was created for which a link destination was set as described above (Y6).

Next, the operations of the image forming system according to the present embodiment will be described.

Figure 11:
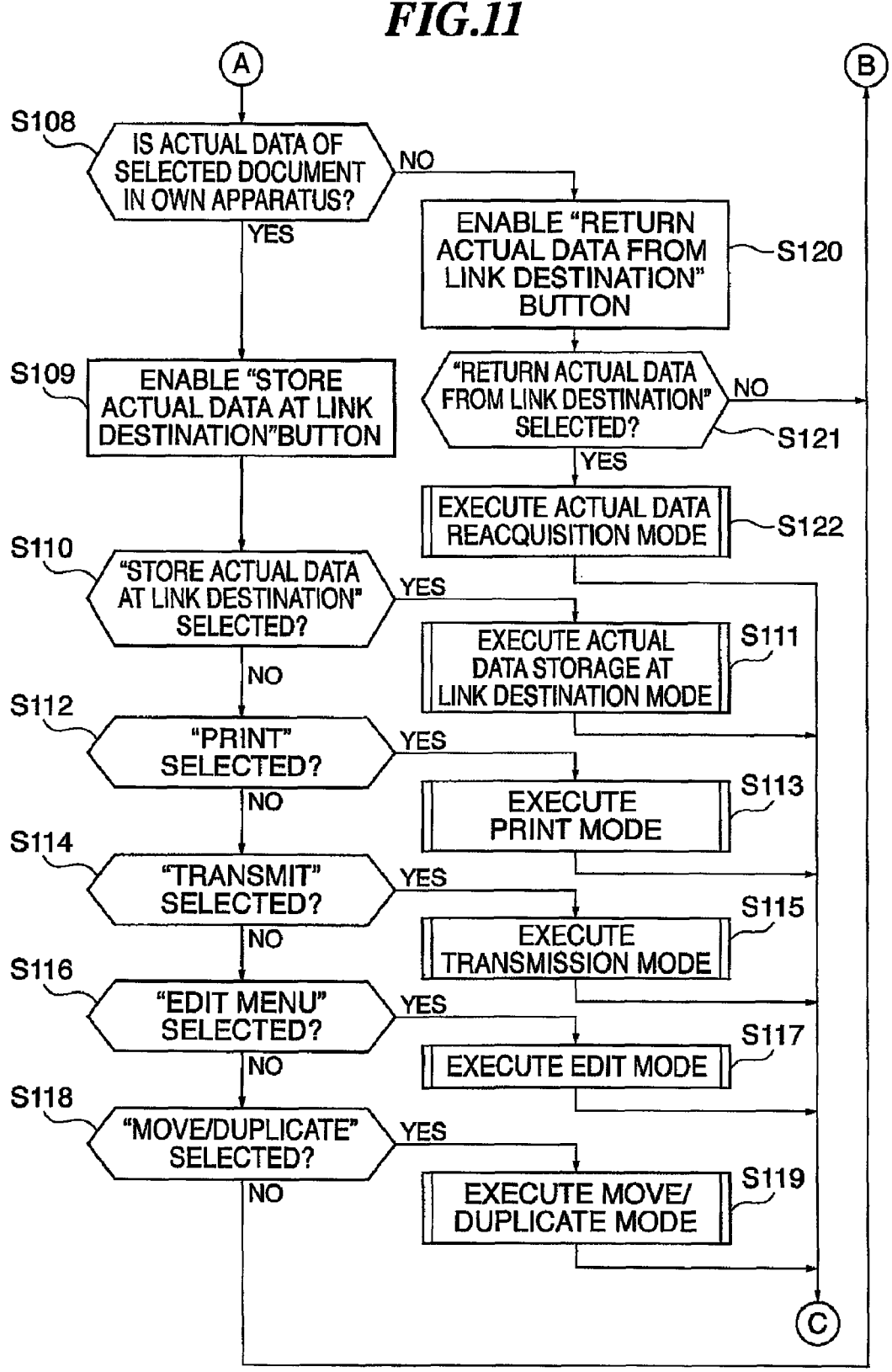
FIG. 11 is a continuation of the flowchart shown in FIG. 10.

First, operations (A) to (G) that use the memory boxes that was registered as described above will be explained in detail with reference to the flowcharts of FIGS. 10 and 11 and the like. FIGS. 10 and 11 are flowcharts that illustrate the overall processing of operations using the memory boxes in the image forming system according to the present embodiment.

(A) Scan Mode

Figure 12:
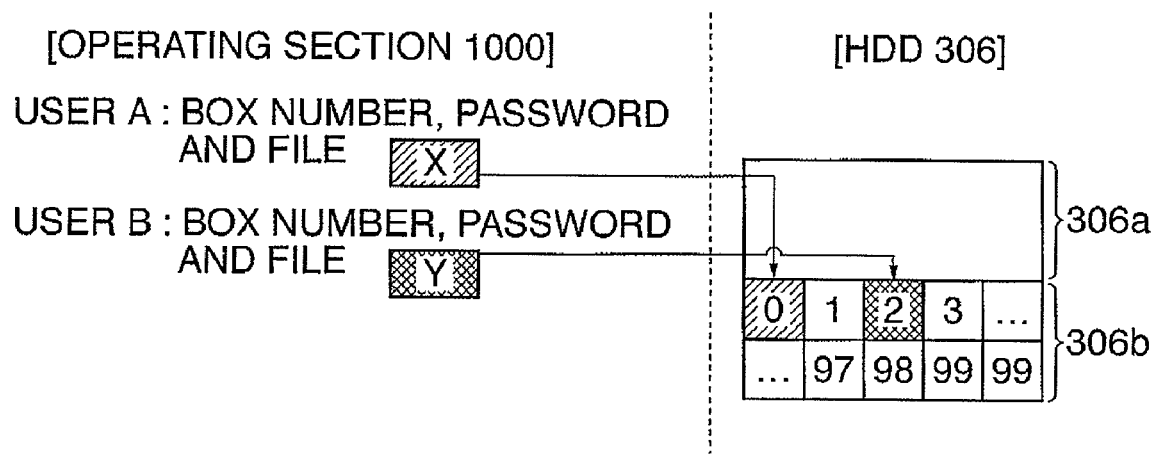
FIG. 12 is a conceptual diagram that illustrates a process for storing image data in a memory box.

FIG. 12 is a conceptual diagram that illustrates a process for storing image data (document) in a memory box in the present embodiment.

FIG. 12 shows an example in which, at the operating section 1000, the user A specifies the box number "0" and a password to store image data X in memory box 0, and the user B specifies the box number "2" and a password to store image data Y in memory box 2. In this connection, a different password is used for each memory box. Further, other information (such as the stored date, time, file name, number of pages, data amount of the image data) that is attached to the image data is also stored when storing the image data in the specified memory box.

Hereunder, the original scan mode of the present embodiment will be described using the flowchart of FIG. 10 and the display screen views of FIGS. 13A to 13D. In FIG. 10, processing from a step S101 to a step S107 and processing of a step S123 and a step S124 shown are executed by the CPU 101, and processing of a step S125 and a step S126 is executed by the CPU 104.

Figure 13A:
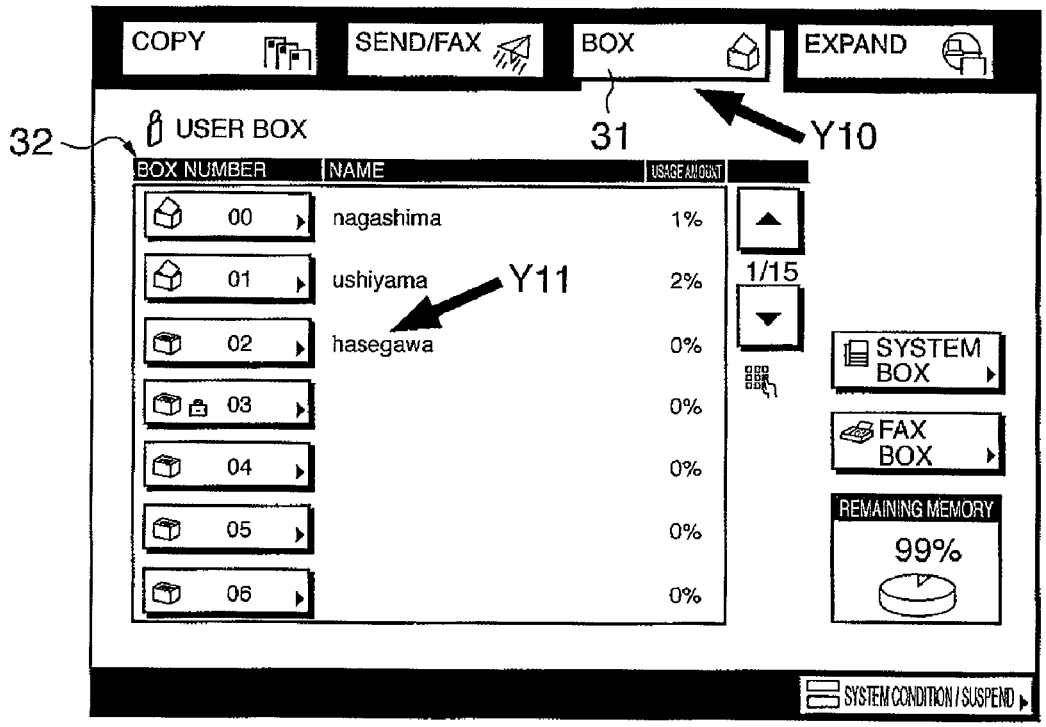
FIGS. 13A to 13D are views illustrating examples of a display screen that is displayed when performing processing to store image data in a memory box.

First, in order to use the memory box function the user selects the functions key on the key switch section 1002, and then selects a "box" button 31 on a screen shown in FIG. 13A that is displayed on the touch panel of the display section 1001 (step S101, Y10 in FIG. 13A). As a result, the CPU 103 controls the display section 1001 to display a screen 32 that shows a list of the memory boxes on the touch panel of the display section 1001 (step S102). It can be understood from the screen 32 that, for example, user registration has been performed for the three memory boxes 00 to 02.

Figure 13B:
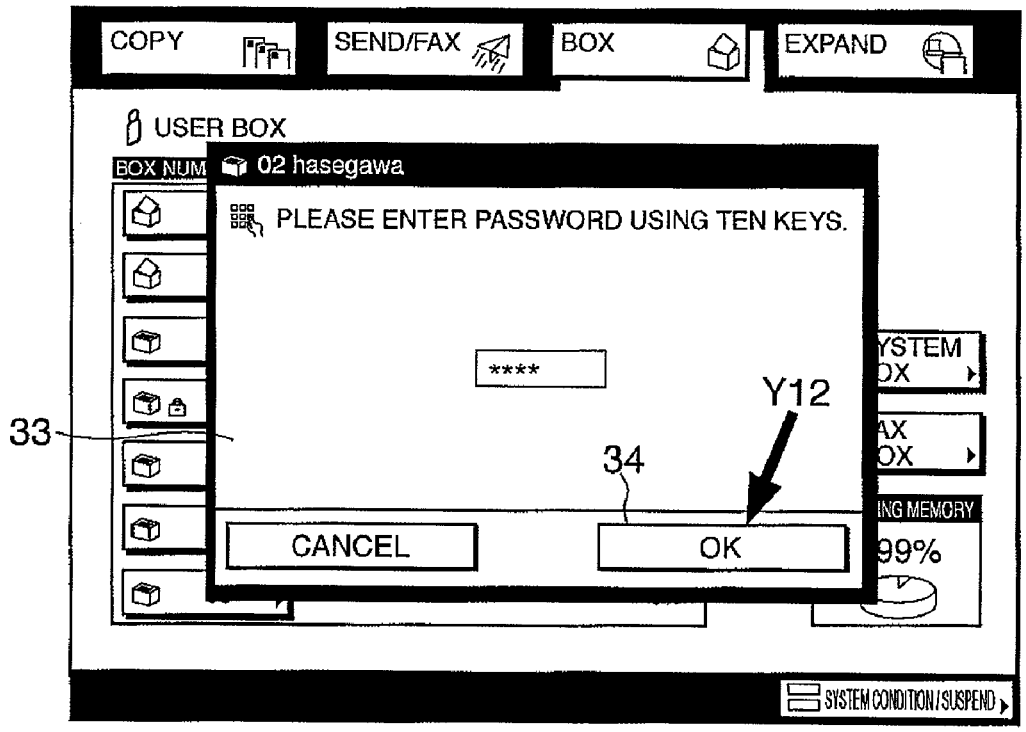

Next, when the user, for example, selects the memory box 02 on the screen shown in FIG. 13A (step S103, Y11 in FIG. 13A), the CPU 103 advances the processing to a step S104 to determine whether or not a password is set for the selected memory box 02. When a password is set, the CPU 103 controls the display section 1001 to display a screen 33 as shown in FIG. 13B on the touch panel to request the user to enter a password (step S105).

Figure 13C:
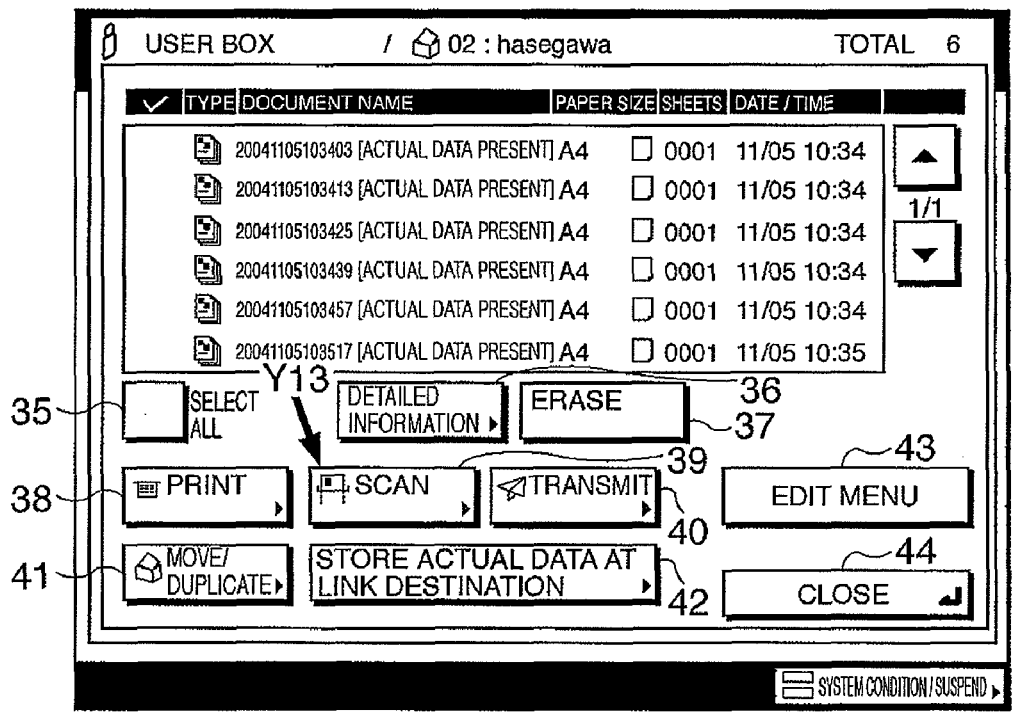

When the user touches a "OK"; button 34 after entering a password (Y12), the CPU 103 controls the display section 1001 to display a screen as shown in FIG. 13C that shows a list of documents inside the memory box 02 on the touch panel of the display section 1001 (step S106). When the image data is stored on the HDD 306 of the printer in question, for example, the message "actual data present" is displayed on the screen shown in FIG. 13C.

Subsequently, in a step S107, the CPU 103 judges whether or not a document was selected by the user. If the user touches a "select all" button 35, the CPU 103 selects all of the documents displayed on the document list screen. To select an individual document displayed on the document list screen, the user simply touches the document that is the selection object.

When a document was selected, the CPU 103 controls the display section 1001 to enable a "detailed information" button 36 for displaying the detailed information of that document, an "erase" button 37 for erasing the selected document, a "print" button 38 for printing the selected document, a "transmit" button 40 for performing transmission of the selected document, a "move/duplicate" button 41 for moving/duplicating the selected document, and an "edit menu" button 43 for editing the selected document. When a document is not selected, these buttons are disabled and a "scan" button 39 is enabled.

In the step S107, when the CPU 103 judged that the user did not select a document it advances the processing to a step S123. When the user selects the "scan" button 39 (Y13 in FIG. 13C) in step S123 and then selects the "Start" key on the key switch section 1002 in step S124, the CPU 104 of the device control section 102 controls the scanner section 105 to scan set originals (step S125) and store the scanned images in the selected memory box inside the apparatus (step S126).

Figure 13D:
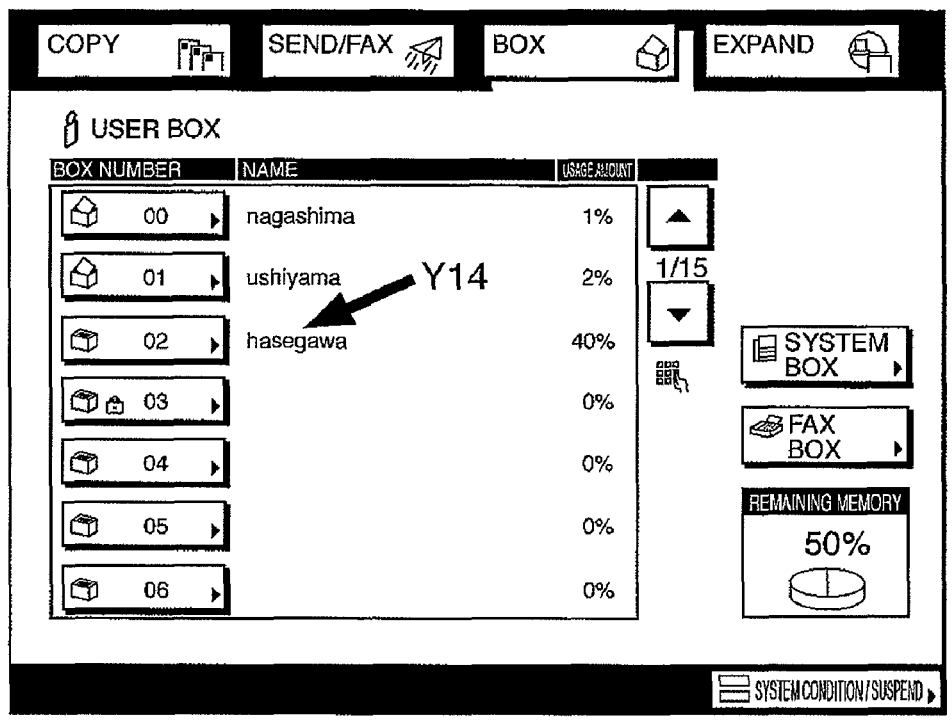

When storage of the scanned images is completed, the CPU 103 controls the display section 1001 to display a screen as shown in FIG. 13D on the touch panel. On the screen shown in FIG. 13D, the usage amount of the selected memory box 02 is displayed as 40%, and thus the user can recognize at a glance that the scanned images have been stored in the memory box 02.

The processing illustrated in FIG. 11 will be described later in correspondence with each mode.

(B) Actual Data Storage at Link Destination Mode

Next, the actual data storage at link destination mode that stores image data inside a memory box in the computer 501 as a link destination will be described.

Figure 14:
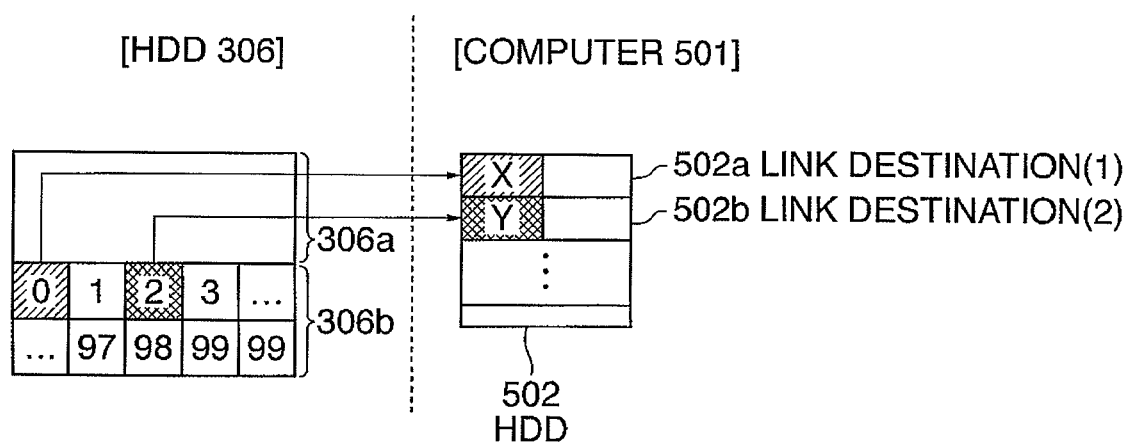
FIG. 14 is a conceptual diagram showing one example of actual data storage at link destination mode that is executed by the processing illustrated in FIG. 11.

FIG. 14 is a conceptual diagram showing one example of the actual data storage at link destination mode.

The example shown in FIG. 14 illustrates that, on the HDD 502 of the external computer 501 as a link destination, the image data X of the memory box 0 is stored in the link destination (1) area 502a and the image data Y of the memory box 2 is stored in the link destination (2) area 502b.

Hereunder, specific processing of the actual data storage at link destination mode will be described with reference to the flowcharts shown in FIGS. 10, 11 and 15 and display screen views shown in FIGS. 16A and 16B, 17, 18A and 18B, and 19 and the like.

In the step S107 of FIG. 10, when the user selects a document from the document list that was displayed in the step S106 (see FIG. 13C), the CPU 103 shifts the processing to a step S108 and onwards of FIG. 11. In the step S108, the CPU 103 determines whether or not the image data (actual data) of the selected document is stored on the HDD 306 of the printer 200. When the image data is stored in the printer 200, the CPU 103 enables a "store actual data at link destination" button 42 on the screen shown in FIG. 13C to allow selection thereof by the user (step S109).

Figure 15:
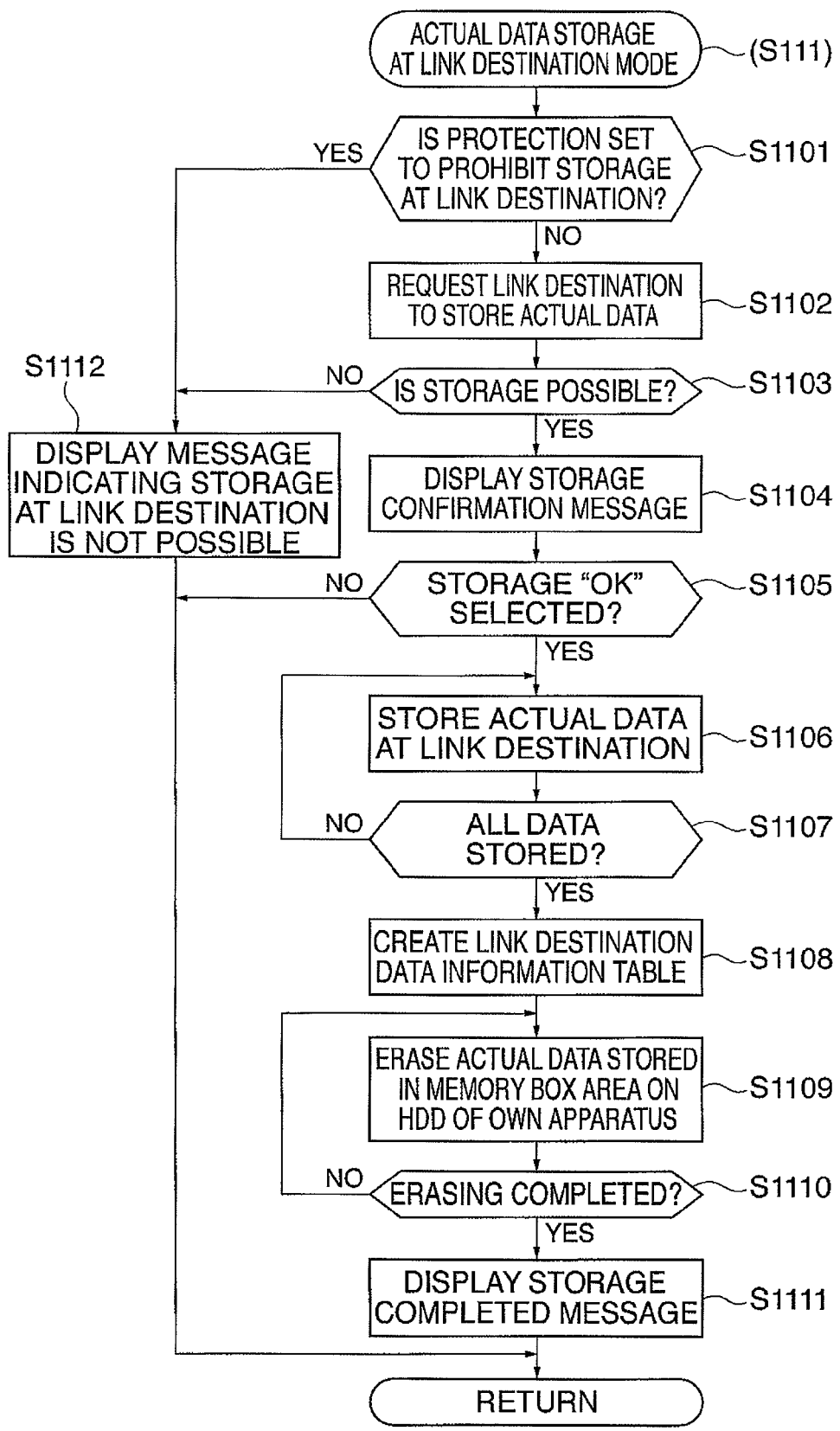
FIG. 15 is a flowchart showing detailed processing of the actual data storage at link destination mode.

Thereafter, when the "store actual data at link destination" button 42 that has been enabled is selected by the user (step S110, Y21 of FIG. 16A), the printer 200 implements the actual data storage at link destination mode as shown in FIG. 15 (step S111).

FIG. 15 is a flowchart showing detailed processing of the actual data storage at link destination mode (step S111) that is executed by the processing shown in FIG. 11.

In the actual data storage at link destination mode, first the CPU 103 checks whether or not storage of image data on the HDD 502 of the external computer 501 that is the link destination is prohibited (step S1101). When storage is not prohibited, the CPU 103 requests the link destination to store actual data that is currently stored on the HDD 306 of the printer 200 (step S1102). Based on the reply from the link destination, the CPU 103 judges whether or not the actual data can be stored at the link destination (step S1103). If storage is possible, the CPU 103 controls the display section 1001 to display a message screen 1901 for confirming storage, as shown in FIG. 16B, on the touch panel in front of the screen shown in FIG. 16A (step S1104).

Figure 16A:
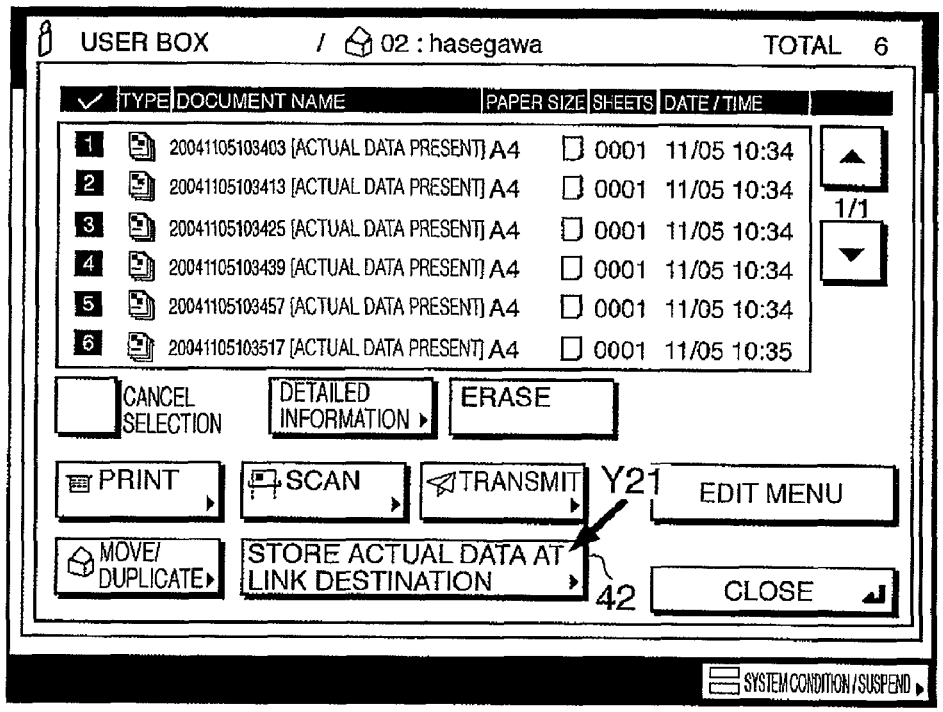
FIGS. 16A and 16B are views illustrating examples of a display screen that is displayed in the actual data storage at link destination mode.
Figure 16B:
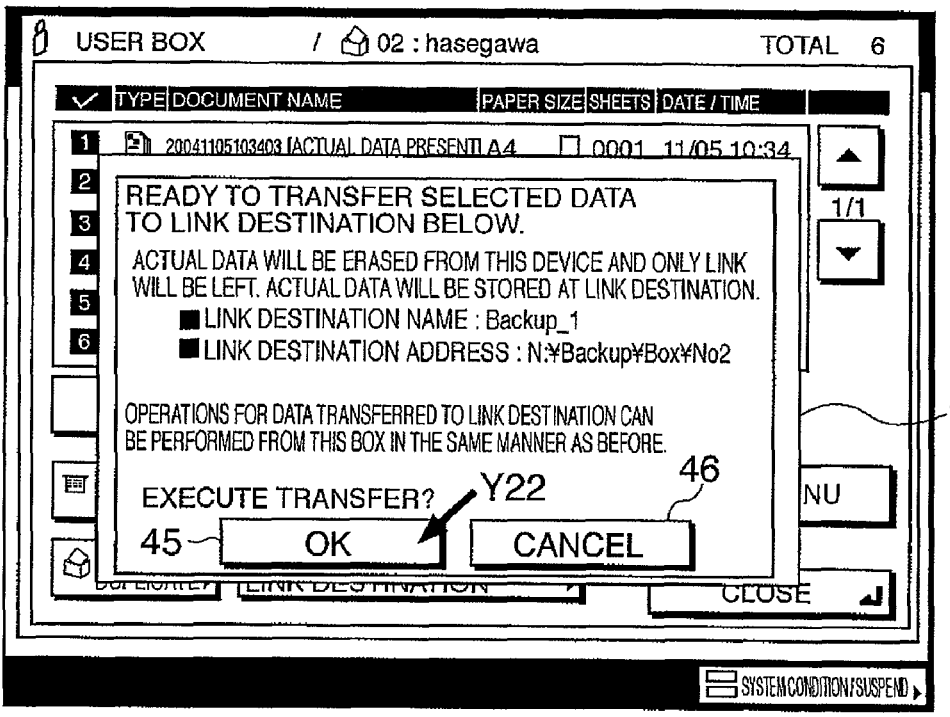

At this time, a message to confirm that the image data will be erased from the HDD 306 of the printer 200 after the data is stored at the link destination and the registered name and address of the link destination are displayed on the message screen 1901 of FIG. 16B, as well as an "OK" button 45 and a "cancel" button 46 for selecting whether or not to execute transfer of the actual data.

When the user touches the "OK" button 45 on the message screen 1901 shown in FIG. 16B (Y22 of FIG. 16B) to select to execute transfer of the actual data to the link destination (step S1105), storage of one page of the image data begins (step S1106), and the CPU 103 then checks whether the image data for all pages has been stored on the HDD 502 of the link destination (step S1107). At this time, processing to send the image data on the HDD 306 to the core IP section 109 is executed by the CPU 111, and processing to transmit that image data to the external computer 501 is executed by the CPU 103.

Figure 17:
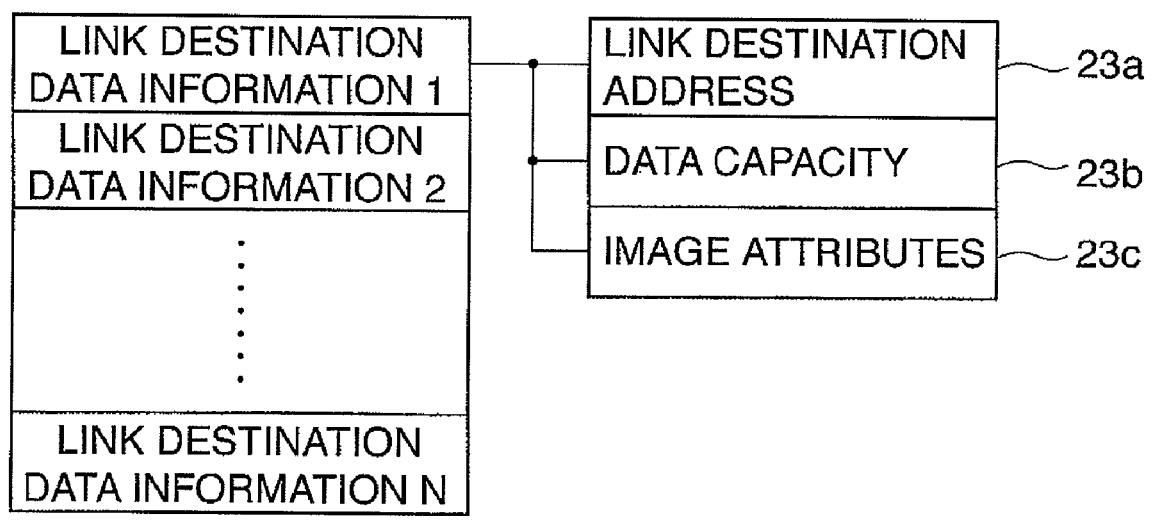
FIG. 17 is a view showing the structure of a link destination data information table created by the processing shown in FIG. 15.

After confirming that all pages of the image data were stored, the CPU 103 creates a link destination data information table and stores this table in the memory box in question (step S1108). FIG. 17 is a view that shows the structure of the link destination data information table created in the step S1108. As shown in FIG. 17, the link destination data information table stores a link destination address 23a, an image data capacity 23b, and image data attributes 23c as link destination data information.

After transfer of the actual data, the CPU 111 erases the image data that is the actual data in question that is stored in the memory box of the HDD 306 of the printer 200, one page at a time (step S1109). Since the selected image data that is stored in the memory box of the HDD 306 of the printer 200 is erased in this manner after the image data in question is transferred to the external computer 501, the amount of free space within the HDD 306 of the printer 200 increases. After all the pages of the image data are erased (step S1110), the CPU 103 controls the display section 1001 to display a message screen 1902 indicating that storage of the image data to the link destination is completed, as shown in FIG. 18A, in front of the existing display screen (FIG. 16A) on the touch panel (step S1111).

Figure 18A:
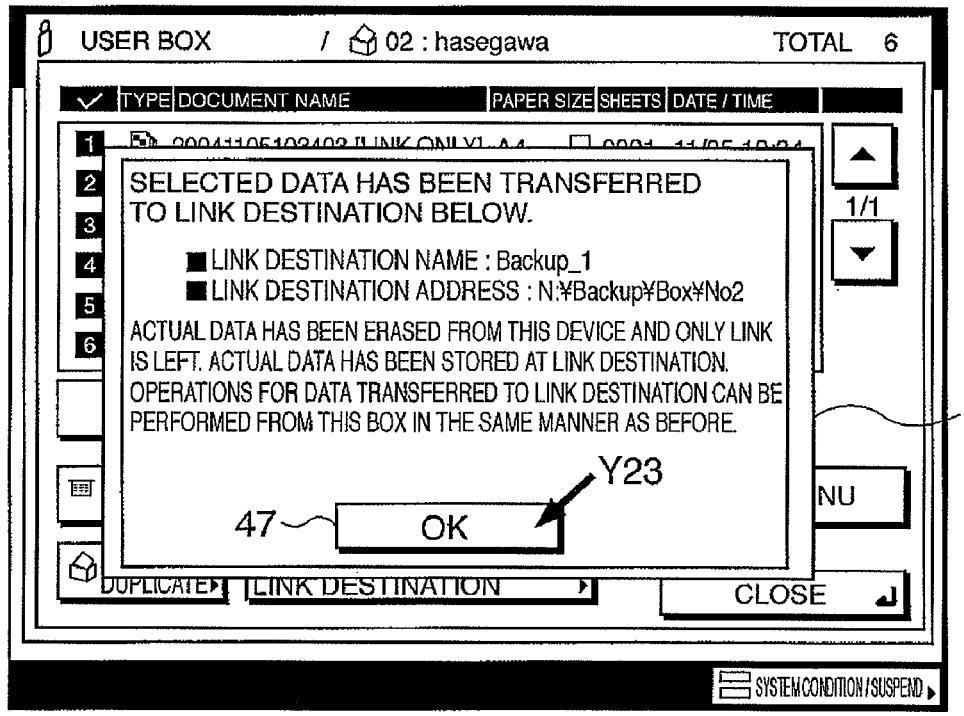
FIGS. 18A and 18B are views illustrating examples of a display screen that is displayed in the actual data storage at link destination mode.

At this time, on the message screen 1902 shown in FIG. 18A are displayed a message to the effect that the selected actual data has been stored at the link destination, the registered name and address of the link destination, a message to the effect that only the link destination data information remains in the memory box within the HDD 306 and the actual data was erased, and a message to the effect that the transferred data can be manipulated in a similar manner as before from the memory box. In addition, an "OK" button 47 for the user's confirmation of these messages is also displayed.

Figure 18B:
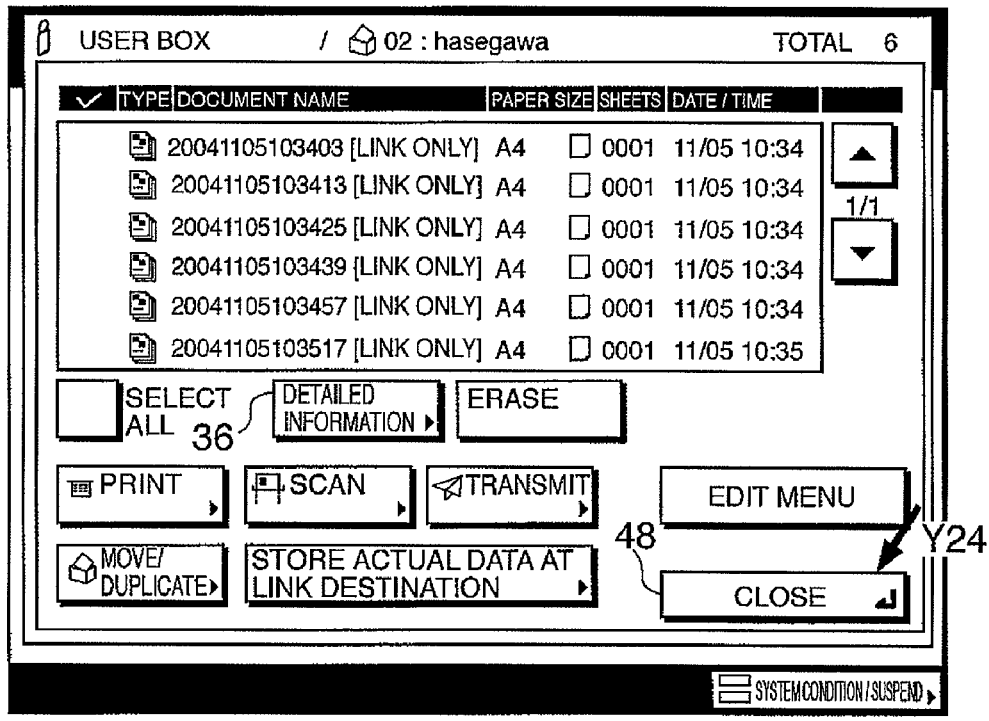

When the user touches the "OK" button 47 on the message screen 1902 shown in FIG. 18A (Y23 of FIG. 18A), the CPU 103 controls the display section 1001 to display a document list screen on the touch panel, as shown in FIG. 18B. On this document list screen, for example, the term "link only" is displayed for documents for which the actual data is stored at a link destination and is not present on the HDD 306 of the printer 200. Thus, the user can readily ascertain the storage location of the actual data.

Further, on the document list screen shown in FIG. 18B, when the user, for example, selects a document name "20041105103439" and touches the "detailed information" button 36, a detailed information screen can be displayed, as shown in FIG. 19, that shows detailed information for the selected document.

Figure 20A:
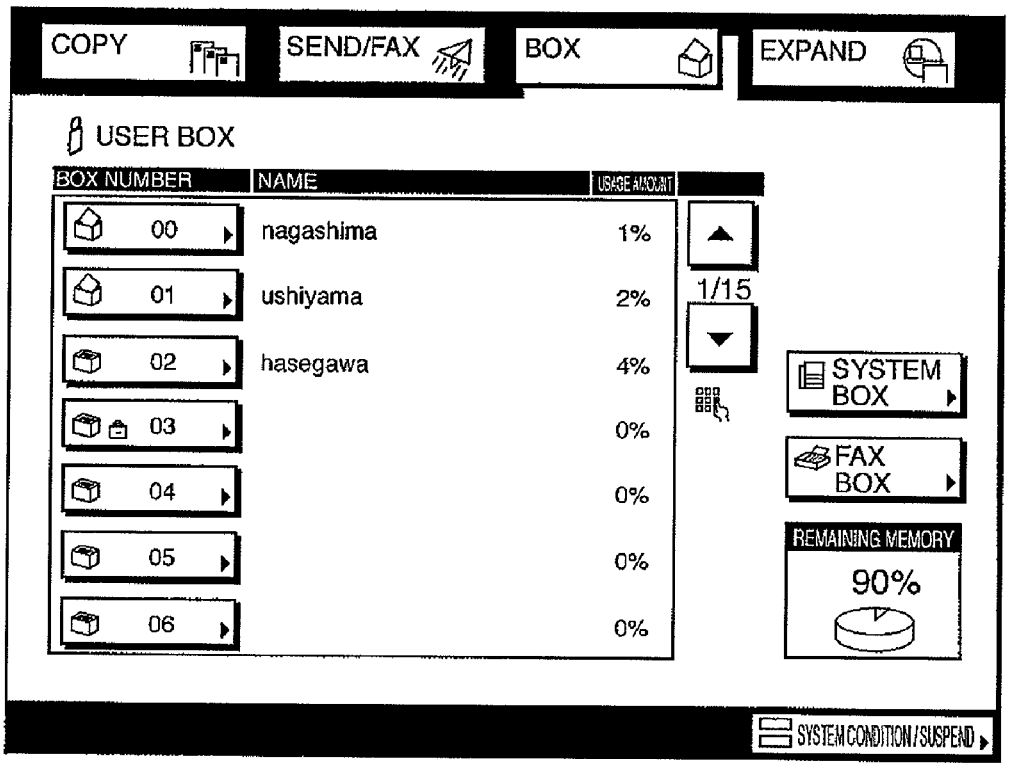
FIGS. 20A and 20B are views illustrating examples of a display screen that is displayed in the actual data storage at link destination mode.

When the user selects a "close" button 48 on the document list screen shown in FIG. 18B (Y24 of FIG. 18B), the CPU 103 controls the display section 1001 to display a mail box list display screen, as shown in FIG. 20A, on the touch panel. On this mail box list display screen, the usage amount of the mail box of box number 02 is displayed as "4%", which indicates a sharp decrease from the usage amount "40%" of the same mail box 02 (see the screen of FIG. 13D) prior to transferring the actual data. Based on this display, the user can readily recognize that the actual data was transferred to the link destination and only the link destination data information is stored in the memory box inside the HDD 306 of the printer 200.

Figure 20B:
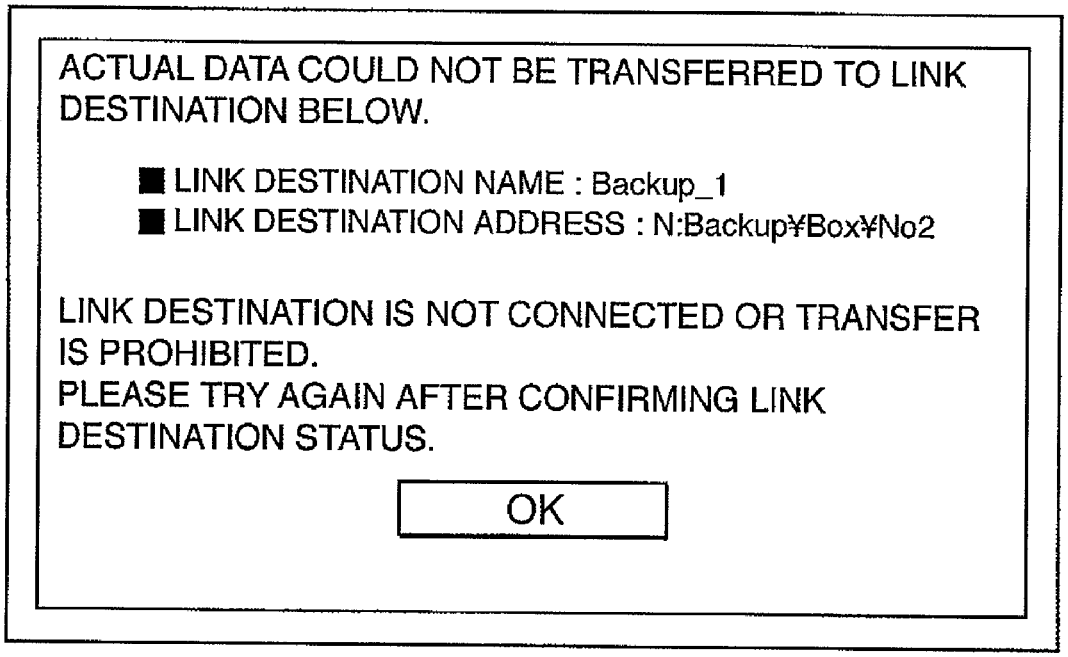

Meanwhile, when the CPU 103 judges in the aforementioned step S1101 that storing of image data on the HDD 502 of the link destination is prohibited or judges in the aforementioned step S1103 that storage of actual data at the link destination is not possible, the CPU 103 controls the display section 1001 to display a message screen indicating that storage is not possible, as shown in FIG. 20B, on the touch panel (step S1112).

Figure 21A:
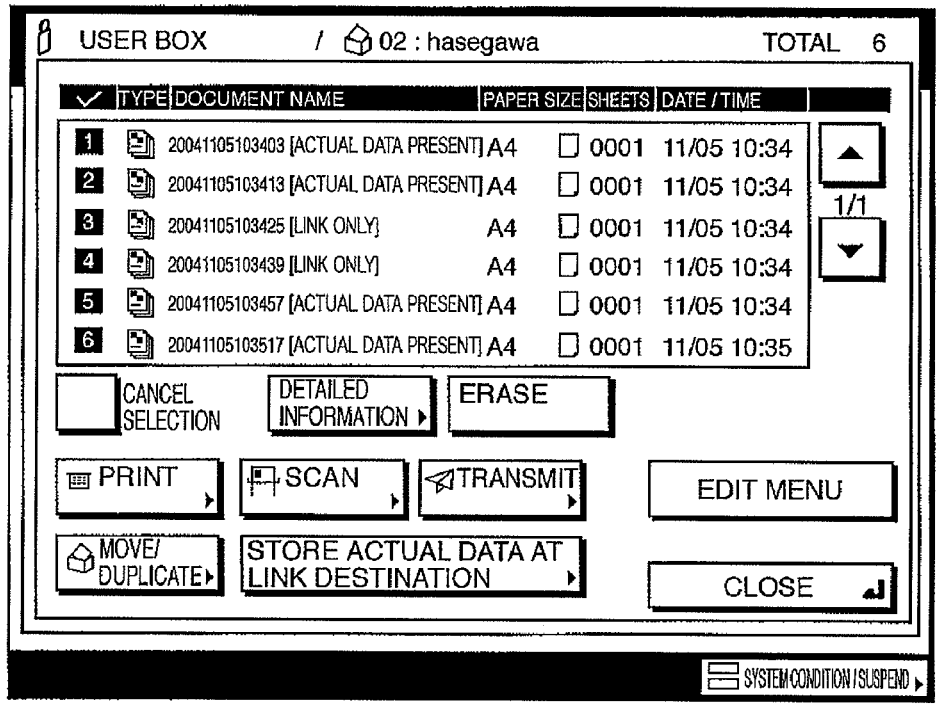
FIG. 21A is a view showing an example of a display screen that is displayed in the actual data storage at link destination mode.

Although the above description described a case in which the user touched the "select all" button 35 on the screen shown in FIG. 13C to transfer all of the documents in the mail box to the link destination at one time, the user may also select individual documents in the mail box to transfer the document to the link destination. In this case a screen as shown in FIG. 21A will be displayed for the document list screen instead of the screen shown in FIG. 18B, and the display will include a mixture of the messages "actual data present" and "link only".

Figure 21B:
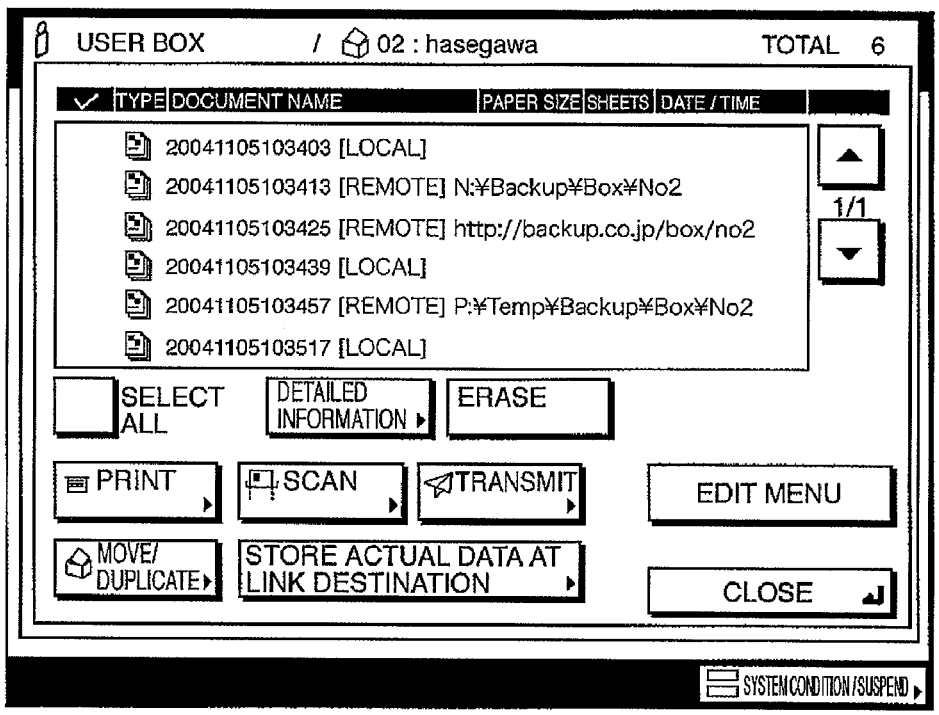
FIG. 21B is a view showing other example of a display screen that is displayed in the actual data storage at link destination mode.

As another display example of the document list screen, for example, the screen shown in FIG. 21B may be employed. More specifically, when the actual data is stored in a memory box inside the HDD 306 of the printer 200 the term "local" is displayed, and when the actual data is stored at the link destination the term "remote" is displayed together with the address of the link destination. By adopting this format for the document list screen, the link destination can be known at a single glance.

(C) Print Mode

Next, the print mode in the image forming system according to the present embodiment will be described.

Figure 22:
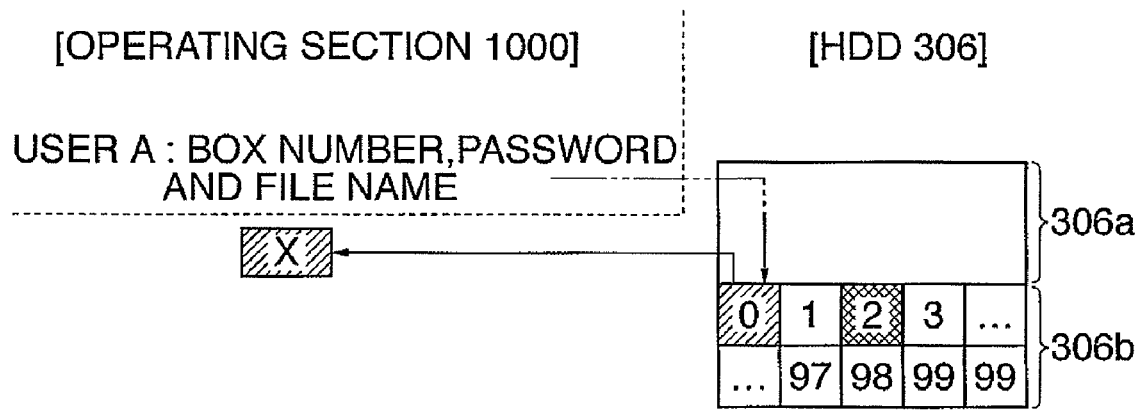
FIG. 22 is a conceptual diagram illustrating processing for printing a document that is stored in a memory box in the embodiment of the present invention.

FIG. 22 is a conceptual diagram illustrating a process for printing a document (image data) that is stored in a memory box inside the HDD 306 of the printer 200 in the image forming system according to the present embodiment.

For example, to print the image data X that is stored in the memory box 0, as shown in FIG. 22, the user enters the memory box number 0, the password corresponding to this memory box 0, and the file name of the image data X from the operating section 1000 of the printer 200.

Since image data stored in a memory box cannot be printed unless a password corresponding to the memory box in question is entered, the image data cannot be arbitrarily printed from the printer 200. Accordingly, a case does not occur in which image data of one user is printed together image data printed by another person, or in which the data can be viewed by another person.

Figure 23:
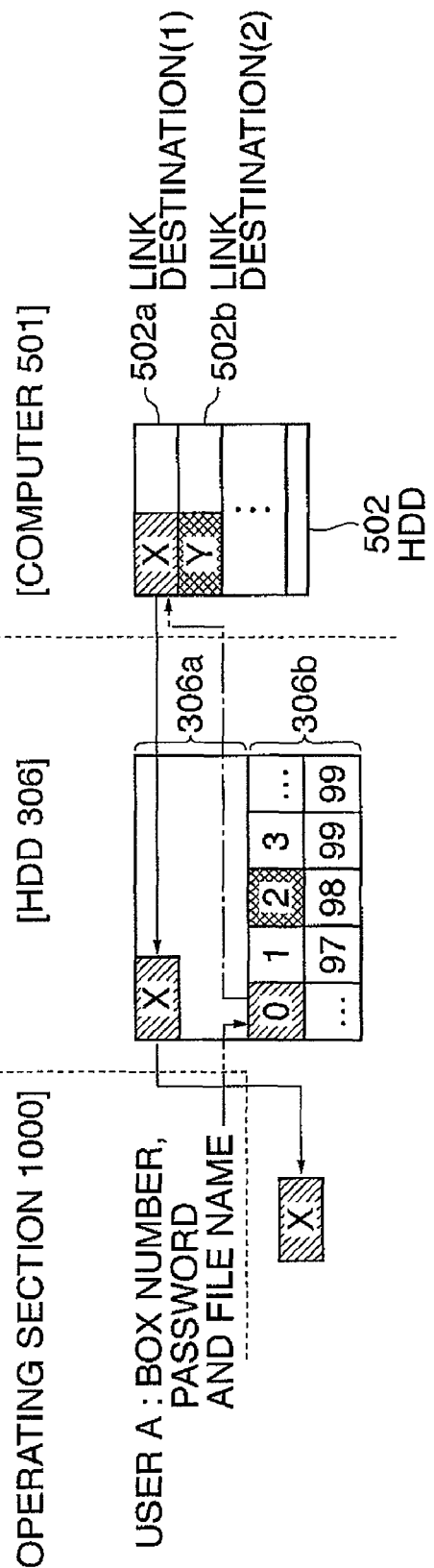
FIG. 23 is a conceptual diagram illustrating processing for printing image data when the image data is stored in a computer as a link destination.

FIG. 23 is a conceptual diagram illustrating a process for printing image data when the image data is stored on the HDD 502 of the computer 501 as the link destination instead of a memory box on the HDD 306 of the printer 200.

In the example shown in FIG. 23, the user A and the image data X are registered in the memory box 0, and the actual data of the image data X is stored at the link destination (1) 502*a*. In order to print this image data X, the actual data that is stored at the link destination (1) 502*a* is temporarily stored in the temporary area 306*a* inside the HDD 306 of the printer 200, and printing is then carried out using the actual data that is temporarily stored in the temporary area 306*a*.

Hereunder, for the image forming system according to the present embodiment, a process for printing image data that is stored in a memory box on the HDD 306 of the printer 200 and a process for temporarily storing in the temporary area 306*a* inside the HDD 306 of the printer 200, image data that is stored on the HDD 502 of the computer 501 as the link destination and printing that image data will be described.

First, in the step S107 of FIG. 10, the CPU 103 confirms that the user selected a document (image data) to be printed from the document list screen (FIG. 13C) of the memory box. The subsequent processing shifts to the processing flow shown in FIG. 11.

If the actual data of the selected document is in the memory box area 306*b* on the HDD 306 of the printer 200 (step S108 of FIG. 11), the CPU 103 controls the display section 1001 to enable the "store actual data at link destination" button 42 (see FIG. 13C) (step S109), and unless the user selects the "store actual data at link destination" button 42, the process advances to a step S112.

In the step S112, the CPU 103 judges whether or not the user selected the "print" button 38 (see FIG. 13C). When the "print" button 38 has been selected, the printer 200 executes the print mode in accordance with a processing flow shown in FIG. 24 and FIG. 25 (step S113).

Figure 24:
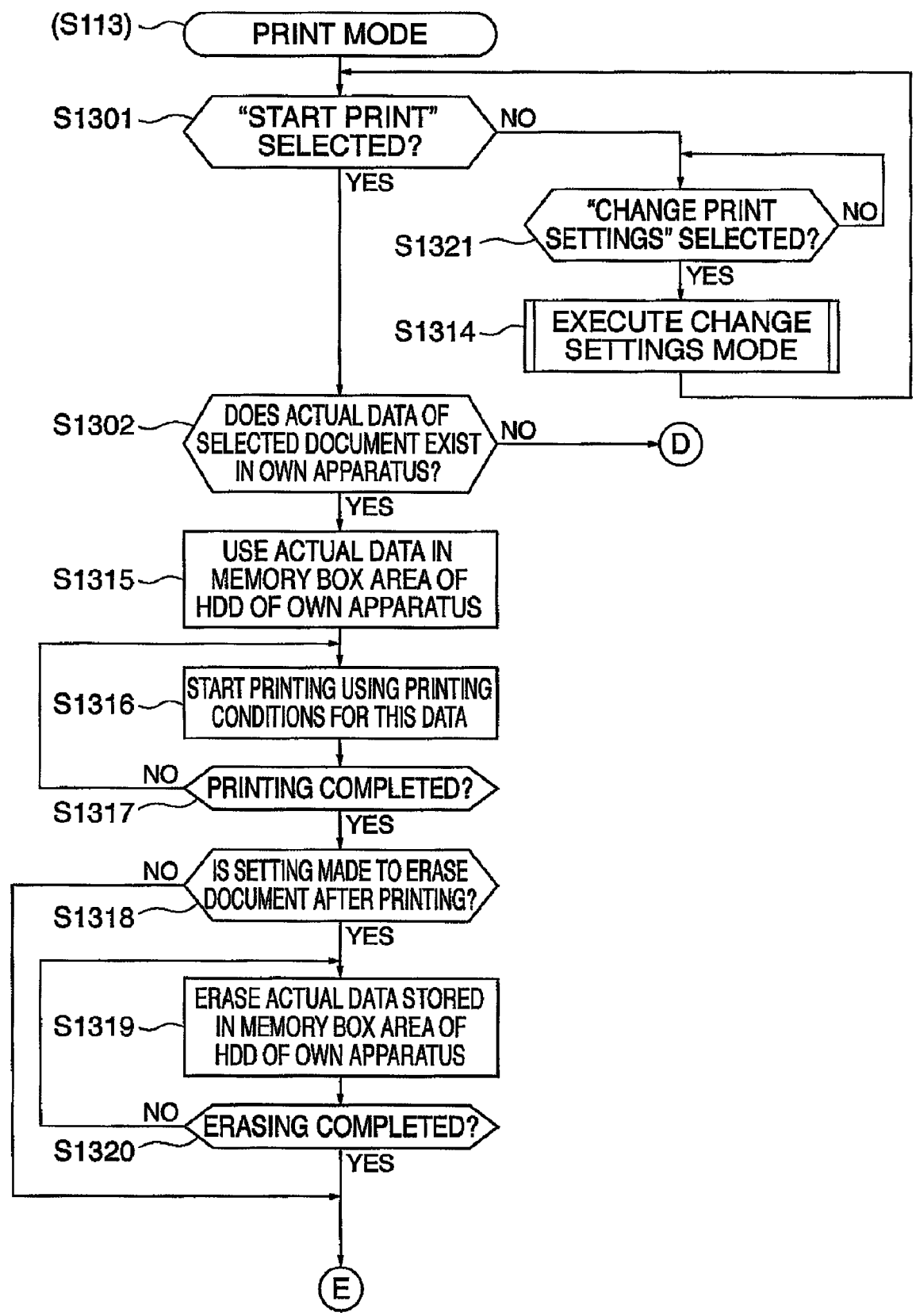
FIG. 24 is a flowchart showing detailed processing of a print mode in the embodiment of the present invention.
Figure 25:
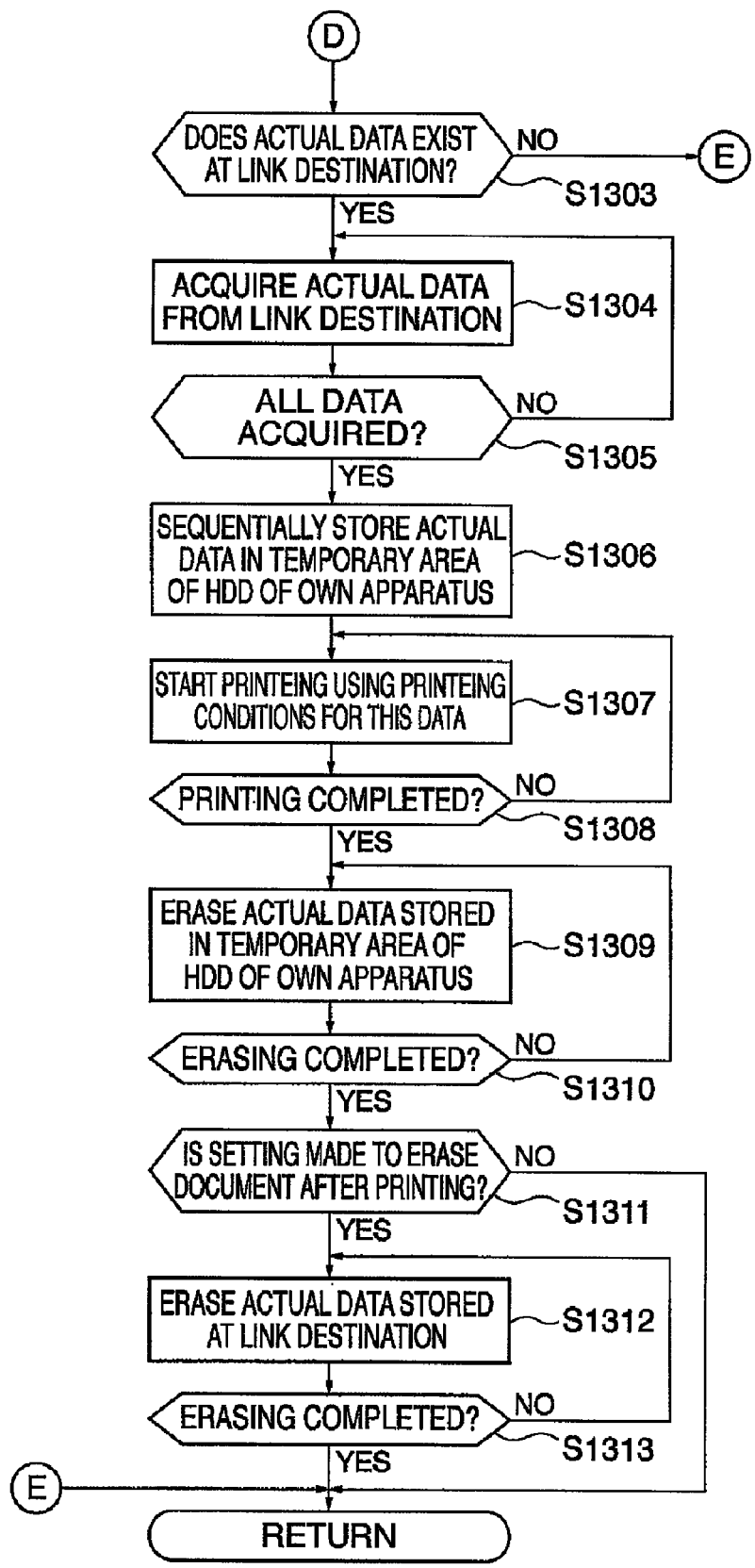
FIG. 25 is a continuation of the flowchart shown in FIG. 24.
Figure 26A:
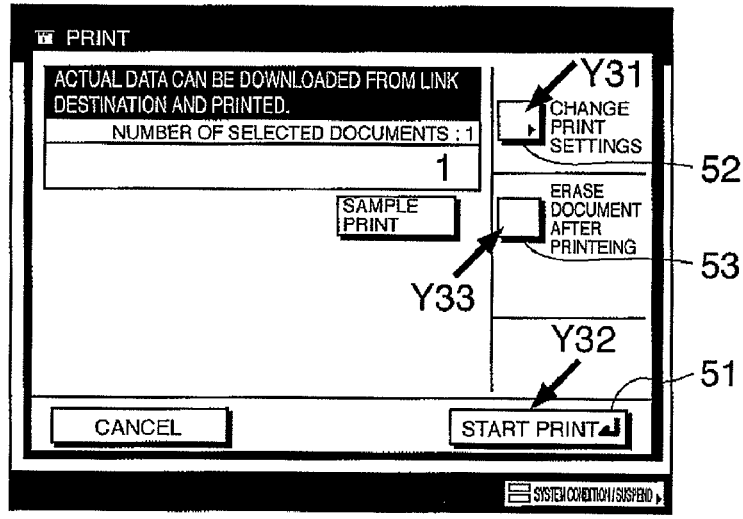
FIGS. 26A to 26C are views showing examples of a display screen that is displayed in the print mode.
Figure 26B:
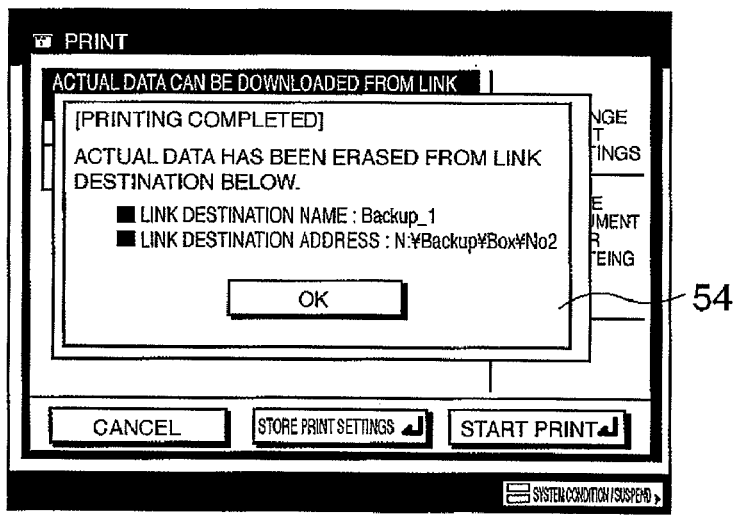
Figure 26C:
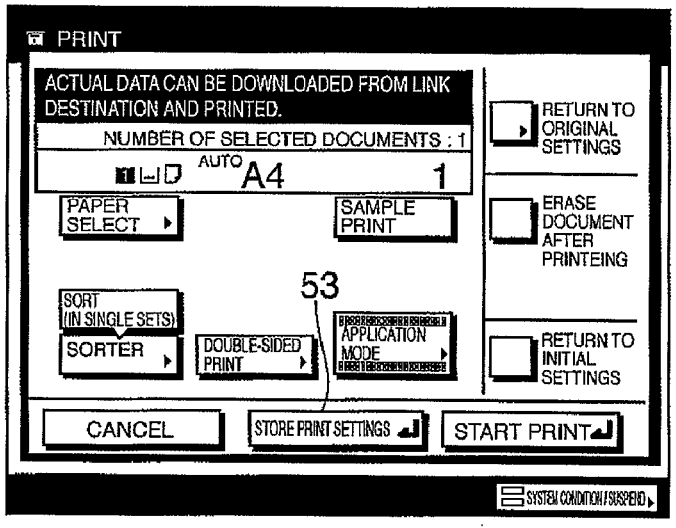

Hereunder, the print mode of the present embodiment is described in detail using the flowcharts of FIG. 24 and FIG. 25 and the like and display screen views of FIGS. 26A to 26C.

FIG. 24 and FIG. 25 are flowcharts showing the detailed processing of the print mode in the image forming system according to the present embodiment.

When the "print" button 38 was selected on the screen shown in FIG. 13C to start the print mode, the CPU 103 controls the display section 1001 to display a print screen as shown in FIG. 26A on the touch panel. Thereafter, the CPU 103 first judges whether or not the user selected a "start print" button 51 on the print screen (step S1301). When the "start print" button 51 has not been selected the process advances to a step S1321. If a "change print settings" button 52 is selected in the step S1321 (Y31 in FIG. 26A), a change settings mode that is described later is executed (step S1314).

If the user selected the "start print" button 51 (step S1301, Y32 in FIG. 26A), the CPU 103 checks whether the actual data of the selected document is stored on the HDD 306 of the printer 200 (step S1302). When the actual data is not stored thereon, the CPU 103 refers to the link destination data information to check whether the actual data in question is stored on the HDD 502 of the computer 501 as the link destination (step S1303). If the actual data is stored on the HDD 502 of the computer 501, the CPU 103 starts acquisition of image data for one page of the stored actual data (step S1304), and then determines whether the image data for all pages has been acquired from the HDD 502 at the link destination (step S1305). The acquired image data is stored in sequence in the temporary area 306*a* in the HDD 306 of the printer 200 by control of the CPU 111 (step S1306).

Thereafter, the CPU 104 controls the printer section 106 to start printing in accordance with the set printing conditions using the image data stored in the temporary area 306*a* in the aforementioned step S1306 (step S1307). The image data attributes are acquired for use from the link destination data information table.

When completion of printing is confirmed in a step S1308, the CPU 111 starts to erase the image data stored in the temporary area 306*a* in the HDD 306 of the printer in the step S1306 (step S1309). At this time, the image data is erased one page at a time and the CPU 111 checks whether all pages of the image data have been erased (step S1310).

When a setting to erase the document after printing has been made in the printing conditions (step S1311), that is, when an "erase document after printing" button 53 is selected on the screen shown in FIG. 26A (Y33 in FIG. 26A), the CPU 103 works in conjunction with the CPU 113 to start erasing the image data that is stored on the HDD 502 of the computer 501 as the link destination (step S1312). At this time, the image data is erased one page at a time, and it is then confirmed whether all pages of the image data have been erased (step S1313). After erasing is completed, a screen 54 as shown in FIG. 26B is displayed, and the link destination data information table is also deleted.

In contrast, when it is determined in the aforementioned step S1302 that the actual data of the selected document is stored on the HDD 306 of the printer, the CPU 104 uses the image data stored in the memory box area 306*b* on the HDD 306 of the printer (step S1315) to start printing in accordance with the set printing conditions (step S1316), and then checks whether printing is completed (step S1317).

When the setting to erase the document after printing has been made in the printing conditions (step S1318), the CPU 111 erases the image data that is stored in the memory box area 306*b* on the HDD 306 of the printer (step S1319). At this time, the image data is erased one page at a time and the CPU 111 checks whether all pages of the image data have been erased (step S1320). When all of the pages of the image data are erased, the processing ends.

Figure 27:
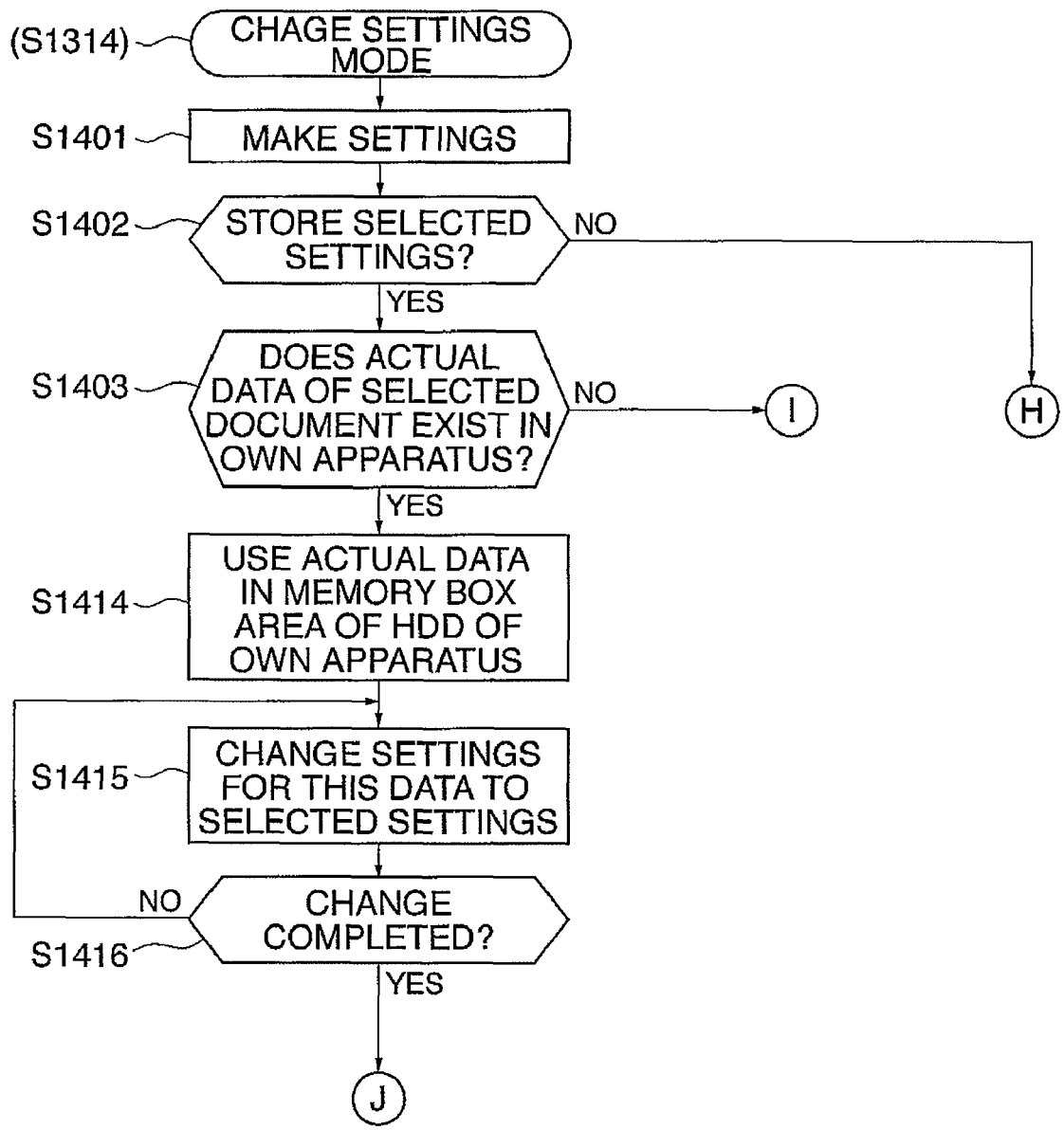
FIG. 27 is a flowchart that illustrates detailed processing of a change settings mode.
Figure 28:
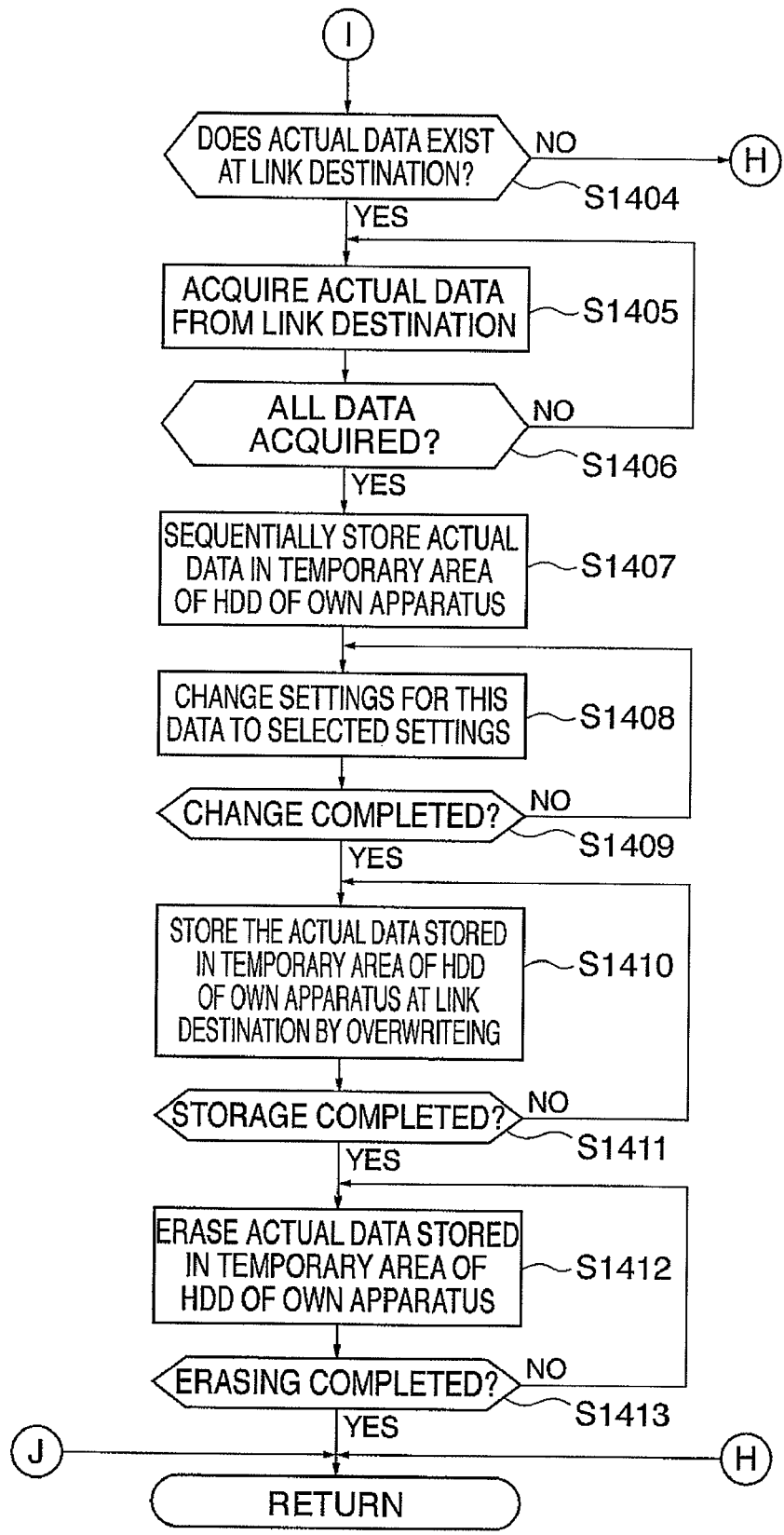
FIG. 28 is a continuation of the flowchart shown in FIG. 27.

Next, the change settings mode of the aforementioned step S1314 will be described referring to FIG. 27 and FIG. 28. FIG. 27 and FIG. 28 are flowcharts that illustrate processing of the change settings mode of the step S1314 in the print mode processing shown in FIG. 24.

When the user selects the "change print settings" button 52 on the screen shown in FIG. 26A (Y31), the CPU 103 controls the display section 1001 to display a screen for changing settings as shown in FIG. 26C on the touch panel. When the user selects a "store print settings" button 53 after setting various conditions, such as paper selection, sorter, application mode and the like that are to be carried out when executing the print operation on the screen shown in FIG. 26C (step S1401), the CPU 103 stores the settings contents in the RAM 101*b* or the like (step S1402).

Further, the CPU 103 checks whether the actual data of the selected document is stored on the HDD 306 of the printer (step S1403), and when the actual data is not stored thereon, the CPU 103 refers to the link destination data information to check whether the actual data is stored on the HDD 502 of the computer 501 as the link destination (step S1404 in FIG. 28). When the actual data is stored on the HDD 502, the CPU 103 starts acquisition of image data for one page of that actual data (step S1405), and determines whether the image data for all pages has been acquired from the HDD 502 as the link destination (step S1406). The acquired image data is stored in sequence in the temporary area 306a on the HDD 306 of the printer by control of the CPU 111 (step S1407).

Using the image data that has been stored in the temporary area 306a of the HDD 306 of the printer in the aforementioned step S1407, the print settings are changed in accordance with the conditions set in the step S1401 (step S1408), and it is then confirmed that changing of the print settings is completed (step S1409). At this time, the CPU 103 performs processing to acquire the setting conditions that have been set, and the CPU 111 performs processing to reflect the acquired setting conditions in the image data.

When it is confirmed in the step S1409 that changing of the setting has been completed, the image data stored in the temporary area 306s of the HDD 306 of the printer is overwritten in the HDD 502 of the computer 501 as the link destination to store the image data (step S1410). At this time, overwriting and storage of the image data is carried out one page at a time, and it is determined whether all pages of the image data have been stored on the HDD 502 of the link destination (step S1411). In this case, processing to send the image data on the HDD 306 to the core IP section 109 is executed by the CPU 111, and processing to transmit that image data to the computer 501 is executed by the CPU 103.

When it is confirmed in the step S1411 that overwriting and storage is completed, the CPU 103 updates the link destination data information table and erases the image data that has been stored in the temporary area 306a on the HDD 306 of the printer in the step S1407 (step S1412). At this time, the data is erased one page at a time and the CPU 103 checks whether all pages of the image data have been erased (step S1413). After the CPU 103 confirms that all the image data has been erased, the processing ends.

In contrast, in the aforementioned step S1403 of FIG. 27, when the actual data of the selected document is stored on the HDD 306 of the printer, using the image data stored in the memory box area 306b on the HDD 306 of the printer (step S1414), the print settings are changed in accordance with the conditions set in the step S1401 (step S1415). Thereafter, it is determined whether or not changing of the print settings is completed (step S1416), after which the processing ends.

(D) Transmission Mode

Next, the transmission mode of the image forming system according to the present embodiment that includes processing to temporarily store image data on the HDD 502 of the computer 501 as the link destination in the temporary area 306a on the HDD 306 of the printer to send the image data will be described with reference to flowcharts of FIG. 29 and FIG. 30 and the like.

First, the user selects a document (step S107 of FIG. 10) to be sent from the list of documents stored in the memory box (FIG. 13C). Subsequently, when the user selects the "transmit" button 40 (on the screen shown FIG. 13C) that has been enabled (step S114), the CPU 103 executes the transmission mode as illustrated in FIGS. 29 and 30 (step S115).

Figure 29:
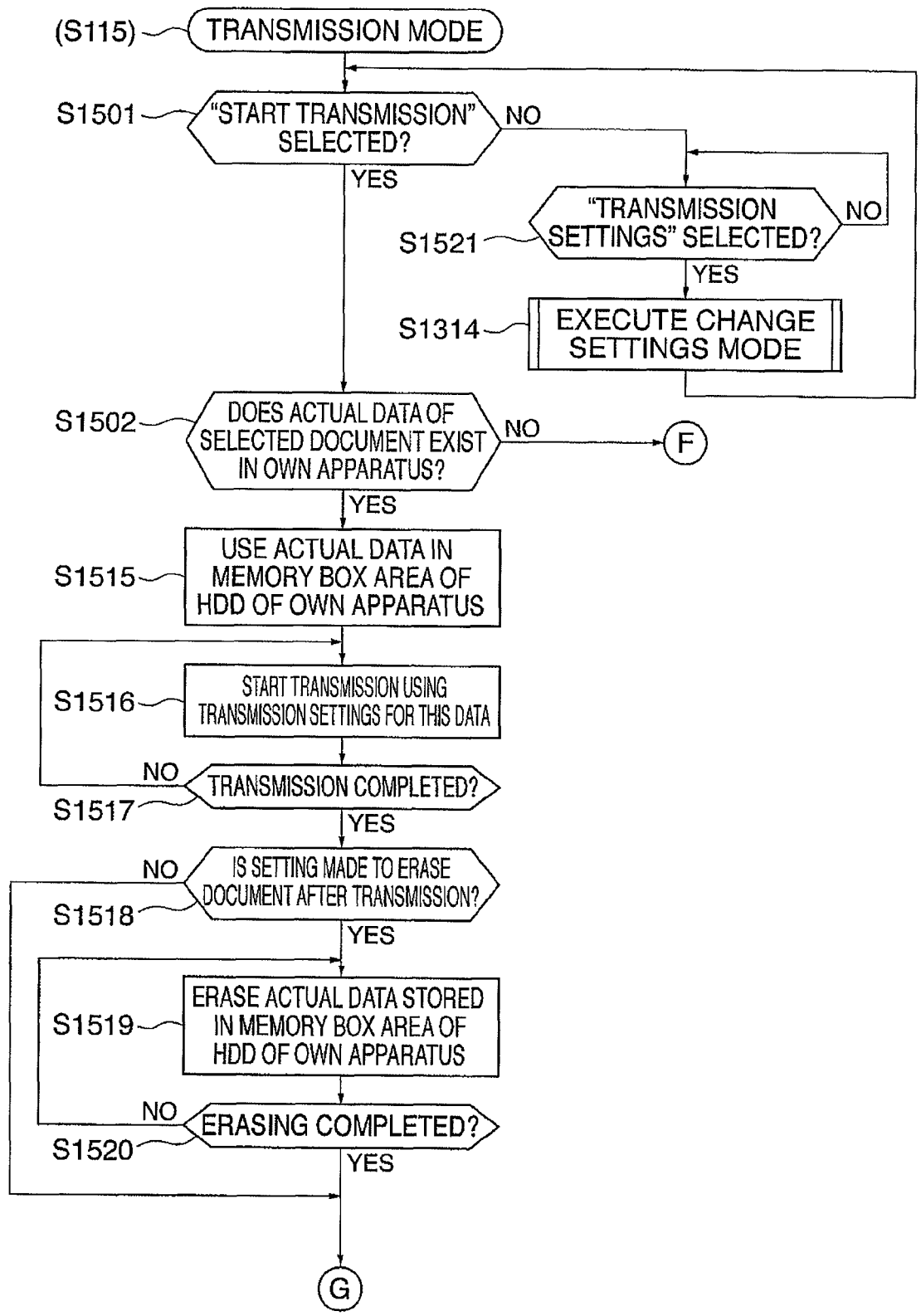
FIG. 29 is a flowchart illustrating processing of a transmission mode in the embodiment of the present invention.
Figure 30:
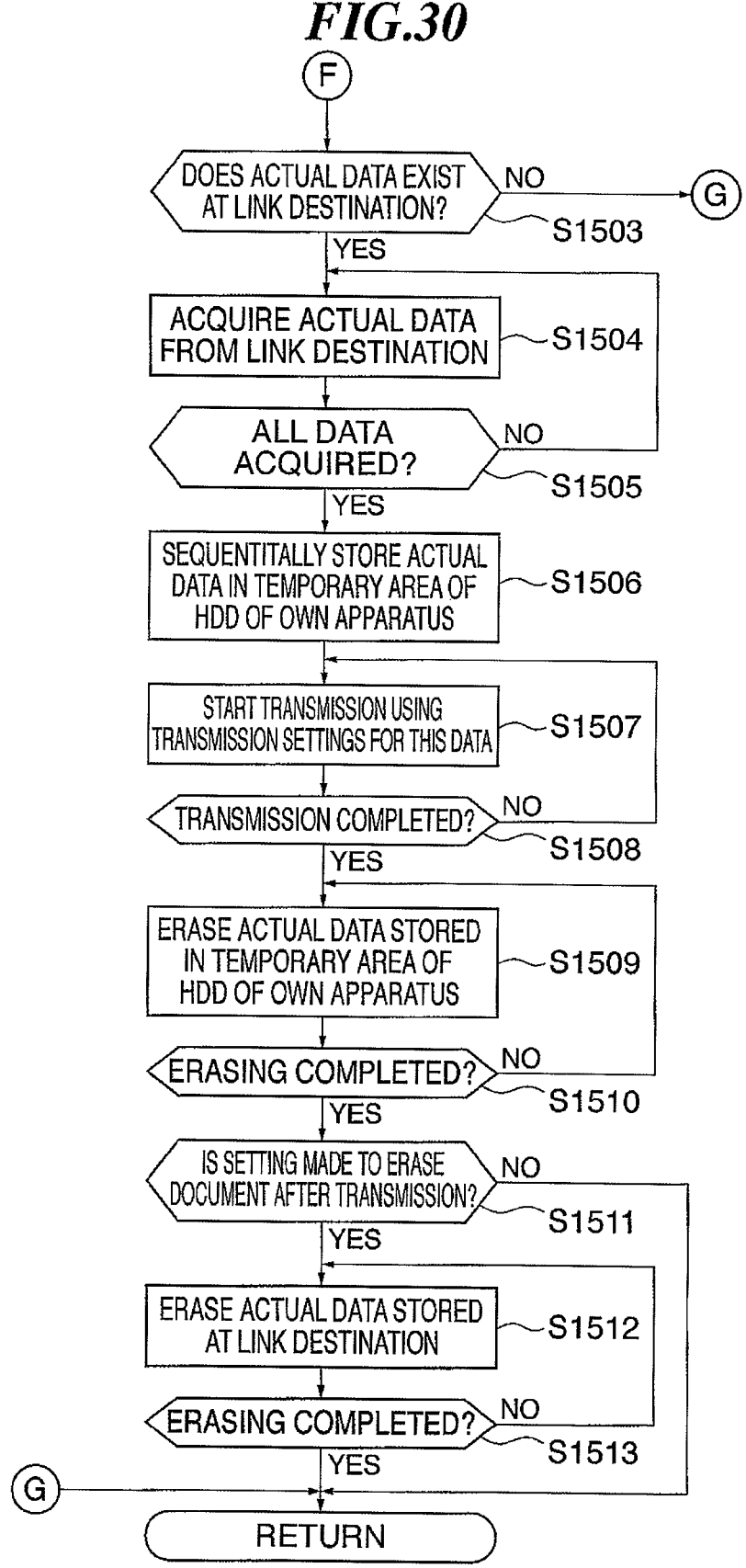
FIG. 30 is a continuation of the flowchart shown in FIG. 29.

FIGS. 29 and 30 are flowcharts that illustrate processing of the transmission mode in the image forming system according to the present embodiment.

Figure 31:
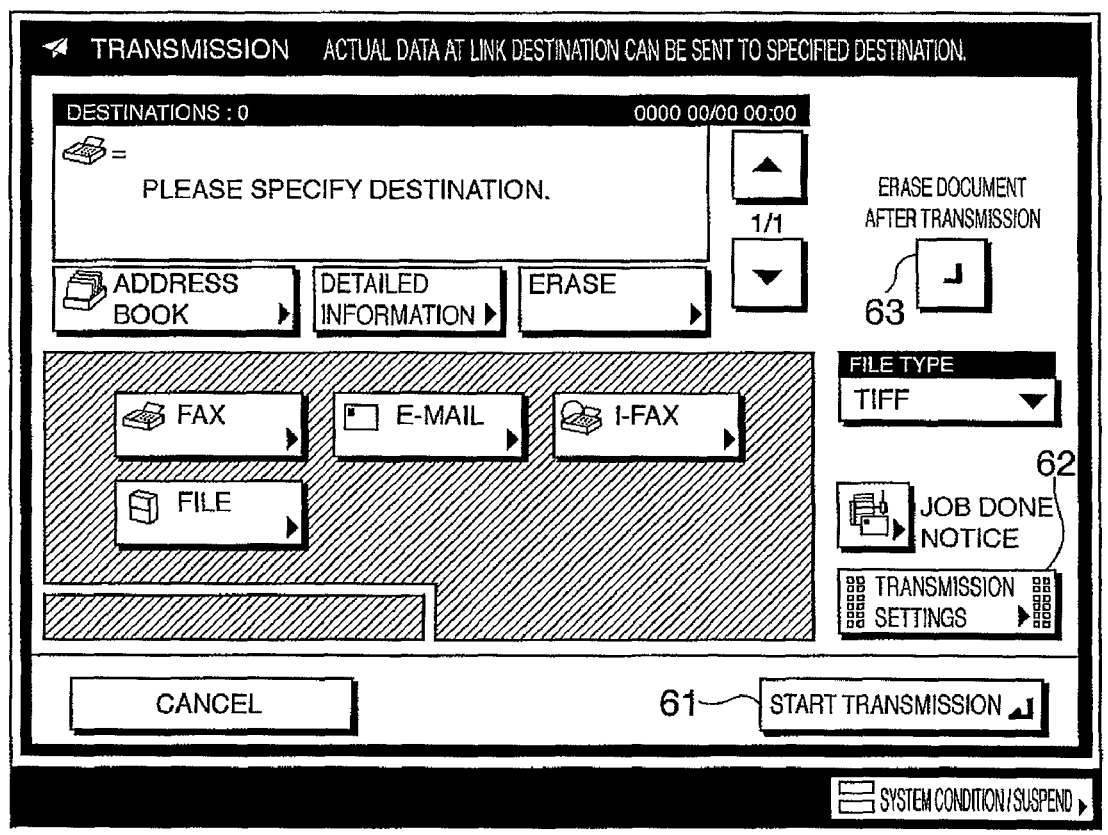
FIG. 31 is a view showing an example of a display screen that is displayed in the transmission mode.

When the user selects the "transmit" button 40 on the document list screen shown in FIG. 13C (step S115), the CPU 103 controls the display section 1001 to display a transmission mode screen as shown in FIG. 31 on the touch panel. The CPU 103 also determines whether or not the user specified a destination and selected a "start transmission" button 61 on this transmission mode screen (step S1501). When the "start transmission" button 61 has not been selected, the processing proceeds to a step S1521. In the step S1521, the CPU 103 checks whether the user selected a "transmission settings" button 62, and if the user has selected this button the CPU 103 executes the aforementioned change settings mode (step S1314).

When the user selects the "start transmission" button 61 in the aforementioned step S1501, the CPU 103 checks whether the actual data (image data) of the selected document is stored on the HDD 306 of the printer (step S1502). When the actual data is not stored on the HDD 306 of the printer, the CPU 103 refers to the link destination data information to check whether the actual data is stored on the HDD 502 of the computer 501 as the link destination (step S1503 of FIG. 30). When the actual data is stored on the HDD 502 as the link destination, the CPU 103 starts to acquire that actual data (step S1504). The CPU 103 then checks whether all pages of the image data have been acquired from the HDD 502 as the link destination (step S1505).

The acquired image data is stored in sequence in the temporary area 306a on the HDD 306 of the printer by control of the CPU 111 (step S1506). Next, using the image data stored in the temporary area 306a, the CPU 103 starts transmission in accordance with the set transmission conditions (step S1507). The attributes of this image data are acquired from the link destination data information table and used.

Thereafter, it is determined whether transmission is completed (step S1508). Upon completion of transmission the CPU 111 erases the image data that has been stored in the temporary area 306a in the aforementioned step S1506 (step S1509). At this time, the data is erased one page at a time and the CPU 111 checks whether all pages of the image data have been erased (step S1510). When all of the pages have been erased the processing advances to a step S1511.

In the step S1511, the CPU 103 checks whether the user selected a "erase document after transmission" button 63 on the transmission mode screen shown in FIG. 31 to make a setting to erase the document after transmission. When this setting has been made, the CPU 103 erases the image data stored on the HDD 502 of the computer 501 as the link destination (step S1512). At this time, the image data is erased one page at a time, and the CPU confirms whether all pages of image data have been erased (step S1513). After all the pages are erased, the link destination data information table is also deleted to end the processing.

In contrast, when it is determined in the aforementioned step S1502 that the actual data of the selected document is stored on the HDD 306 of the printer, with using the image data stored in the memory box area 306b (step S1515), to start transmission is started in accordance with the set transmission conditions (step S1516). When transmission is completed (step S1517), the process advances to a step S1518. At this time, processing to send the image data stored in the memory box area 306b to the core IP section 109 is executed by the CPU 111, and processing to transmit that image data to a specified destination is executed by the CPU 103.

In step S1518, the CPU 103 checks whether the user selected the button 63 on the screen shown in FIG. 31 to make the setting to erase the document after transmission (step S1518). When that setting has been made, the CPU 111 erases the image data stored in the memory box area 306b on the HDD 306 of the printer (step S1519). At this time, the image data is erased one page at a time and the CPU 111 checks whether all pages of the image data have been erased (step S1520). After all of the pages are erased, the processing ends.

(E) Edit Mode

Next, an edit mode for temporarily storing image data that is stored on the HDD 502 of the computer 501 as the link destination, in the temporary area 306a of the HDD 306 of the printer to change the settings thereof will be described.

First, the user selects a document to be edited from the list of documents (FIG. 13C) in the memory box (step S107 of FIG. 10). Subsequently, when the user selects the "edit menu" button 43 (on the screen shown in FIG. 13C) that has been enabled in the step S107 (step S116), the edit mode is implemented (step S117). The edit mode is implemented in accordance with the change settings mode as described above with reference to FIG. 27 and FIG. 28.

(F) Move/Duplicate Mode

Next, a move/duplicate mode of the image forming system according to the present embodiment will be described with reference to FIG. 32 and FIG. 33. The move/duplicate mode includes processing for temporarily storing image data that is stored on the HDD 502 of the computer 501 as the link destination in the temporary area 306a of the HDD 306 of the printer, and moving/duplicating that image data to other memory box.

First, the user selects a document (step S107) to be moved/duplicated from the list of documents stored in the memory box (FIG. 13C). When the user selected the "move/duplicate" button 41 (on the screen shown in FIG. 13C) that has been enabled in the step S107 (step S118), the printer 200 executes the move/duplicate mode as illustrated in FIGS. 32 and 33 (step S119).

Figure 32:
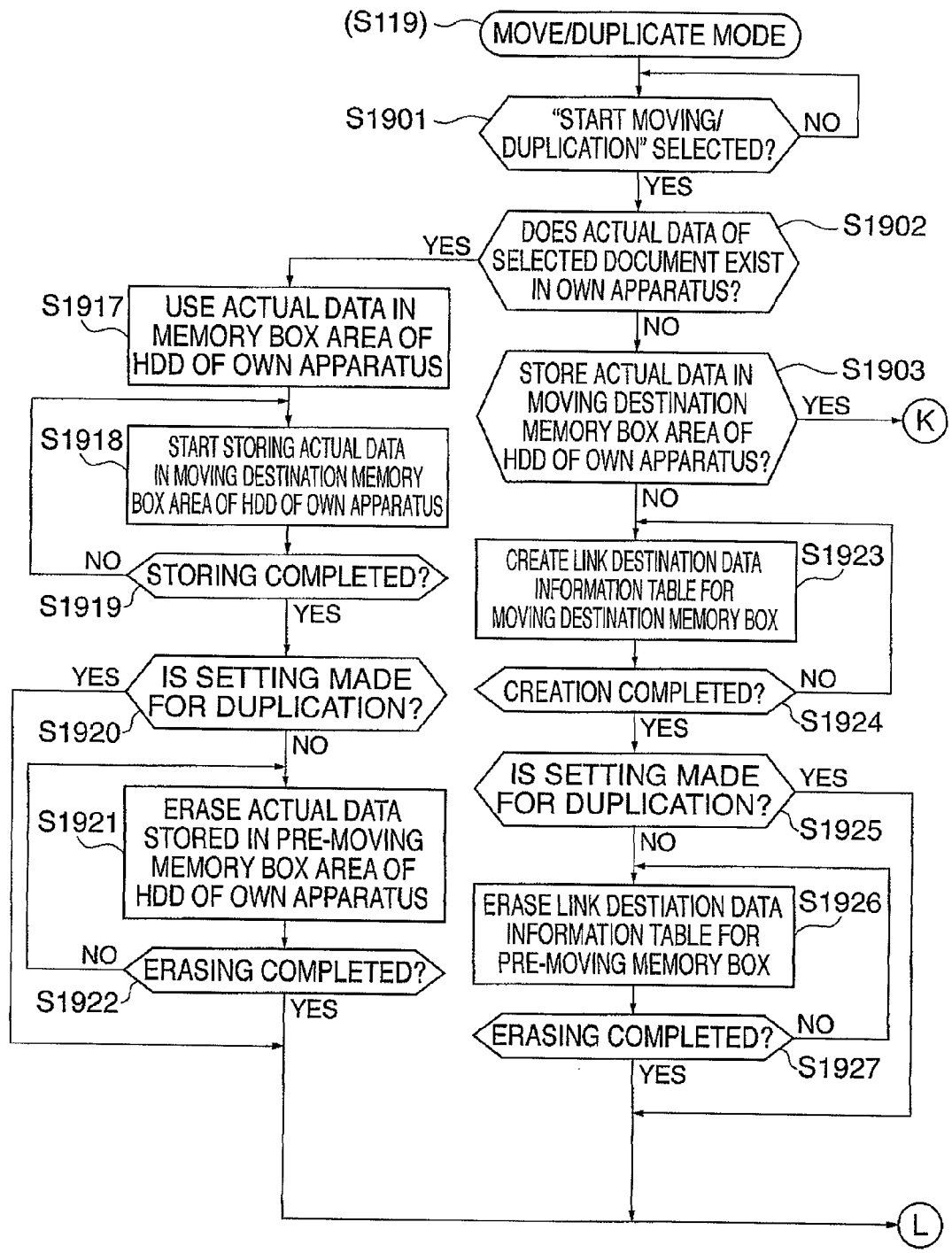
FIG. 32 is a flowchart illustrating movement/duplication processing in the embodiment of the present invention.
Figure 33:
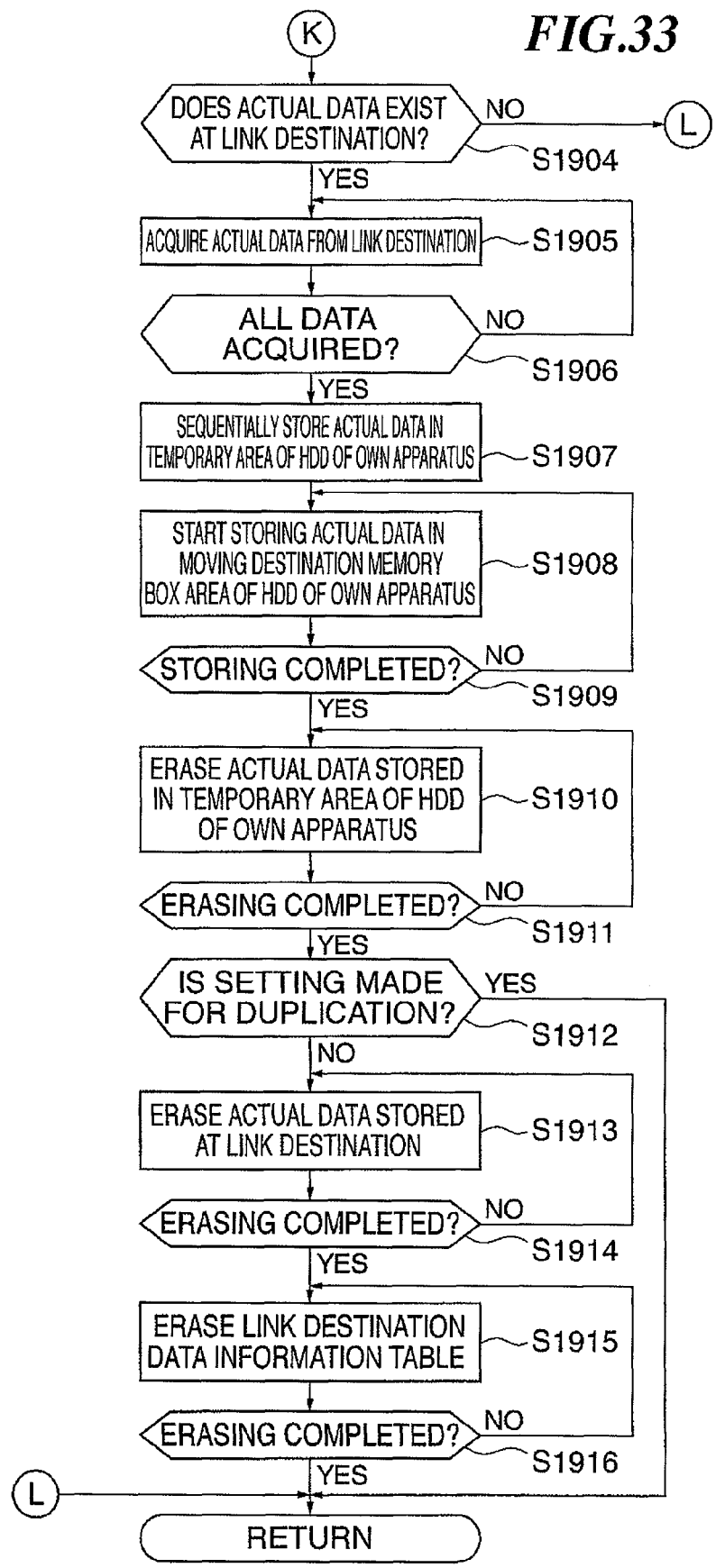
FIG. 33 is a continuation of the flowchart shown in FIG. 32.

FIGS. 32 and 33 are flowcharts that illustrate movement/duplication processing in the image forming system according to the present embodiment.

Figure 34:
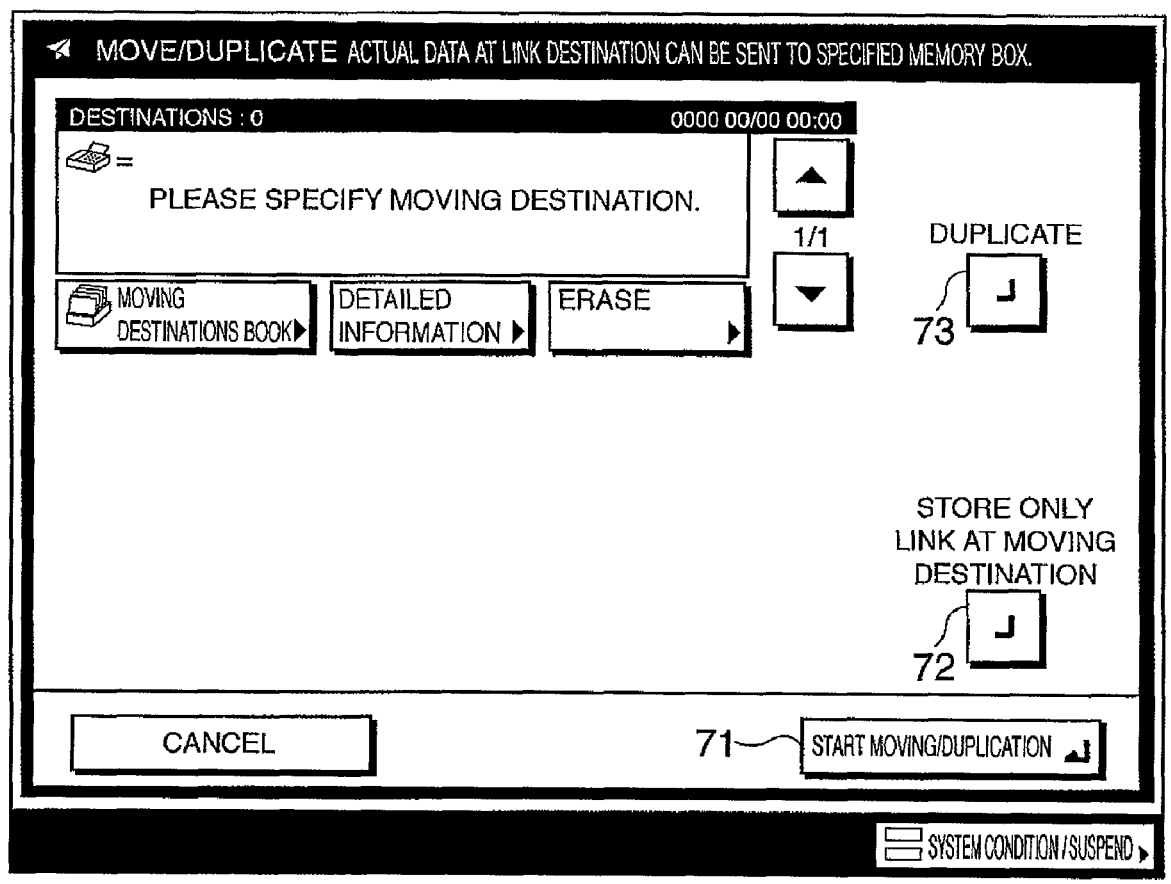
FIG. 34 is a view showing an example of a display screen that is displayed in the movement/duplication processing.

When the user selects the "move/duplicate" button 41 on the document list screen shown in FIG. 13C (step S119), the CPU 103 controls the display section 1001 to display a move/duplicate mode screen as shown in FIG. 34 on the touch panel. When the user selected a "start moving/duplication" button 71 on this move/duplicate mode screen (step S1901), the CPU 103 checks whether the actual data of the selected document is stored on the HDD 306 of the printer (step S1902).

When the actual data of the selected document is not stored on the HDD 306 of the printer, the CPU 103 checks whether to store the actual data in the memory box that is the moving destination on the HDD 306 of the printer (step S1903). Whether to store only the link destination data information or to store the actual data in the destination memory box on the HDD 306 of the printer is set in accordance with whether or not a "store only link" button 72 has been previously selected on the screen shown in FIG. 34.

When the "store only link" button 72 has not been selected and the actual data is to be stored in the destination memory box on the HDD 306 of the printer (step S1903), the CPU 103 first refers to the link destination data information to check whether the actual data is stored on the HDD 502 of the link destination computer 501 (step S1904 in FIG. 33). When the actual data is stored thereon, the CPU starts to acquire one page of the image data (step S1905), and subsequently checks whether all pages of the image data have been acquired from the HDD 502 as the link destination (step S1906). When all pages of the image data are acquired, the acquired image data is stored in sequence in the temporary area 306 on the HDD 306 of the printer by control of the CPU 111 (step S1907).

Next, in a step S1908, the CPU 111 starts an operation to store the image data that has been stored in the temporary area 306a in the aforementioned step S1907 in the destination memory box area 306b on the HDD 306 of the printer. The CPU 111 then checks whether storage to the destination memory box has been completed (step S1909). When storage has been completed, the CPU 111 erases the image data that has been stored in the temporary area 306a in the aforementioned step S1907 (step S1910). At this time, the data is erased one page at a time, and after all the pages of image data are erased (step S1911) the processing advances to a step S1912.

In the step S1912, the CPU 103 checks whether a duplication setting has been made. Whether or not the duplication setting has been made is determined on the basis of whether or not a "duplicate" button 73 has been previously selected on the screen shown in FIG. 34. When the duplication setting has been made, the processing is terminated. When the duplication setting has not been made, the CPU 103 erases the image data that is stored on the HDD 502 of the computer 501 as the link destination (step S1913). At this time, the data is erased one page at a time, and after all the pages of image data are erased (step S1914) the processing advances to step S1915. In the step S1915, the link destination data information created in the pre-moving memory box is deleted from the link destination data information table, and after confirming that deletion is completed (step S1916), the processing ends.

In contrast, in the aforementioned step S1903, if the actual data is not to be stored in the destination memory box on the HDD 306 of the printer, the CPU 103 acquires the link destination data information table created in the memory box for the image data before the move and stores it in the destination memory box to thereby create a link destination data information table for the destination memory box (step S1923). When creation of this link destination data information table is completed (step S1924), the process advances to a step S1925.

In this connection, a configuration may also be adopted whereby the image data is acquired from the link destination of the pre-moving memory box and stored in the temporary area on the HDD 306 of the printer, and that image data is then stored on the HDD 502 of the computer 501 that is set as a link destination for the destination memory box.

In the step S1925, the CPU 103 checks whether a duplication setting has been made in the same manner as in the aforementioned step S1912. If the duplication setting has been made the processing is terminated. When it is determined that the duplication setting has not been made in the step S1925, the link destination data information created for the pre-moving memory box is deleted from the link destination data information table (step S1926), and the CPU then checks whether deletion is completed (step S1927).

In this connection, as described above, when the image data is stored in the HDD 502 of the link destination computer 501 that is set for the destination memory box, the image data at the link destination that is set for the pre-moving memory box is erased.

In contrast, when it is determined in the aforementioned step S1902 that the actual data of the selected document is stored on the HDD 306 of the printer, the CPU 111 stores the image data that is stored in the memory box area 306b on the HDD 306 of the printer in the destination memory box area 306b on the HDD 306 of the printer (steps S1917 and S1918), and when storage is completed (step S1919) the process advances to step S1920. The image data may also be stored on the HDD 502 of the computer 501 that is set as a link destination for that destination memory box.

In the step S1920, the CPU 103 checks in the same manner as described above whether or not a duplication setting has been made. When the duplication setting has been made, the processing is terminated. When the duplication setting has not been made, the CPU 111 deletes the image data that is stored in the pre-moving memory box (step S1921), confirms that deletion is completed (step S1922) and then ends the processing.

(G) Actual Data Reacquisition Mode

Next, an actual data reacquisition mode that restores image data that is stored in the computer 501 as the link destination, in a memory box of the HDD 306 of the printer is described with reference to FIGS. 35, 36, 37A to 37F and the like.

Figure 35:
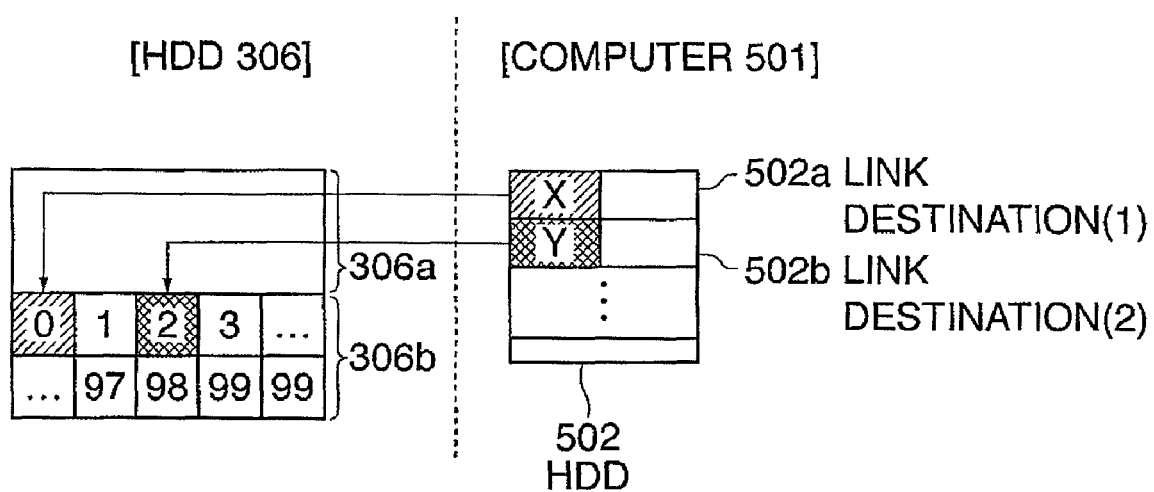
FIG. 35 is a conceptual diagram illustrating an actual data reacquisition mode in the embodiment of the present invention.

FIG. 35 is a conceptual diagram illustrating the actual data reacquisition mode in the image forming system according to the present embodiment.

In the example shown in FIG. 35, the image data X of the link destination (1) 502a is re-stored in the memory box 0 and the image data Y of the link destination (2) 502b is re-stored in the memory box 2.

Figure 37A:
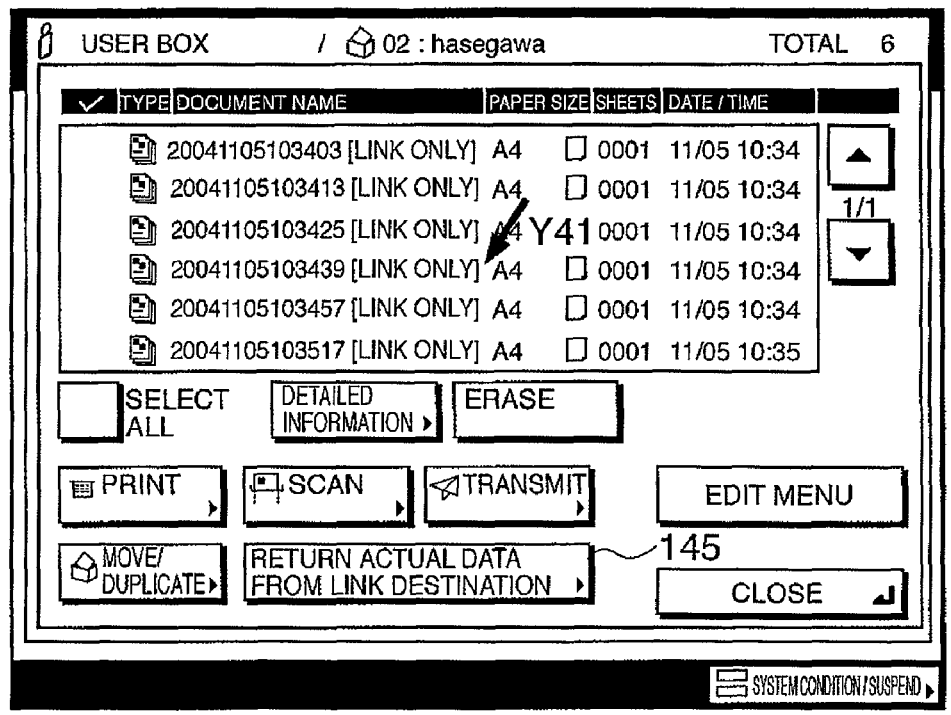
FIGS. 37A to 37F are views showing examples of a display screen that is displayed in "actual data reacquisition mode".
Figure 37B:
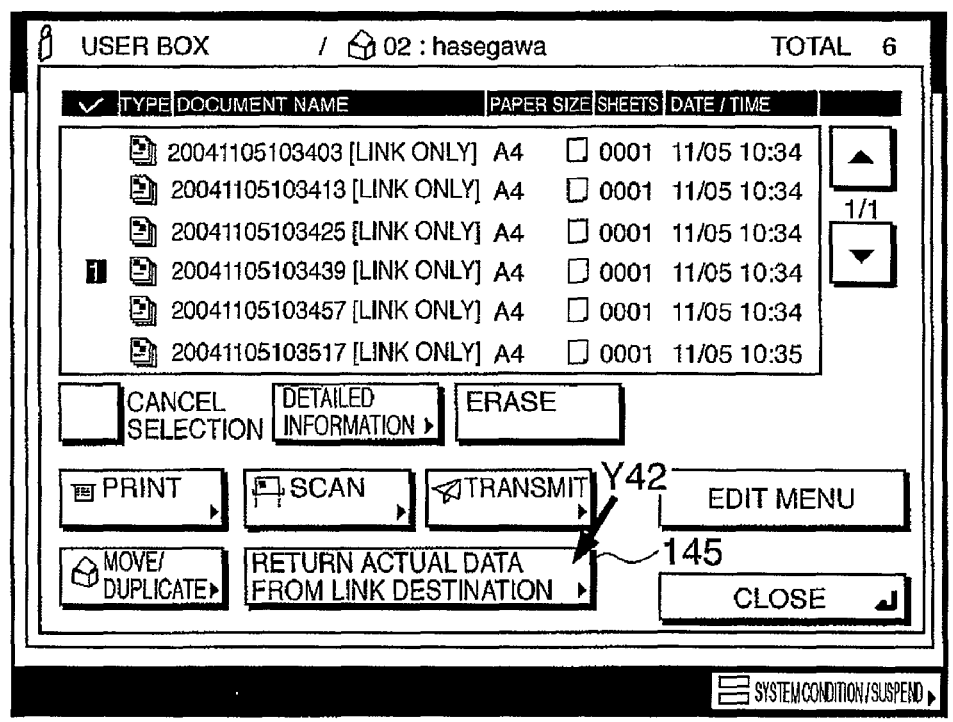

As processing that is performed prior to starting the actual data reacquisition mode, first, when the user selects a memory box on the screen shown in FIG. 9C (step S103 of FIG. 10), the CPU 103 displays a screen showing a list of documents in that memory box on the touch panel of the display section 1001, as shown in FIG. 37A (step S106). When the image data is not present on the HDD 306 of the printer and is stored on the HDD 502 of the link destination computer 501, for example, as shown in FIG. 37A, the message "link only" is displayed on the document list screen.

When the user selects a document on this document list screen (step S107 of FIG. 10, Y41 of FIG. 37A), the CPU 103 determines whether or not the image data for that document is stored on the HDD 306 of the printer (step S108 of FIG. 11). When the image data is not stored thereon, the CPU 103 enables a "return actual data from link destination" button 145 on the screen shown in FIG. 37A (step S120). More specifically, instead of the "store actual data at link destination" button 42 that is displayed on the document list screen shown in FIG. 16A, the "return actual data from link destination" button 145 is displayed and enabled.

Figure 36:
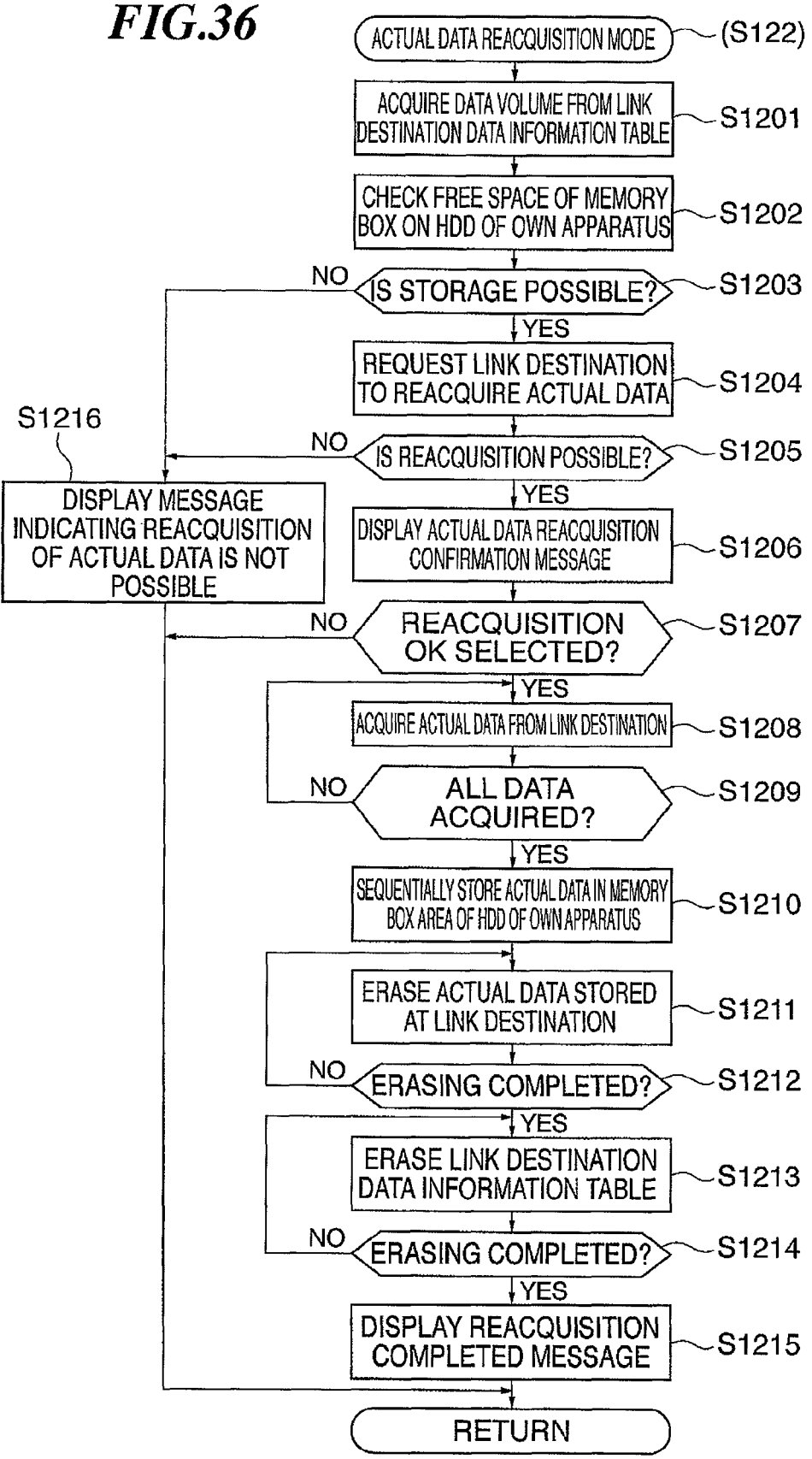
FIG. 36 is a flowchart showing the detailed processing of the actual data reacquisition mode in the embodiment of the present invention.

When the user selects the "return actual data from link destination" button 145 (step S121, Y42 of FIG. 37B), the printer 200 implements the actual data reacquisition mode in accordance with a processing flow shown in FIG. 36 (step S122).

FIG. 36 is a flowchart illustrating the processing of the actual data reacquisition mode (step S122) in the image forming system according to the present embodiment.

Figure 37C:
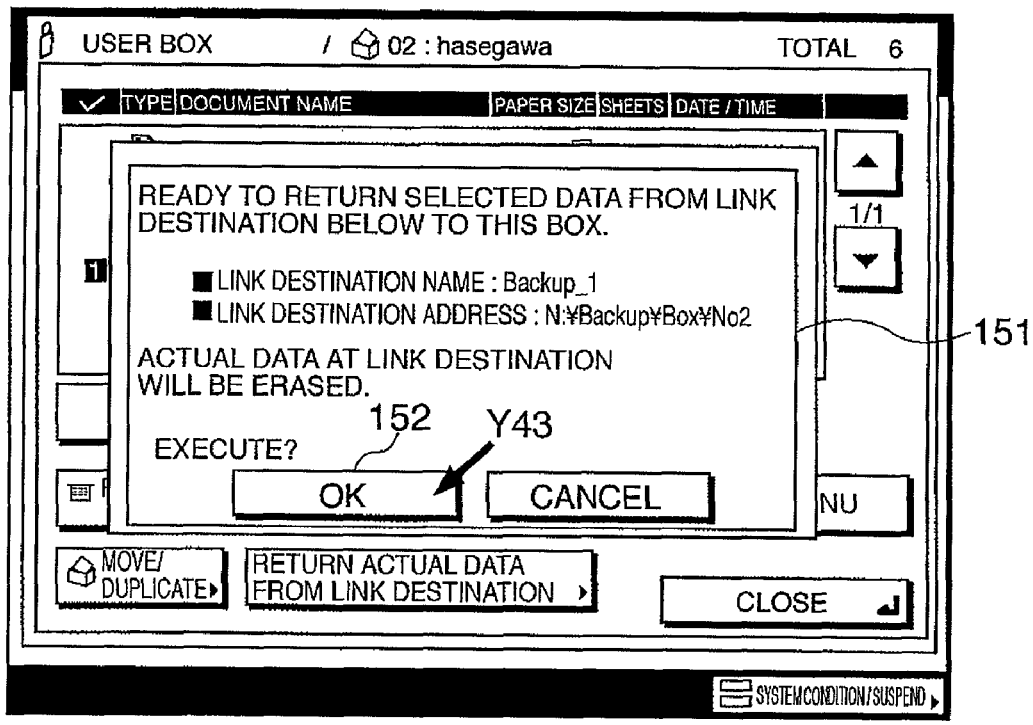

First, the CPU 103 refers to the link destination data information table to obtain the volume of the image data to be reacquired (step S1201), and the CPU 111 determines the free space of the memory box on the HDD 306 of the printer (step S1202). When the memory box in question has sufficient capacity to store the image data (step S1203), the CPU 103 sends a request to reacquire the actual data to the link destination computer 501 (step S1204). When a reply to the request indicates that reacquisition is possible (step S1205), the CPU 103 controls the display section 1001 to display on the touch panel a confirmation message screen 151 for confirming whether to execute reacquisition, as shown in FIG. 37C (step S1206).

When the user touched an "OK" button 152 on the confirmation message screen 151 to select to carry out the reacquisition (step S1207, Y43 of FIG. 37C), the CPU 103 starts to acquire image data for one page of the actual data that is stored on the HDD 502 as the link destination (step S1208). When all pages of the image data have been acquired (step S1209), the reacquired image data is re-stored in sequence in the memory box area 306b of the HDD 306 of the printer by control of the CPU 111 (step S1210).

When the re-storing operation is completed, the CPU 103 starts to erase the image data in question that is stored on the HDD 502 of the link destination computer 501 (step S1211). After erasing all pages of the image data by erasing the pages one at a time (step S1212), the link destination data information corresponding to the image data in question is deleted from the link destination data information table (step S1213).

Figure 37D:
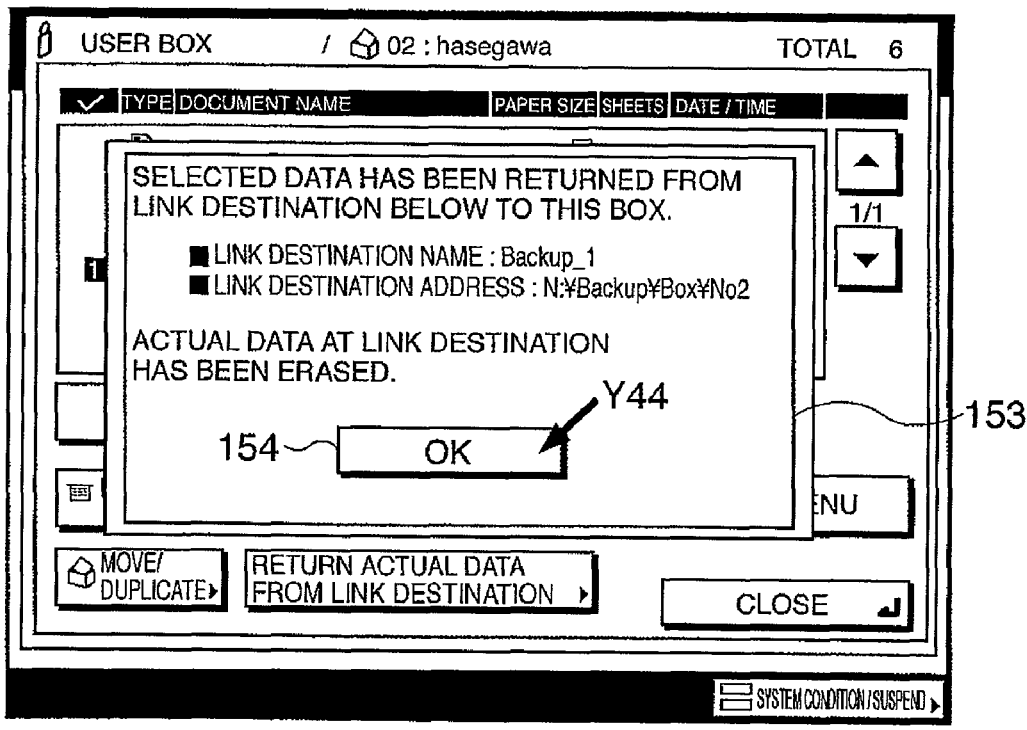
Figure 37E:
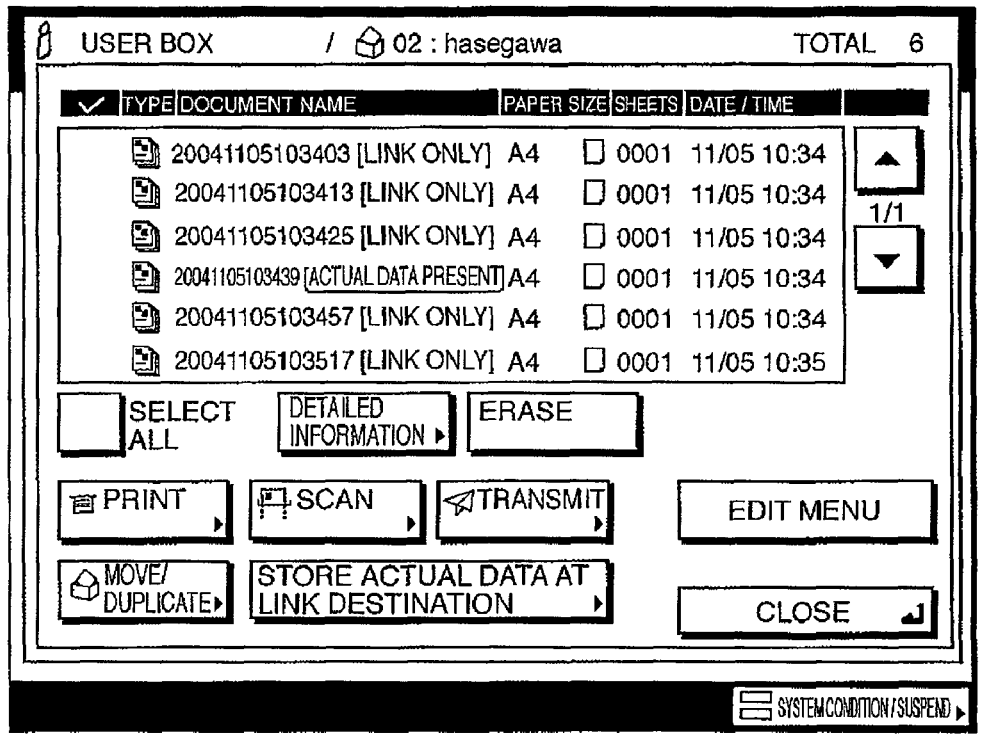

After this deletion has been completed (step S1214), the CPU 103 controls the display section 1001 to display a message screen 153 indicating that reacquisition has been completed on the touch panel, as shown in FIG. 37D (step S1215). When the user selects an "OK" button 154 on the message screen 153 (Y44 in FIG. 37D), the CPU 103 controls the display section 1001 to display on the touch panel a document list screen, as shown in FIG. 37E, in which the re-stored document is displayed together with an underlined message "actual data present".

Figure 37F:
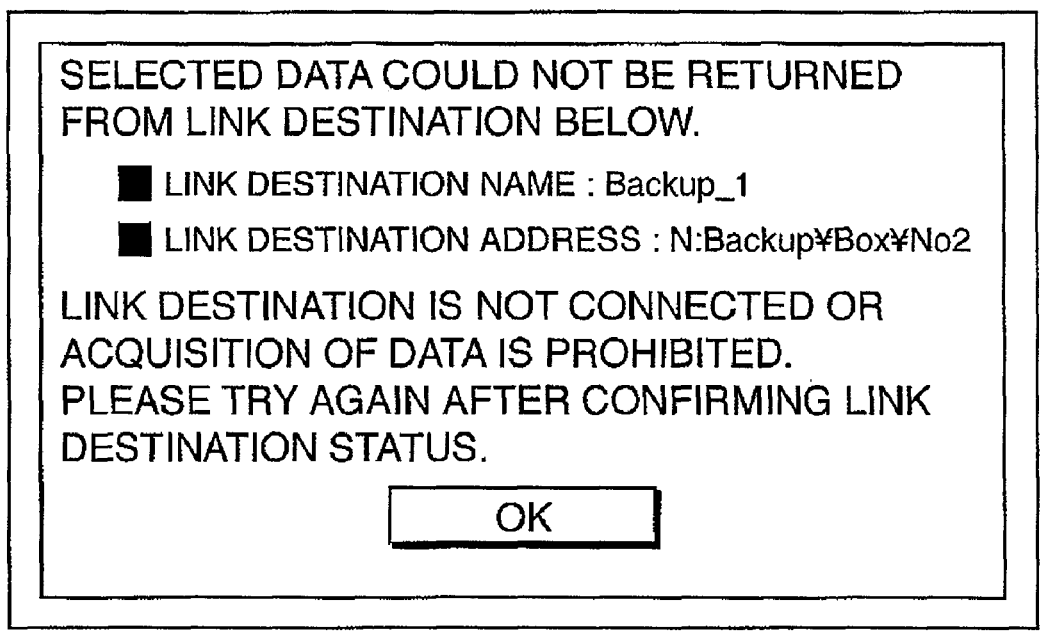

In this connection, in a case where the memory box does not have sufficient capacity to store the image data (NO at the aforementioned step S1203) or reacquisition of the image data is not possible (NO at the aforementioned step S1205), a message screen indicating that reacquisition of the actual data is not possible is displayed as shown in FIG. 37F.

Next, the advantages of the present embodiment will be described.

According to the present embodiment, the hard disk 306 is provided in the printer 200 that is connected to the external computer 501 via the network 500. The hard disk 306 contains the memory box area 306b that has the plurality of memory boxes, and the temporary area 306a that temporarily stores image data.

On the control section 100 of the printer 200, first, a link destination (the HDD 502 of the external computer 501) for transferring actual data of a document thereto is set in the memory box (FIG. 7, FIGS. 8A to 8D, and FIGS. 9A to 9C). Thereafter, the user selects a document whose actual data is present in the memory box (step S107 of FIG. 10), to transfer that actual data to the link destination that has been set as described above (step S1106 of FIG. 15). At that time, the actual data inside the memory box is erased (step S1109 of FIG. 15) and only link destination data information is held therein (step S1108 of FIG. 15).

Thereafter, when the user performs an operation for the image data registered in that memory box, such as an operation to print, transmit, move or duplicate the image data, the image data in question that has been transferred to the external computer 501 is identified by the link destination data information that is held in the memory box and is temporarily stored in the temporary area 306a of the printer 200 and used (step S1306 and step S1307 of FIG. 25, step S1506 and step S1507 of FIG. 30, and step S1907 and step S1908 of FIG. 33).

As a result, it is possible to perform operations on the image data in the same manner as when the image data is stored in the memory box, without using the capacity of the memory box. Thus, a user can perform operations smoothly without being aware of the capacity of the memory box when introducing a document image into the memory box or performing a print, transmission, move, duplication operation or the like with respect to that document image.

Further, even in a printer that does not include a HDD that fulfills the memory box function, the memory box function can be realized by employing a memory other than a HDD as a temporary area for image data. More specifically, according to the present embodiment, when image data is introduced into a memory box, all of the actual data is stored on the HDD 502 of the link destination computer 501, and only link destination data information is stored in the printer in question. When the user uses the memory box function to perform a print or transmission operation or the like, the image data on the HDD 502 of the link destination computer 501 is stored in the temporary area of the printer and used. Thus, when performing an operation for image data that is stored in a memory box, since the image data that has been transferred to a link destination is temporarily stored in a temporary area in the printer and used, by providing the temporary area, for example, inside the image memory 301 instead of the HUD 306 of the printer, the memory box function can also be realized in an image forming apparatus that does not contain a HDD. Accordingly, a user can swiftly carry out operations using the memory box function without being aware of the capacity of the HDD 306 of the printer or of the existence or non-existence of the HDD itself.

According to the present embodiment, a printer (image forming apparatus) equipped with a printer section that prints the data of a job as a processing object is described as one example of a data processing apparatus. Considering the prior art and problems and the like that the present invention focuses on, and assuming various use cases and user needs, the present invention is preferably applied to a data processing apparatus such as this kind of printer. However, the present invention can also be applied to a data processing apparatus other than this kind of printer. For example, the present invention can also be applied to a data processing apparatus such as a mobile phone or host computer equipped with a data transmission function that transmits desired data to a desired destination in accordance with a user request. However, this is based on the premise that the apparatus satisfies at least Condition 1 to Condition 4 that are described at the beginning of the description of the present embodiment. Thus, an effect can be achieved whereby the user can enjoy the various advantages exemplified in the present embodiment in a manner that corresponds flexibly to the usage environment of the user. Further, in the present embodiment a touch panel-type operating section is described as one example of a user interface unit. However, a configuration may be adopted which also enables the use of a display device that can respond to instructions from a pointing device such as a keyboard or mouse, and the like, as another example of a user interface unit of the present embodiment.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

In this case, the program code may be supplied directly from a storage medium on which the program code is stored, or from a computer, database, or the like, not shown, that is connected via the Internet, a commercial network, a local area network, or the like.

This application claims the benefit of Japanese Application No. 2005-143224, filed May 16, 2005, which is hereby incorporated by reference herein in its entirety.

INDUSTRIAL APPLICABILITY

According to the present invention, it is possible to flexibly deal with needs of users while a memory unit which is installed in a data processing apparatus and which can store data as a processing object is effectively utilized.

According to the present invention, when a user uses, for example, a first storage device as a memory box area, the user can use the memory box area without being concerned about the capacity of the first storage means, thereby improving operability for using a memory box function. Further, it is also possible to configure a memory box function in an apparatus that does not include a large capacity memory device.

The invention claimed is:

1. A data processing apparatus equipped with a memory unit that can store data as a processing object, comprising:
   a user interface unit; and
   a controller constructed to cause the data processing apparatus to transmit the data stored in said memory unit to an external apparatus, and to cause the data processing apparatus to execute an erasing process of the data stored in said memory unit,
   wherein said controller allows an acceptance of a specific user request related to processing of the data transmitted to the external apparatus in a case where the data has been transmitted to the external apparatus, and
   wherein said controller causes the data processing apparatus to execute a process in which the data transmitted to the external apparatus is used in a case where the acceptance of the specific user request via said user interface unit is performed.

2. A data processing apparatus according to claim 1, wherein:
   said controller allows a selection of data to be transmitted to the external apparatus from among a plurality of data stored in said memory unit to be performed by a user via said user interface unit;
   said controller causes the data among the plurality of data stored in said memory unit, that is selected by the user via said user interface unit, to be transmitted to the external apparatus via a network;
   said controller causes the data processing apparatus to hold transfer destination information for the selected data in a case where the selected data is transmitted to the external apparatus; and
   said controller causes the data processing apparatus to refer to the transfer destination information and acquire the data that has been transferred to the external apparatus, causes the data processing apparatus to execute a process using the acquired data, and causes the data processing apparatus to execute an erasing process of the acquired data after the process using the acquired data is performed by the data processing apparatus, in a case where an acceptance of a specific user request, as the specific user request, which is related to processing of the data transmitted to the external apparatus is performed via said user interface unit.

3. A data processing apparatus according to claim 2,
wherein said controller allows a selection of whether or not to cause the transferred data that is stored in a storage device of the external apparatus to be re-stored in said memory unit to be executed by a user via said user interface unit.

4. A data processing apparatus according to claim 2,
wherein said controller causes information related to a user and information related to a transfer destination of data to be registered in each memory box area of a plurality of memory box areas that are provided in said memory unit.

5. A data processing apparatus according to claim 4,
wherein the process is at least one of an image forming process for performing image formation on a sheet using the acquired data, a transmission process for transmitting the acquired data to a predetermined destination via the network, a process for moving the acquired data between the plurality of memory box areas, a process for duplicating the acquired data between the plurality of memory box areas, and an editing process for editing the acquired data.

6. A data processing apparatus according to claim 1,
wherein said controller, in a case where data is stored in said memory unit, causes a display indicating that the data is stored in said memory unit to be performed by said user interface unit, and
wherein said controller, in a case where a selection of an item related to data stored in said memory unit is performed by a user via said user interface unit, causes a display for accepting from the user a request that causes the data to be transferred to the external apparatus to be performed by said user interface unit.

7. A data processing apparatus according to claim 6,
wherein said controller, in a case where data is not stored in said memory unit and is stored in the external apparatus, causes a display indicating that the data is stored in a storage device of the external apparatus to be performed by said user interface unit; and
wherein said controller, in a case where a selection of an item related to the data stored in the storage device of the external apparatus is performed by a user via said user interface unit, causes a display for accepting from the user a request that causes the data stored in the storage device of the external apparatus to be transferred to said memory unit to be performed by said user interface unit.

8. A data processing apparatus according to claim 1,
wherein said controller, in a case where a first operation is performed by a user via said user interface unit, causes the data processing apparatus to execute three processes consisting of a first process for causing actual data stored in said memory unit to be transmitted to the external apparatus, a second process for erasing the actual data from said memory unit, and a third process for generating link information of the actual data; and
wherein said controller, in a case where a second operation is performed by the user via said user interface unit, causes the data processing apparatus to execute two processes consisting of a fourth process for acquiring from the external apparatus the actual data that has been transferred to the external apparatus from said memory unit, and a fifth process for performing output processing of the actual data acquired from the external apparatus.

9. A control method of a data processing apparatus equipped with a memory unit that can store data as a processing object, comprising the steps of:
causing the data processing apparatus to execute a process for transmitting the data stored in the memory unit to an external apparatus and a process for erasing from the memory unit the data that is the object of transmission to the external apparatus;
allowing, in a case where the data has been transmitted to the external apparatus, an acceptance of a specific user request related to processing of the data transmitted to the external apparatus; and
causing the data processing apparatus to execute a process in which the data transmitted to the external apparatus is used in a case, where the acceptance of the specific user request via a user interface unit is performed.

10. A control method according to claim 9, comprising the steps of:
allowing a selection of data to be transmitted to the external apparatus from among a plurality of data stored in the memory unit to be performed by a user via the user interface unit;
causing the data among the plurality of data stored in the memory unit, that is selected by the user via the user interface unit, to be transmitted to the external apparatus via a network;
causing the data processing apparatus to hold transfer destination information for the selected data in a case where the selected data is transmitted to the external apparatus; and
causing the data processing apparatus to refer to the transfer destination information and acquire the data that has been transferred to the external apparatus, causing the data processing apparatus to execute a process using the acquired data, and causing the data processing apparatus to execute an erasing process of the acquired data after the process using the acquired data is performed by the data processing apparatus, in a case where an acceptance of a specific user request, as the specific user request, which is related to processing of the data transmitted to the external apparatus has been performed via the user interface unit.

11. A control method according to claim 10, comprising the step of:
allowing a selection of whether or not to cause the transferred data that is stored in a storage device of the external apparatus to be re-stored in the memory unit to be executed by a user via the user interface unit.

12. A control method according to claim 10, comprising the step of:
causing information related to a user and information related to a transfer destination of data to be registered in each memory box area of a plurality of memory box areas that are provided in the memory unit.

13. A control method according to claim 12,
wherein the process is at least one of an image forming process for performing image formation on a sheet using the acquired data, a transmission process for transmitting the acquired data to a predetermined destination via the network, a process for moving the acquired data between the plurality of memory box areas, a process for duplicating the acquired data between the plurality of memory box areas, and an editing process for editing the acquired data.

14. A control method according to claim 9, comprising the steps of:

in a case where data is stored in the memory unit, causing a display indicating that the data is stored in the memory unit to be performed by the user interface unit; and in a case where a selection of an item related to data stored in the memory unit is performed by a user via the user interface unit, causing a display for accepting from the user a request that causes the data to be transferred to the external apparatus to be performed by the user interface unit.

15. A control method according to claim 14, comprising the steps of:

in a case where data is not stored in the memory unit and is stored in the external apparatus, causing a display indicating that the data is stored in the storage device of the external apparatus to be performed by the user interface unit; and in a case where a selection of an item related to the data stored in the storage device of the external apparatus is performed by a user via the user interface unit, causing a display for accepting from the user a request that causes the data stored in the storage device of the external apparatus to be transferred to the memory unit to be performed by the user interface unit.

16. A control method according to claim 9, comprising the steps of:

in a case where a first operation is performed by a user via the user interface unit, causing the data processing apparatus to execute three processes consisting of a first process for causing actual data stored in the memory unit to be transmitted to the external apparatus, a second process for erasing the actual data from the memory unit, and a third process for generating link information of the actual data; and in a case where a second operation is performed by the user via the user interface unit, causing the data processing apparatus to execute two processes consisting of a fourth process for acquiring from the external apparatus the actual data that has been transferred to the external apparatus from the memory unit, and a fifth process for performing output processing of the actual data acquired from the external apparatus.

17. A non-transitory computer-readable storage medium retrievably storing a computer-executable program for causing a computer to execute a control method according to claim 9.

18. A non-transitory computer-readable storage medium retrievably storing a computer-executable program for causing a computer to execute a control method according to claim 10.

19. A non-transitory computer-readable storage medium retrievably storing a computer-executable program for causing a computer to execute a control method according to claim 11.

20. A non-transitory computer-readable storage medium retrievably storing a computer-executable program for causing a computer to execute a control method according to claim 12.

21. A non-transitory computer-readable storage medium retrievably storing a computer-executable program for causing a computer to execute a control method according to claim 13.

22. A non-transitory computer-readable storage medium retrievably storing a computer-executable program for causing a computer to execute a control method according to claim 14.

23. A non-transitory computer-readable storage medium retrievably storing a computer-executable program for causing a computer to execute a control method according to claim 15.

24. A non-transitory computer-readable storage medium retrievably storing a computer-executable program for causing a computer to execute a control method according to claim 16.

25. A data processing apparatus according to claim 1, further comprising a storage unit constructed to store link information indicating a link to the data transmitted to the external apparatus, wherein said controller causes the data processing apparatus to acquire the data in accordance with the link information and execute processing of the acquired data in a case where the acceptance of the specific user request via said user interface unit is performed.

* * * * *

UNITED STATES PATENT AND TRADEMARK OFFICE
CERTIFICATE OF CORRECTION

PATENT NO. : 8,134,725 B2  
APPLICATION NO. : 11/817857  
DATED : March 13, 2012  
INVENTOR(S) : Tomoya Hasagawa Page 1 of 1

It is certified that error appears in the above-identified patent and that said Letters Patent is hereby corrected as shown below:

On the Title Page, insert the following:

Item --(73) Assignee: Canon Kabushiki Kaisha, Tokyo, Japan--

Signed and Sealed this
Sixteenth Day of April, 2013

Teresa Stanek Rea
*Acting Director of the United States Patent and Trademark Office*